(12) United States Patent
Xu

(10) Patent No.: US 11,868,605 B2
(45) Date of Patent: Jan. 9, 2024

(54) APPLICATION BAR DISPLAY METHOD AND ELECTRONIC DEVICE

(71) Applicant: Huawei Technologies Co., Ltd., Shenzhen (CN)

(72) Inventor: Jie Xu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 57 days.

(21) Appl. No.: 17/771,294

(22) PCT Filed: Oct. 22, 2020

(86) PCT No.: PCT/CN2020/122953
§ 371 (c)(1),
(2) Date: Apr. 22, 2022

(87) PCT Pub. No.: WO2021/078213
PCT Pub. Date: Apr. 29, 2021

(65) Prior Publication Data
US 2022/0365647 A1    Nov. 17, 2022

(30) Foreign Application Priority Data

Oct. 23, 2019  (CN) .......................... 201911014359.3
Nov. 13, 2019  (CN) .......................... 201911109041.3

(51) Int. Cl.
*G06F 3/04817*     (2022.01)
*G06F 3/0488*      (2022.01)
(Continued)

(52) U.S. Cl.
CPC .......... *G06F 3/0488* (2013.01); *G06F 3/0482* (2013.01); *G06F 3/0484* (2013.01); *G06F 3/04817* (2013.01); *G06F 2203/04803* (2013.01)

(58) Field of Classification Search
CPC .................................................. G06F 3/04817
(Continued)

(56) References Cited

U.S. PATENT DOCUMENTS 8,351,989 B2 * 1/2013 Ahn ...................... G06F 3/0489
                                                           715/767
9,891,965 B2 * 2/2018 Hong .................. G06F 3/04886
(Continued)

FOREIGN PATENT DOCUMENTS

CN    102037434 A    4/2011
CN    107045420 A    8/2017
(Continued)

*Primary Examiner* — Reza Nabi
(74) *Attorney, Agent, or Firm* — Conley Rose, P.C.

(57) ABSTRACT

A method includes invoking, by a user through continuous sliding, a first application bar and a second application bar that includes more application icons than the first application bar, to help the user perform an operation on an application icon included in the first application bar or the second application bar to quickly start an application. In addition, the method is further combined with a return function. After a first identifier appears, for example, when a first slide gesture goes to a second point, if a touch point of the user leaves a screen, an electronic device performs the return function, for example, display an interface previous to a first interface on a display, or the electronic device performs a function of returning to a home screen, for example, display the home screen of the electronic device on a display.

20 Claims, 47 Drawing Sheets

(51) Int. Cl.
*G06F 3/0482* (2013.01)
*G06F 3/0484* (2022.01)

(58) Field of Classification Search
USPC .......................................................... 715/767
See application file for complete search history.

(56) References Cited

U.S. PATENT DOCUMENTS

| | | | | |
|---|---|---|---|---|
| 10,515,610 | B2* | 12/2019 | Ying | H04N 21/431 |
| 11,314,386 | B2* | 4/2022 | Chen | G06F 9/451 |
| 2004/0100479 | A1* | 5/2004 | Nakano | G06F 3/0485 |
| | | | | 715/700 |
| 2009/0292989 | A1* | 11/2009 | Matthews | G06F 3/0488 |
| | | | | 715/702 |
| 2012/0030624 | A1* | 2/2012 | Migos | G06F 3/04883 |
| | | | | 715/830 |
| 2013/0176202 | A1* | 7/2013 | Gervautz | G06F 3/04886 |
| | | | | 345/156 |
| 2016/0357305 | A1* | 12/2016 | Wells | G06F 3/04842 |
| 2017/0329396 | A1* | 11/2017 | Des Pommare | G06F 3/04842 |
| 2018/0329550 | A1* | 11/2018 | Dellinger | G06F 3/04883 |
| 2020/0272322 | A1* | 8/2020 | Zhu | G06F 3/0482 |
| 2021/0132773 | A1* | 5/2021 | Zheng | G06V 40/1359 |
| 2022/0197486 | A1* | 6/2022 | Xiong | G06F 3/04883 |
| 2022/0365647 | A1* | 11/2022 | Xu | G06F 3/0486 |

FOREIGN PATENT DOCUMENTS

| | | |
|---|---|---|
| CN | 107844232 A | 3/2018 |
| CN | 108415752 A | 8/2018 |
| CN | 108874288 A | 11/2018 |
| CN | 108984064 A | 12/2018 |
| CN | 109032444 A | 12/2018 |
| CN | 109062469 A | 12/2018 |
| CN | 109117060 A | 1/2019 |
| CN | 109766043 A | 5/2019 |
| CN | 109997348 A | 7/2019 |
| CN | 110196674 A | 9/2019 |
| CN | 110244893 A | 9/2019 |
| CN | 111061419 A | 4/2020 |
| EP | 2849042 A1 | 3/2015 |
| WO | 2018082269 A1 | 5/2018 |

* cited by examiner

CONT.
FROM

Interface of an application A

TO

CONT. FROM FIG. 9B ~~~~~~~~~~~~~~~~~~~~~~~~~~~~~~~~~~~~~~~~~~~~~~~~~~~~~~~~~~~~~~~~ ~TO FIG. 9D

CONT. FROM FIG. 9B ~ → ~TO FIG. 9D

APPLICATION BAR DISPLAY METHOD AND ELECTRONIC DEVICE

CROSS-REFERENCE TO RELATED APPLICATIONS

This is a National Stage of International Patent Application No. PCT/CN2020/122953 filed on Oct. 22, 2020, which claims priority to Chinese Patent Application No. 201911014359.3 filed on Oct. 23, 2019 and Chinese Patent Application No. 201911109041.3 filed on Nov. 13, 2019. All of the aforementioned patent applications are hereby incorporated by reference in their entireties.

TECHNICAL FIELD

The present invention relates to the field of graphical user interface interaction technologies, and in particular, to an application bar display method and an electronic device.

BACKGROUND

With development of mobile communications technologies, mobile electronic devices (such as a smartphone, a tablet computer, a wearable device, and a smart TV) have gradually become indispensable in people's daily life, work, and entertainment. People may use the mobile electronic devices listed above to implement functions such as instant messaging, voice communications, file processing, shopping, and listening to music. Especially, a tablet computer, a foldable-screen device, and the like appear on the market, and these large-screen electronic devices bring great convenience to multi-window interaction. For example, on the foldable-screen device, a user may have a video chat with a friend while reading news, or view information about a commodity on an e-commerce platform while performing an operation such as price comparison on the commodity on another e-commerce platform. However, to implement a multi-window interaction operation, the user needs to find an application that supports multi-window interaction, start the application, and then perform multi-window interaction in the forms listed above.

Therefore, how to conveniently, quickly, and stably trigger the multi-window interaction operation on the large-screen electronic devices such as the foldable-screen device and the tablet computer becomes an urgent problem to be resolved.

SUMMARY

Embodiments of the present invention provide an application bar display method and an electronic device. By using the foregoing method or the electronic device, an application bar can be conveniently invoked, so that a user quickly starts an application.

To achieve the foregoing objective, the following solutions are provided in embodiments of the present invention.

According to a first aspect, the present invention provides an application bar display method. An electronic device displays an application interface of a first application on a display, and receives a first slide gesture that goes from a first point to a second point and that is entered by a user. The first point is in a first area on the display, the second point is on the display and outside the first area, the first area is located on a first edge, the first edge is any edge of the display, and a straight-line distance between the second point and the first point is greater than a first threshold and less than a second threshold. The electronic device displays a first identifier on the first edge in response to the first slide gesture. In response to the fact that a touch point of the user leaves the display when the first slide gesture goes to the second point, the electronic device displays a second interface on the display. The second interface is an interface previous to a first interface or a home screen of the electronic device. The electronic device receives a second slide gesture entered by the user. The second slide gesture goes from the first point to the second point. The electronic device displays the first identifier on the first edge in response to the second slide gesture. The electronic device receives a third slide gesture entered by the user. The third slide gesture goes from the second point to a third point, the third point is on the display, and a straight-line distance between the third point and the first point is greater than the second threshold and less than a third threshold. In processes of performing the second slide gesture and the third slide gesture, the touch point of the user does not leave the display. The electronic device displays a first application bar on the first edge in response to the third slide gesture. The first application bar includes N1 application icons, and N1 is a positive integer. The electronic device receives a fourth slide gesture entered by the user. The fourth slide gesture goes from the third point to a fourth point, the fourth point is on the display, and a straight-line distance between the fourth point and the first point is greater than the third threshold. In processes of performing the third slide gesture and the fourth slide gesture, the touch point of the user does not leave the display. The electronic device displays a second application bar on the first edge in response to the fourth slide gesture. The second application bar includes N2 application icons, N2 is a positive integer, and N2 is greater than N1.

By using the foregoing method, the user may invoke, through continuous sliding, the first application bar and the second application bar that includes more application icons than the first application bar, to help the user perform an operation on an application icon included in the first application bar or the second application bar to quickly start an application. In addition, the foregoing method is further combined with a return function. After the first identifier appears, for example, when the first slide gesture goes to the second point, if the touch point of the user leaves a screen, the electronic device performs the return function, for example, displays the interface previous to the first interface on the display, or the electronic device may perform a function of returning to the home screen, for example, displays the home screen of the electronic device on the display. This facilitates a user operation.

With reference to the first aspect, in a first possible implementation, the second application bar includes a second application icon corresponding to a second application, and the electronic device may receive a tap operation, a touch and hold operation, or a drag operation performed by the user on the second application icon, and display an application interface of the second application on the display in response to a first operation.

With reference to the first aspect and the possible implementation of the first aspect, in a second possible implementation, the electronic device displays a third interface over the first interface in a floating window form, or simultaneously displays the first interface and a third interface on the display in a split screen form. Regardless of whether the third interface is displayed in a floating window form or in a split screen form, it can be convenient for the user to simultaneously browse the application interface of the second application and another interface, for example, the application interface of the first application.

With reference to the first aspect and the possible implementations of the first aspect, in a third possible implementation, the electronic device receives a tap operation, a touch-and-hold operation, or a drag operation performed by the user on the third interface, and in response to a second operation, the electronic device switches, on the display, a method for displaying the third interface, for example, switches from a floating window form to a split screen form, or switches from a split screen form to a floating window form.

With reference to the first aspect and the possible implementations of the first aspect, in a fourth possible implementation, the N2 application icons include the N1 application icons. In other words, the application icons in the second application bar include the icons in the first application bar. In this way, the second application bar may be considered as an extension of the first application bar.

With reference to the first aspect and the possible implementations of the first aspect, in a fifth possible implementation, when the electronic device detects that the first slide gesture goes to a fifth point, a sixth point, or a seventh point, the electronic device generates a feedback prompt. The feedback prompt includes any one or a combination of a vibration feedback prompt, a sound feedback prompt, a voice feedback prompt, and an image feedback prompt. The fifth point, the sixth point, and the seventh point are on the display, a straight-line distance between the fifth point and the first point is equal to the first threshold, a straight-line distance between the sixth point and the first point is equal to the second threshold, and a straight-line distance between the seventh point and the first point is equal to the third threshold. In this way, a function of prompting the user can be implemented, and when a sliding distance reaches a threshold, a feedback can be provided for the user.

With reference to the first aspect and the possible implementations of the first aspect, in a sixth possible implementation, in a process in which the first slide gesture received by the electronic device goes from the first point to the fifth point, a first visual element that is displayed by the electronic device and that is located on the first edge gradually expands to the first identifier. In a process in which the first slide gesture received by the electronic device goes from the fifth point to the sixth point, the first identifier that is displayed by the electronic device gradually expands to the first application bar. In a process in which the first slide gesture received by the electronic device goes from the sixth point to the seventh point, the first application bar that is displayed by the electronic device gradually expands to the second application bar. The fifth point, the sixth point, and the seventh point are on the display, the straight-line distance between the fifth point and the first point is equal to the first threshold, the straight-line distance between the sixth point and the first point is equal to the second threshold, and the straight-line distance between the seventh point and the first point is equal to the third threshold. In this way, an animation transition effect is generated in a sliding process, which can give the user an intuitive feeling, to prompt the user of a slide operation process.

With reference to the first aspect and the possible implementations of the first aspect, in a seventh possible implementation, after the electronic device displays the second application bar on the first edge, the method further includes: When the electronic device detects no operation on the second application bar within a preset duration threshold, the electronic device displays the second application bar with reduced transparency, or the electronic device does not display the second application bar, that is, the second application bar is displayed on the display. This can implement intelligent rollback of an application bar, and improve user experience.

With reference to the first aspect and the possible implementations of the first aspect, in an eighth possible implementation, the first application bar includes a first area and a second area. The first area includes a first-type application icon, and the second area includes a second-type application icon. The first-type application icon may include N3 application icons used by the user within a second duration threshold, and the N3 application icons are presented in the first area in a first sequence. A sorting rule of the first sequence includes any one or a combination of use duration, use frequency, and use date of the user within the second duration threshold. N3 is a positive integer. The second-type application icon may include N4 application icons associated with the first application. The first application is an application corresponding to an application interface displayed by the first interface of the electronic device, and N4 is a positive integer. The second-type application icon may further include N5 application icons that are manually added by the user, and N5 is a positive integer. A manner of manually adding an application icon by the user includes: adding an application icon through the system settings, adding an application icon by using an add button included in an application bar, or adding an application icon or content by dragging a selected application or content to a favorites area when the favorites area is set in the application bar. In this way, the content of the application bar can be automatically added through a system, and can also be manually added by the user. This improves an intelligence degree of the content of the application bar and user experience.

With reference to the first aspect and the possible implementations of the first aspect, in a ninth possible implementation, the N4 application icons associated with the first application and the first application may belong to a same application type, including any one of a shopping type, a video type, a music type, a social type, and an instant messaging type. For example, when the user browses a shopping application A, the application bar is invoked by using the method according to the first aspect, and a shopping application B, a shopping application C, and the like of a same type in the application bar are quickly started for price comparison.

With reference to the first aspect and the possible implementations of the first aspect, in a tenth possible implementation, the electronic device receives a fifth slide gesture entered by the user on the second application bar, and the electronic device displays N6 application icons in the second application bar in response to the fifth slide gesture. N6 is a positive integer, and the N6 application icons are different from at least one of the N2 application icons. In this way, the content of the application bar may be switched through the fifth slide gesture, to display more content.

With reference to the first aspect and the possible implementations of the first aspect, in an eleventh possible implementation, if the user point of the user leaves the screen when the third slide gesture goes to the third point, the electronic device receives a fourth slide gesture entered by the user on the first application bar, that is, a start point of the fourth slide gesture is on the first application bar, and then the electronic device also displays the second application bar on the first edge.

According to a second aspect, the present invention provides another application bar display method. The method includes the following steps.

An electronic device displays an application interface of a first application on a display, and receives a first slide gesture that goes from a first point to a second point and that is entered by a user, where the first point is in a first area on the display, the second point is on the display and outside the first area, the first area is located on a first edge, the first edge is any edge of the display, and a straight-line distance between the second point and the first point is greater than a first threshold and is less than a second threshold. The electronic device displays a first identifier on the first edge in response to the first slide gesture. When duration for which a touch point of the user stays at the second point is greater than or equal to a preset duration threshold, the electronic device displays a first application bar on the first edge, where the first application bar includes N1 application icons, and N1 is a positive integer. In this way, different functions may be implemented through staying in specific areas, to overcome a disadvantage that fingers of different users cannot conveniently slide for a specific distance due to lengths of the fingers. This can effectively improve user experience. Same as that in the first aspect, the first identifier also indicates a return function or a function of returning to a home screen.

With reference to the second aspect, in a first implementation, the electronic device receives a second slide gesture that is entered by the user and that starts from the second point. In the processes of performing the first slide gesture and the second slide gesture, the touch point of the user does not leave the display. The electronic device displays a second application bar on the first edge in response to the second slide gesture. The second application bar includes N2 application icons, N2 is a positive integer, N2 is greater than N1, and the N2 application icons include the N1 application icons. In this way, different functions may be implemented through staying in specific areas, to overcome a disadvantage that fingers of different users cannot conveniently slide for a specific distance due to lengths of the fingers. This can effectively improve user experience.

With reference to the second aspect and the possible implementation of the second aspect, in a second possible implementation, after the electronic device displays the first application bar on the first edge, the method further includes: The electronic device receives a third slide gesture, where a start point of the third slide gesture is on the first application bar; and the electronic device displays a second application bar on the first edge in response to the third slide gesture. In this way, the second application bar may also be invoked by sliding the first application bar, so that the second application bar is displayed in a plurality of manners, and user experience is improved.

With reference to the second aspect and the possible implementation of the second aspect, in a second possible implementation, in a process in which the first slide gesture received by the electronic device goes from the first point to a fifth point, a first visual element that is displayed by the electronic device and that is located on the first edge gradually expands to the first identifier. The fifth point is on the display, and a straight-line distance between the fifth point and the first point is equal to the first threshold. In a process in which the touch point of the user stays at the second point, the first identifier that is displayed by the electronic device and that is located on the first edge gradually expands to the first application bar. In a process in which the touch point of the user stays at a third point, the first application bar that is displayed by the electronic device and that is on the first edge is gradually expands to the second application bar. In this way, when the touch point of the user stays at a point, not only a next function can be switched to, but also a function switching process can be observed through a dynamic transition effect. This improves user experience.

In addition, all the first to the fifth implementations and the seventh to the tenth implementations provided in the first aspect may be applied to or combined with the second aspect and the possible implementations of the second aspect. Details are not described again.

According to a third aspect, the present invention provides an application bar display method, applied to an electronic device including a foldable screen. The foldable screen includes a first display area that is located on one side of a rotating shaft and a second display area that is located on the other side of the rotating shaft. When the electronic device is in a folded state, the electronic device displays an application interface of a first application in the first display area. When the electronic device is in an unfolded state, the electronic device displays a first application bar on a first edge. The first application bar includes N1 application icons, and N1 is a positive integer. The first edge is any edge of the foldable screen. In this way, a foldable-screen device may open an application bar by using the unfolded state of the device, so that the application bar can be conveniently and quickly invoked to implement more operations, and user experience can be improved.

With reference to the third aspect, in a first possible implementation, after the electronic device displays the first application bar on the first edge, the method further includes: The electronic device receives a first slide gesture, where a start point of the first slide gesture is on the first application bar; and the electronic device displays a second application bar on the first edge in response to the first slide gesture. In this way, the second application bar may also be invoked by sliding the first application bar, so that the second application bar is displayed in a plurality of manners, and user experience is improved.

In addition, all the first to the fourth implementations and the seventh to the tenth implementations provided in the first aspect may be applied to or combined with the third aspect and the possible implementations of the third aspect. Details are not described again.

According to a fourth aspect, this application provides a computer storage medium, including computer instructions. When the computer instructions are run on an electronic device, the electronic device is enabled to perform the application bar display method according to any implementation of any one of the foregoing aspects.

According to a fifth aspect, this application provides a computer program product. When the computer program product is run on a computer, the computer is enabled to perform the application bar display method according to any implementation of any one of the foregoing aspects.

According to a sixth aspect, this application provides a graphical user interface (Graphical User Interface, GUI) system. The graphical user interface system is displayed on a display of an electronic device. The electronic device includes the display, a memory, and one or more processors. The one or more processors are configured to execute one or more computer programs stored in the memory. The graphical user interface system includes: A first interface is displayed on the display, where the first interface is an application interface of a first application. A first identifier is displayed on a first edge in response to a first slide gesture entered by a user, where the first edge is any edge of the display. In response to the fact that a touch point of the user leaves the display after the user enters the first slide gesture, a second interface is displayed on the display, where the second interface is an interface previous to the first interface. The first identifier is displayed on the first edge again in response to a second slide gesture entered by the user. A first application bar is displayed on the first edge in response to a third slide gesture entered by the user, where the first application bar includes N1 application icons, N1 is a positive integer, and in processes of performing the second slide gesture and the third slide gesture, the touch point of the user does not leave the display. A second application bar is displayed on the first edge in response to a fourth slide gesture entered by the user, where the second application bar includes N2 application icons, N2 is a positive integer, N2 is greater than N1, and in processes of performing the third slide gesture and the fourth slide gesture, the touch point of the user does not leave the display. A third interface is displayed on the display in response to a first operation that is entered by the user on a second application icon in the second application bar, where the third interface is an application interface of a second application.

With reference to the sixth aspect, in a first possible implementation, that a third interface is displayed on the display includes: The third interface is displayed over the first interface in a floating window form. The graphical user interface system further includes: In response to a second operation performed by the user on the third interface, the third interface and the first interface are simultaneously displayed on the display in a split screen form.

With reference to the sixth aspect and the possible implementation of the sixth aspect, in a second possible implementation, that a third interface is displayed on the display includes: The third interface and the first interface are simultaneously displayed on the display in a split screen form. The graphical user interface system further includes: In response to a second operation performed by the user on the third interface, the third interface is displayed over the first interface in a floating window form.

With reference to the sixth aspect and the possible implementations of the sixth aspect, in a third possible implementation, before the first identifier is displayed on the first edge, the graphical user interface system further includes: A first visual element located on the first edge gradually expands to the first identifier to be displayed on the display.

With reference to the sixth aspect and the possible implementations of the sixth aspect, in a fourth possible implementation, before the first application bar is displayed on the first edge, the graphical user interface system further includes: The first identifier gradually expands to the first application bar to be displayed on the display.

With reference to the sixth aspect and the possible implementations of the sixth aspect, in a fifth possible implementation, before the second application bar is displayed on the first edge, the graphical user interface system further includes: The first application bar gradually expands to the second application bar to be displayed on the display.

According to a seventh aspect, this application provides another graphical user interface (Graphical User Interface, GUI) system. The graphical user interface system is displayed on a display of an electronic device. The electronic device includes the display, a memory, and one or more processors. The one or more processors are configured to execute one or more computer programs stored in the memory. The graphical user interface system includes: A first interface is displayed on the display, where the first interface is an application interface of a first application. A first identifier is displayed on a first edge in response to a first slide gesture entered by a user, where the first edge is any edge of the display. In response to the fact that a touch point of the user leaves the display after the user enters the first slide gesture, a second interface is displayed on the display, where the second interface is an interface previous to the first interface. The first identifier is displayed on the first edge again in response to a second slide gesture entered by the user. A first application bar is displayed on the first edge in response to a third slide gesture entered by the user, where the first application bar includes N1 application icons, and N1 is a positive integer. A second application bar is displayed on the first edge in response to a fourth slide gesture entered by the user, where the second application bar includes N2 application icons, N2 is a positive integer, N2 is greater than N1, and after the third slide gesture is entered, the touch point of the user leaves the display. A third interface is displayed on the display in response to a first operation that is entered by the user on a second application icon in the second application bar, where the third interface is an application interface of a second application.

All the first to the fifth implementations provided in the sixth aspect may be applied to or combined with the seventh aspect. Details are not described again.

According to an eighth aspect, the present invention provides an electronic device, including a display, one or more processors, a memory, and a computer program. The computer program is stored in the memory. The computer program includes instructions, and when the instructions are executed by the one or more processors, the electronic device is enabled to perform the following steps: The electronic device displays an application interface of a first application on the display, and receives a first slide gesture that goes from a first point to a second point and that is entered by a user, where the first point is in a first area on the display, the second point is on the display and outside the first area, the first area is located on a first edge, the first edge is any edge of the display, and a straight-line distance between the second point and the first point is greater than a first threshold and less than a second threshold. The electronic device displays a first identifier on the first edge in response to the first slide gesture. When the first slide gesture goes to the second point, a touch point of the user leaves the display, and then the electronic device displays a second interface on the display, where the second interface is an interface previous to a first interface or a home screen of the electronic device; or when the first slide gesture goes to the second point, the touch point of the user does not leave the display, and then the electronic device receives a second slide gesture entered by the user, where the second slide gesture goes from the second point to a third point, the third point is on the display, and a straight-line distance between the third point and the first point is greater than the second threshold and less than a third threshold. The electronic device displays a first application bar on the first edge in response to the second slide gesture, where the first application bar includes N1 application icons, and N1 is a positive integer. The electronic device receives a third slide gesture entered by the user, where the third slide gesture goes from the third point to a fourth point, the fourth point is on the display, a straight-line distance between the fourth point and the first point is greater than the third threshold, and in processes of performing the second slide gesture and the third slide gesture, the touch point of the user does not leave the display. The electronic device displays a second application bar on the first edge in response to a fourth slide gesture, where the second application bar includes N2 application icons, N2 is a positive integer, and N2 is greater than N1.

All the first to the eleventh implementations provided in the first aspect may be applied to or combined with the eighth aspect. Details are not described again.

According to a ninth aspect, the present invention provides an electronic device, including a display, one or more processors, a memory, and a computer program. The computer program is stored in the memory. The computer program includes instructions, and when the instructions are executed by the one or more processors, the electronic device is enabled to perform the following steps: The electronic device displays an application interface of a first application on the display, and receives a first slide gesture that goes from a first point to a second point and that is entered by a user, where the first point is in a first area on the display, the second point is on the display and outside the first area, the first area is located on a first edge, the first edge is any edge of the display, and a straight-line distance between the second point and the first point is greater than a first threshold and less than a second threshold. The electronic device displays a first identifier on the first edge in response to the first slide gesture. When the first slide gesture goes to the second point, a touch point of the user leaves the display, and then the electronic device displays a second interface on the display, where the second interface is an interface previous to a first interface or a home screen of the electronic device or when the first slide gesture goes to the second point, the touch point of the user does not leave the display, and then the electronic device receives a second slide gesture entered by the user, where the second slide gesture goes from the second point to a third point, the third point is on the display, and a straight-line distance between the third point and the first point is greater than the second threshold and less than a third threshold. The electronic device displays a first application bar on the first edge in response to the second slide gesture, where the first application bar includes N1 application icons, and N1 is a positive integer. The electronic device receives a third slide gesture entered by the user, where the touch point of the user leaves the display when the second slide gesture goes to the third point, and a start point of the third slide gesture is on the first application bar. The electronic device displays a second application bar on the first edge in response to the third slide gesture, where the second application bar includes N2 application icons, N2 is a positive integer, and N2 is greater than N1.

All the first to the tenth implementations provided in the first aspect may be applied to or combined with the ninth aspect. Details are not described again.

By using the application bar display method and the electronic device according to embodiments of the present invention, the user may conveniently invoke an application bar, to quickly start an application.

BRIEF DESCRIPTION OF DRAWINGS

To describe the technical solutions in embodiments of the present invention more clearly, the following briefly describes the accompanying drawings for describing embodiments.

FIG. 4A and FIG. 4B-1 to FIG. 4B-4 are schematic diagrams of slide gestures with different distances and corresponding functions according to an embodiment of the present invention;

FIG. 17A and FIG. 17B-1 to FIG. 17B-3 are schematic diagrams of a process of displaying a first application bar according to an embodiment of the present invention;

FIG. 18A and FIG. 18B-1 to FIG. 18B-3 are schematic diagrams of a process of displaying a second application bar according to an embodiment of the present invention;

DESCRIPTION OF EMBODIMENTS

Figure 1:
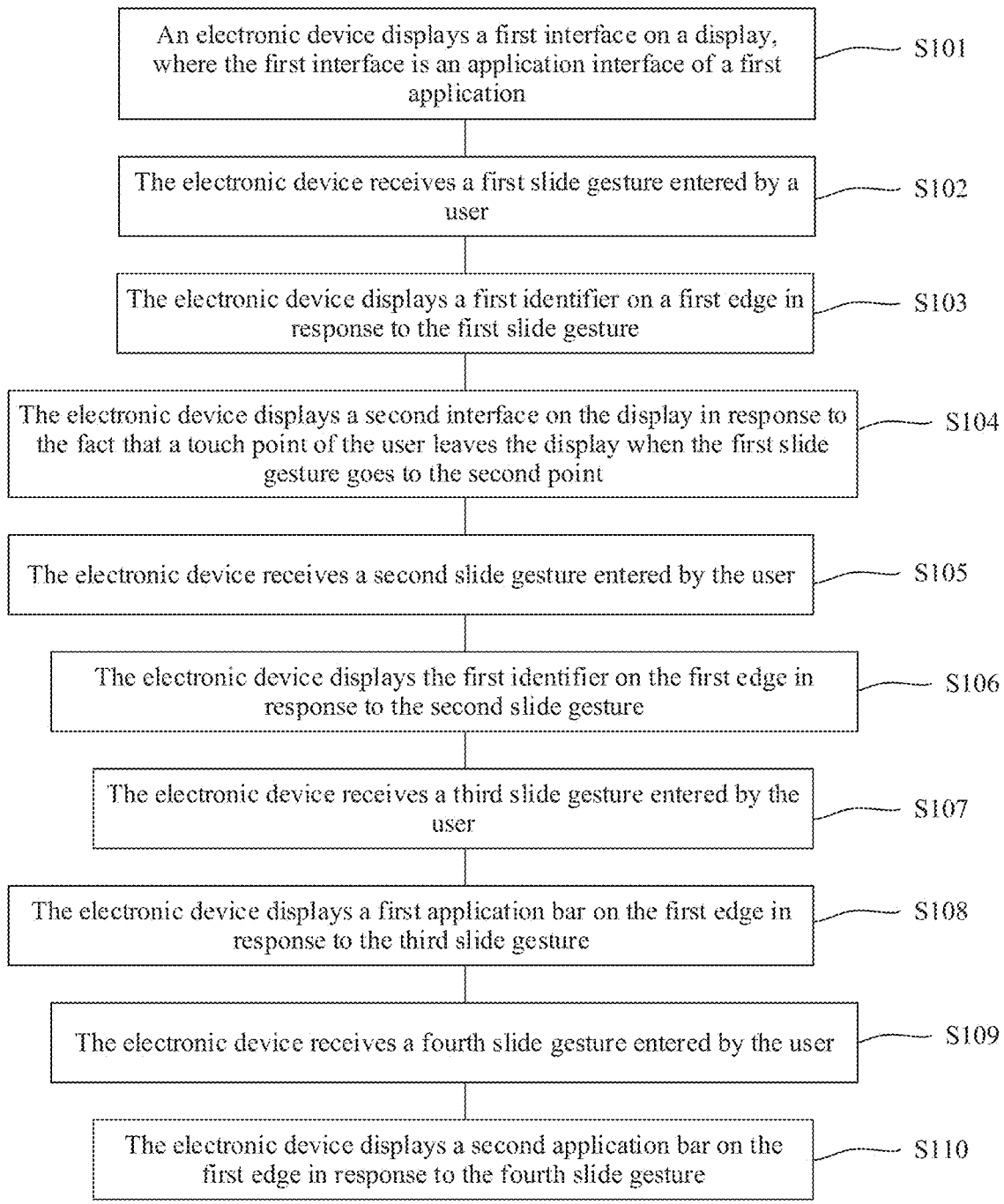
FIG. 1 is a flowchart of implementing an application bar display method according to an embodiment of the present invention.

The following clearly describes the technical solutions in embodiments of the present invention with reference to the accompanying drawings in embodiments of the present invention.

A problem to be resolved by the present invention is to provide an application bar display method and an apparatus, so that a multi-window interaction operation can be conveniently and stably triggered on an electronic device, to improve user experience.

In an implementation of the present invention, the electronic device is an electronic device that has a data computing and processing function and a wireless communication function. The electronic device includes but is not limited to: a smartphone (for example, an Android mobile phone or a mobile phone equipped with another operating system, such as an iOS (iPhone Operating System) mobile phone), a tablet computer, a palmtop computer, a portable multimedia player, an electronic photo frame, an electronic game console, a notebook computer, a mobile Internet device (Mobile Internet Device), a wearable device (such as a smartwatch, a smart band, smart glasses, or a head mounted device (HMD)), a vehicle-mounted multimedia device, a projection device, a smart home device, an Internet of Things device, an intelligent vehicle, and the like. The foregoing lists some specific types of the electronic devices. However, a person skilled in the art may be aware that implementations of the present invention are not limited to the foregoing listed types, and may be further applied to any other electronic device type and operating system type.

It should be noted that, in descriptions of embodiments of the present invention, unless otherwise stated, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in descriptions of embodiments of the present invention, "a plurality of" means two or more.

For the application bar display method and the apparatus provided in embodiments of the present invention, it should be noted that:

At present, there are conventional technologies in the industry: 1. An application bar is set at a side of a screen, and an application shortcut may be set in the application bar for a user to select, to perform a multi-window interaction function. The user may invoke the application bar by using a gesture operation of sliding inwards, and select an application. 2. An application bar is set at the bottom of a screen, and an application shortcut may be set in the application bar. A user may invoke the application bar by sliding up on the screen, and select an application, to implement a multi-window interaction function. The foregoing conventional technologies can implement a convenient multi-window interaction function, but have respective disadvantages. For example, in conventional technology 1, the application bar is invoked by the gesture operation of sliding inwards on a side of the screen. This gesture operation is consistent with a return operation in an existing Android system, and parallel use of the gesture operation and the return operation may cause a misoperation of the user. In conventional technology 2, the application bar is invoked by sliding up on the screen, which is consistent with a gesture of starting multi-application switching and a gesture of returning to a home screen in an existing Android system, and the two also conflict with each other.

Embodiment 1 of the present invention provides an application bar display method.

For ease of understanding, the following specifically describes, with reference to the accompanying drawings, an application bar display method provided in an embodiment of this application. In the following embodiments, an example in which a smartphone is used as an electronic device is used for description.

FIG. 1 is a flowchart of implementing an application bar display method according to an embodiment of the present invention. As shown in FIG. 1, an implementation procedure of the application bar display method may include the following steps.

S101: An electronic device displays a first interface on a display. The first interface is an application interface of a first application.

Figure 2:
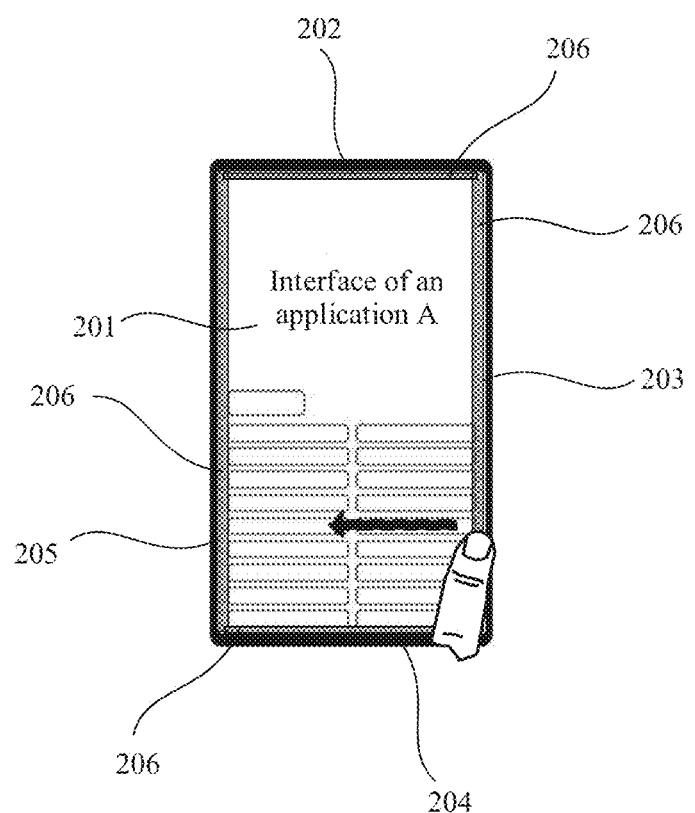
FIG. 2 is a schematic diagram of a display interface of an electronic device according to an embodiment of the present invention.

The application interface of the first application displayed on the display of the electronic device may include an interface displayed when any APP (Application, application) in the mobile phone of the electronic device is running, for example, a WeChat chat application interface, a Taobao shopping application interface, or a Sina news application interface. FIG. 2 is a schematic diagram of a display interface of an electronic device according to an embodiment of the present invention. As shown in FIG. 2, an application interface 201 of the first application may be an interface that is being displayed and that is of an application A. Alternatively, an application interface 201 of the first application may be a desktop, a lock screen, a leftmost screen menu, a pull-up menu, a drop-down menu, a system function interface, or the like of the electronic device. It may be understood that this is not limited in this embodiment of the present invention.

S102: The electronic device receives a first slide gesture entered by a user.

The first slide gesture goes from a first point to a second point, the first point is in a first area on the display, the second point is on the display and outside the first area, the first area is located on a first edge, the first edge is any edge of the display, and a straight-line distance between the second point and the first point is greater than a first threshold and less than a second threshold.

The term "point" mentioned in this embodiment of the present invention are all examples, and does not constitute any limitation on specific implementation of the solution.

In this embodiment of the present invention, the first slide gesture that goes from the first point to the second point may be sliding when the electronic device projects the first application interface onto the display. The first slide gesture that goes from the first point to the second point may alternatively be sliding of an air gesture that is performed by a user and that is captured by the electronic device on the display of the electronic device. It may be understood that, for slide gestures in subsequent embodiments, refer to the foregoing explanations. The slide gestures in this embodiment of the present invention are not limited to a slide gesture in which a touch point of a user is in direct contact with the display, and may further include the foregoing enumerated cases.

Preferably, the first area is an area that is located on the display screen of the electronic device and that has a fixed pixel distance from a left edge and a right edge of the display. As shown in FIG. 2, the first area is a gray ribbon area 206 that has a fixed pixel distance from a left edge 205 and a right edge 203. It may be understood that in some embodiments, the first area may alternatively be a gray ribbon area 206 that has a fixed pixel distance from a top edge 202 or a bottom edge 204 of the display.

Figure 3:
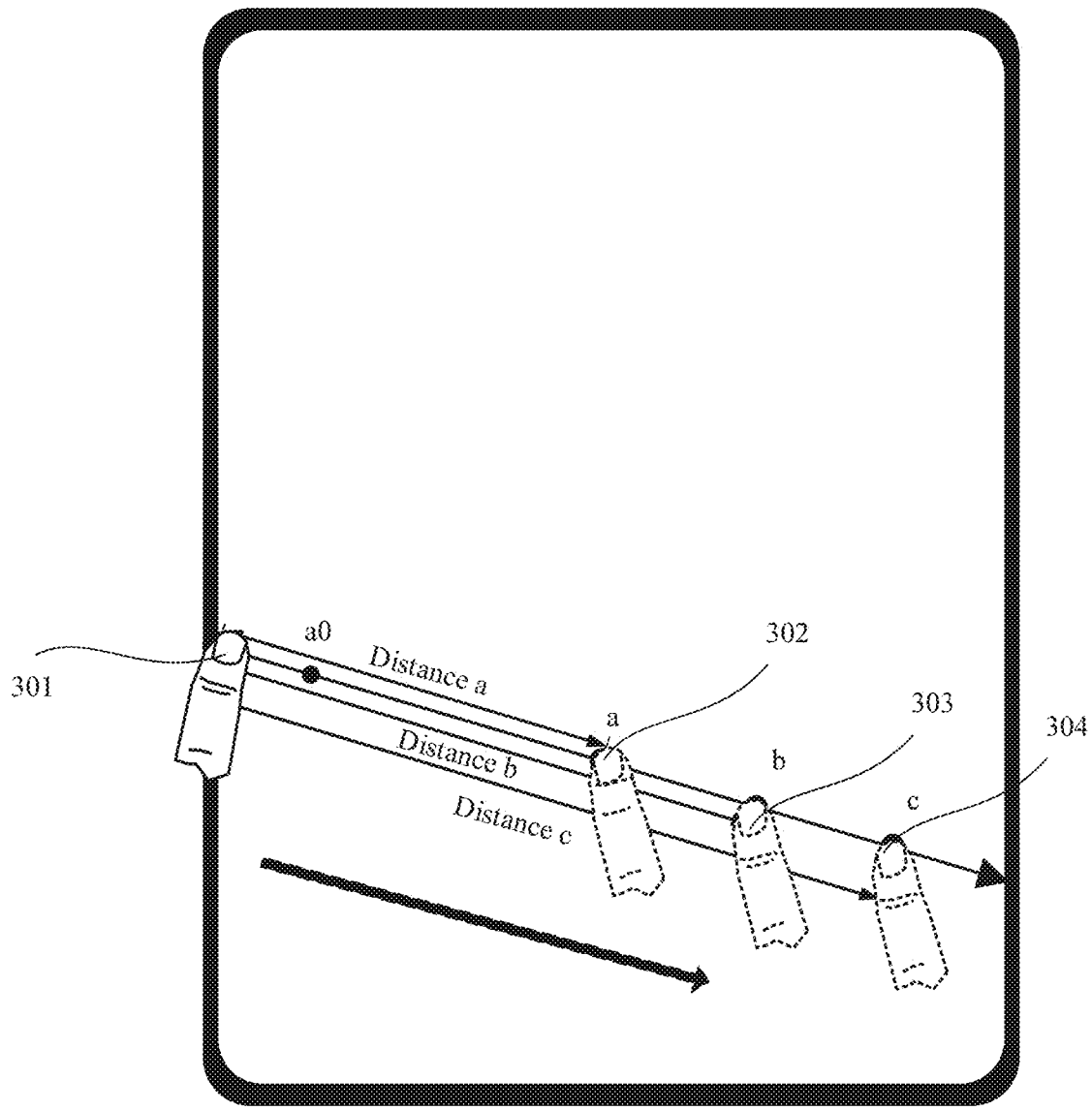
FIG. 3 is a schematic diagram showing that a touch point of a user slides over different thresholds according to an embodiment of the present invention.

The second point is on the display of the electronic device and is outside the first area, and a straight-line distance between the second point and the first point is greater than a first threshold and less than a second threshold. Values of the first threshold and the second threshold may be 2 or 3 millimeters. The values of the first threshold and the second threshold in the present invention may be set according to different cases, and are not limited in this embodiment of the present invention. The first threshold, the second threshold, and a third threshold that is to be mentioned subsequently are set to implement the present invention. By setting different thresholds such as a first threshold a, a second threshold b, and a third threshold c, when a finger touch point or another tool touch point of the user slides from the first point to another point on the display of the electronic device, it can slide for different sliding distances to implement different functions. FIG. 3 is a schematic diagram showing that a touch point of a user slides over different thresholds according to an embodiment of the present invention. As shown in FIG. 3, for example, when the touch point of the user starts sliding from a first point 301 to an inner side of the display, if the touch point of the user slides to a second point 302 whose straight-line distance from the first point 301 is a, the electronic device may implement a function A; if the touch point of the user slides to a third point 303 whose straight-line distance from the first point 301 is b, the electronic device may implement a function B; and if the touch point of the user slides to a fourth point 304 whose straight-line distance from the first point 301 is c, the electronic device may implement a function C. Certainly, in this embodiment, more thresholds may be set, and when the touch point of the user slides to a specific threshold area, a corresponding function may be implemented, which is not limited in this embodiment of the present invention. The straight-line distance may be absolute displacement generated when the touch point of the user slides on a touchscreen, or may be a displacement component in a horizontal direction or a vertical direction when the touch point of the user slides on a touchscreen. This is not limited in this embodiment of the present invention.

In this embodiment of the present invention, different functions may also be implemented according to actual distances between different points to which the touch point of the user slides. For example, starting from the first point, the touch point of the user slides a semicircle on the display to the second point. In this case, a function corresponding to this gesture is determined by comparing a threshold with an actual distance between a start point and an end point of the touch point of the user (the actual distance may be calculated in an integral manner, and the like), namely, a length of the semicircle. It may be understood that a sliding distance calculation manner is not limited in this embodiment of the present invention.

Figure 4A:
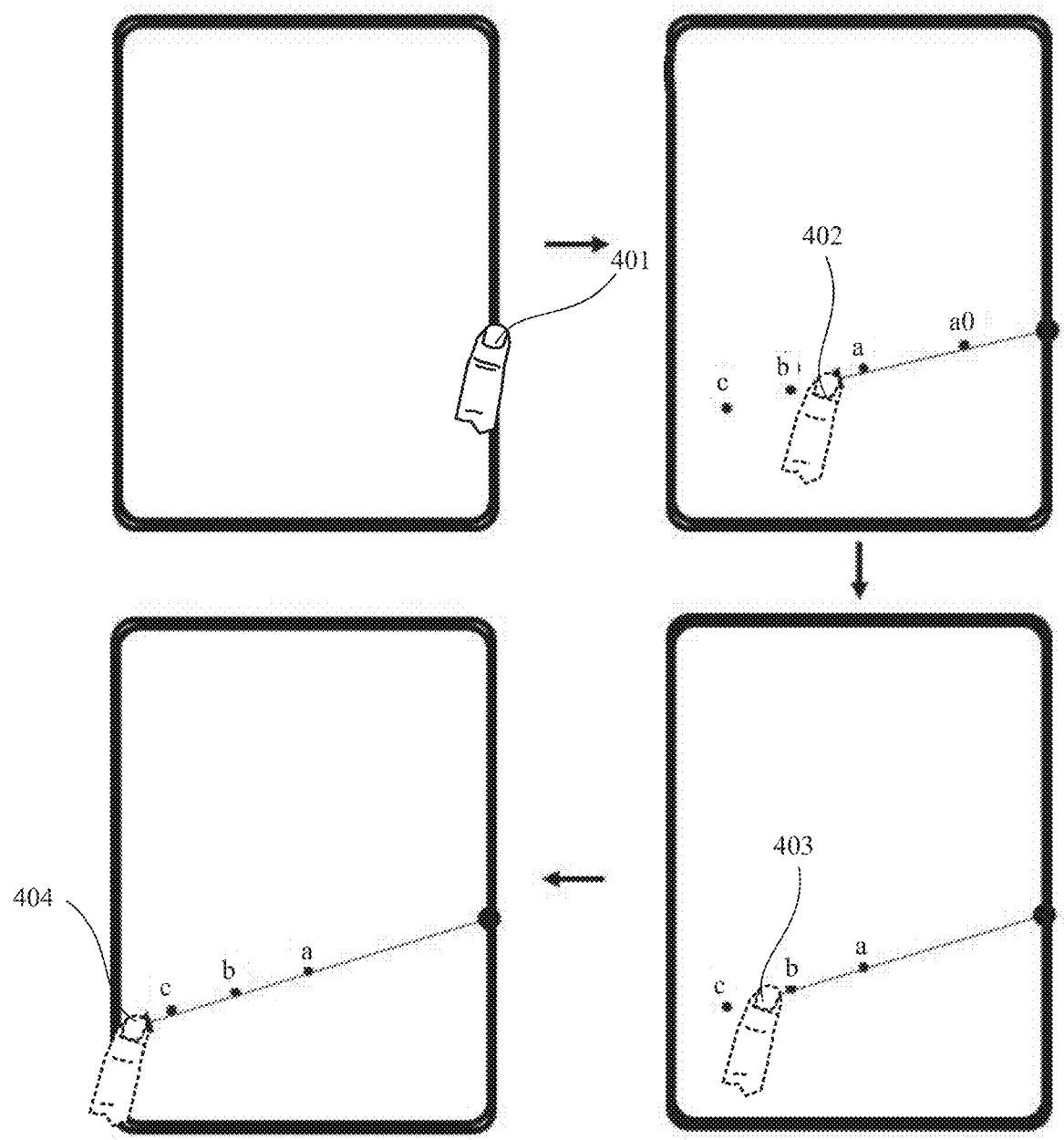

FIG. 4A and FIG. 4B-1 to FIG. 4B-4 are schematic diagrams of slide gestures with different distances and corresponding functions according to an embodiment of the present invention. Refer to FIG. 4A. In this embodiment of the present invention, an anti-accidental touch threshold a0 may be further set, and the anti-accidental touch threshold a0 is greater than 0 and less than the first threshold a. Further, an objective of setting the anti-accidental touch threshold a0 is: When the touch point of the user slides from the first point 401 to another point, if a straight-line distance between the another point and the first point is less than the anti-accidental touch threshold a0, the current sliding of the touch point of the user may be considered as an accidental touch by a system, and the sliding behavior does not trigger any application or operation of the electronic device.

S103: The electronic device displays a first identifier on the first edge in response to the first slide gesture.

Figures 1, 4B:
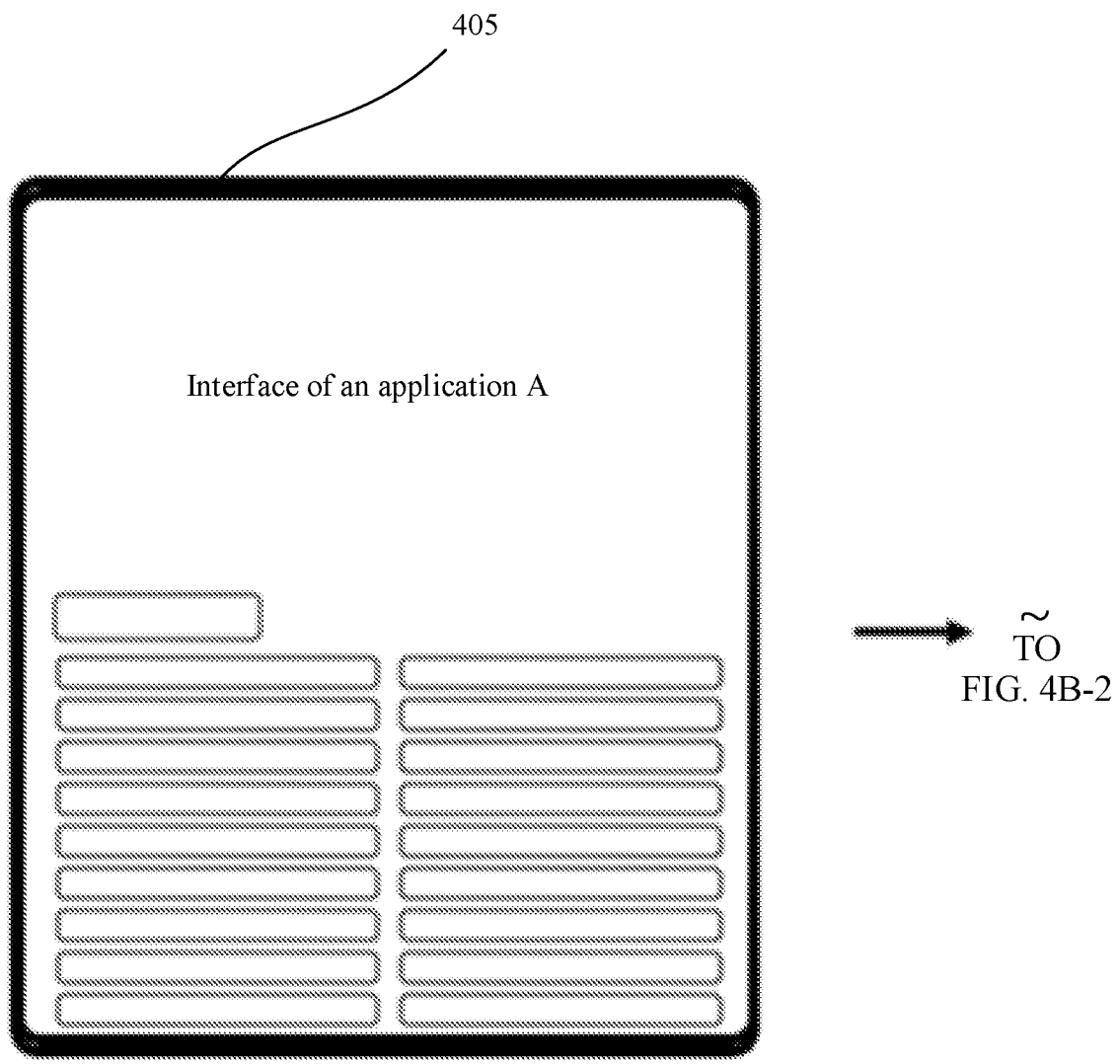
Figures 2, 4B:
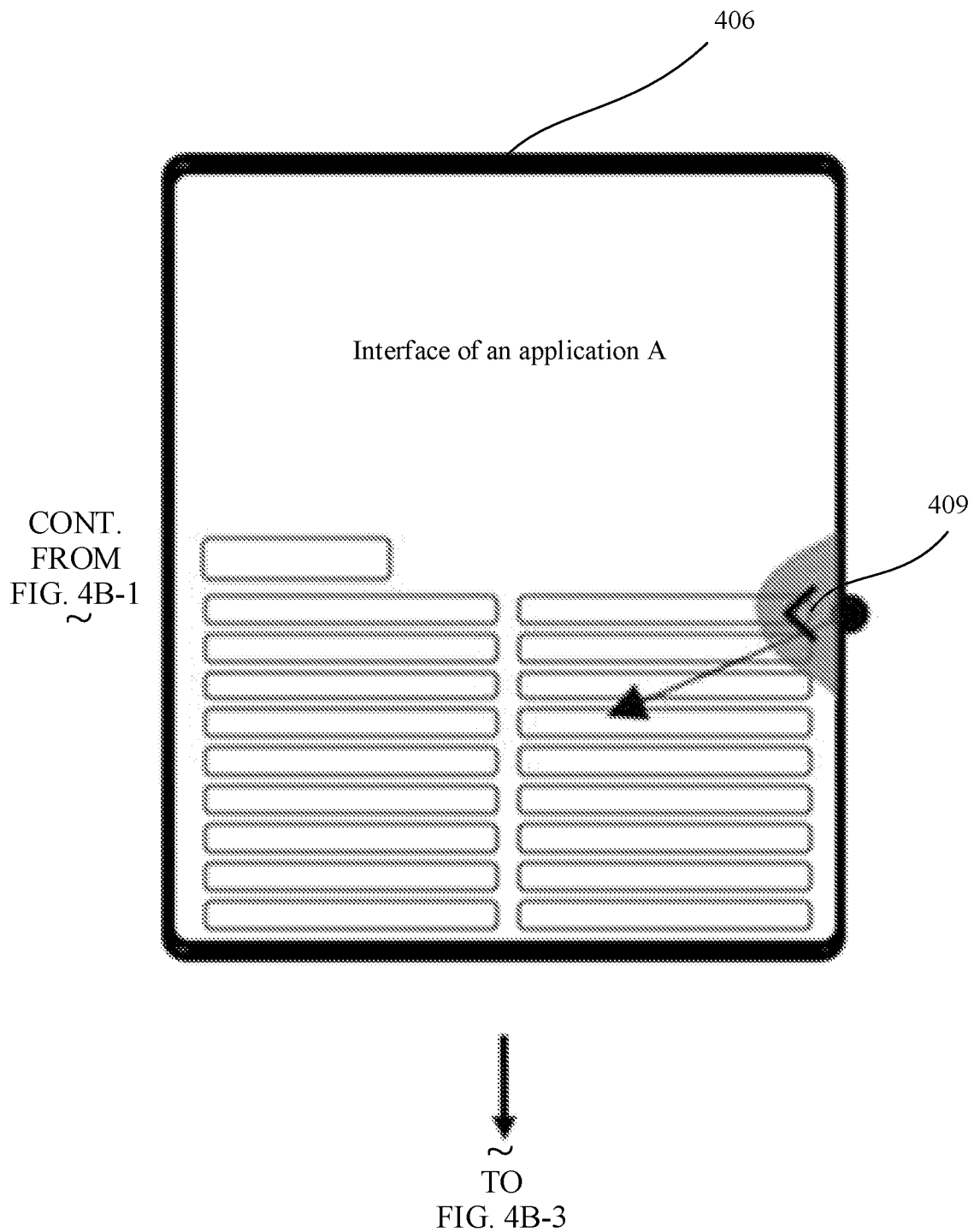
Figures 2, 3, 4, 4B:
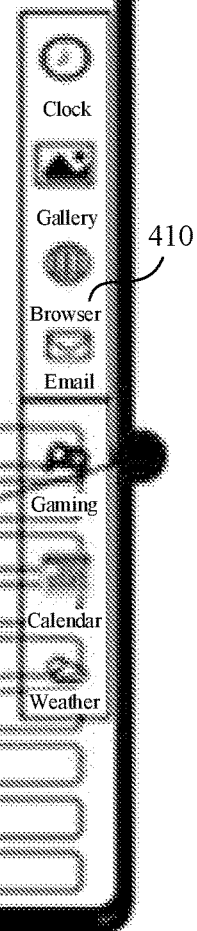
Figures 4, 4B:
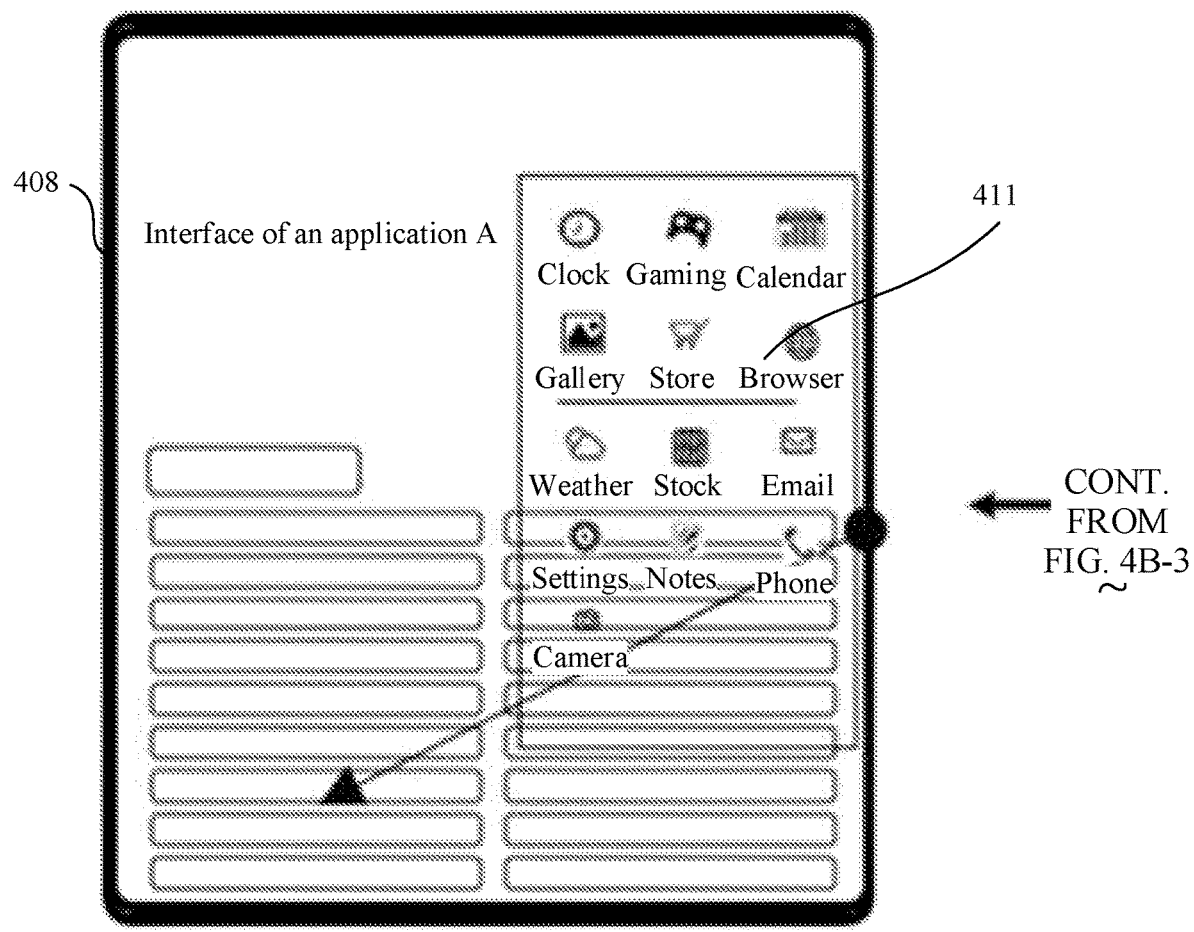

FIG. 4A and FIG. 4B-1 to FIG. 4B-4 are schematic diagrams of slide gestures with different distances and corresponding functions according to an embodiment of the present invention. As shown in FIG. 4A, when the touch point of the user slides from the first point 401 to a second point 402, a straight-line distance between the second point 402 and the first point 401 is greater than or equal to the first threshold a and less than the second threshold b. Still as shown in FIG. 4B-1 to FIG. 4B-4, the display of the electronic device changes from a first state 405 to a second state 406. In the second state 406, a first identifier 409 appears on the first edge of the display of the electronic device.

The first identifier 409 shown in this embodiment of the present invention is merely an example, and the first identifier 409 may alternatively be another pattern or identifier. A location at which the first identifier 409 is displayed on the first edge may be a location at which the first point of the touch point of the user is located, or may be a central point of the first edge, or a trisection point of the first edge. The first identifier 409 may be displayed close to the first edge, or may be displayed at a specific distance from the first edge. A location, a size, and content of the first identifier 409 are not limited in this embodiment of the present invention.

S104: The electronic device displays a second interface on the display in response to the fact that the touch point of the user leaves the display when the first slide gesture goes to the second point.

The second interface is an interface previous to the first interface, that is, the first identifier is used to indicate that if the touch point of the user leaves the display when the first slide gesture goes to the second point, the electronic device displays, on the display, the second interface different from the first interface, where the second interface is the interface previous to the first interface. To be specific, when the first identifier 409 appears on the first edge of the display of the electronic device, if the touch point of the user leaves the second point 402 on the display at this time, in response to the leaving of the touch point of the user, the electronic device may perform an operation of returning to a previous-level application.

When the first interface is a main menu interface, the electronic device cannot perform the operation of returning to a previous-level application.

S105: The electronic device receives a second slide gesture entered by the user. The second slide gesture goes from the first point to the second point.

Still as shown in FIG. 4A, when the touch point of the user slides from the first point 401 to the second point 402, the foregoing S104 and S105 indicate that if the touch point of the user leaves the display at the second point 402, the user needs to perform a slide gesture operation again.

The first point and the second point of the second slide gesture in S105 and the first point and the second point of the first slide gesture in S102 may respectively be two same points on the display of the electronic device, or may respectively be two different points on the display of the electronic device.

S106: The electronic device displays the first identifier on the first edge in response to the second slide gesture.

S107: The electronic device receives a third slide gesture entered by the user.

The third slide gesture goes from the second point to a third point, the third point is on the display, and a straight-line distance between the third point and the first point is greater than the second threshold and less than the third threshold. In processes of performing the second slide gesture and the third slide gesture, the touch point of the user does not leave the display. Still refer to the content shown in FIG. 4A. In this embodiment of the present invention, the third slide gesture goes from the second point 402 to a third point 403.

Still refer to FIG. 4A. In processes of performing the first slide gesture, the second slide gesture, and the third slide gesture, namely, in processes in which the touch point of the user slides from the first point 401 to another point, if the sliding distance of the touch point of the user reaches the first threshold point a, the second threshold point b, or the third threshold point c, the electronic device generates a feedback prompt. The feedback prompt may include any one or a combination of a vibration feedback prompt, a sound feedback prompt, a voice feedback prompt, and an image feedback prompt. For example, the vibration feedback prompt may be a transient body vibration generated by the electronic device, to prompt the user that the sliding distance of the touch point of the user has reached the first threshold a. The sound feedback prompt may be a sound emitted by the electronic device through a loudspeaker. Similarly, the voice feedback prompt may be a voice broadcast. For example, the loudspeaker of the electronic device plays a prompt "You have slid to the first threshold". The image feedback prompt may be a prompt, on the display of the electronic device in a form of an icon or a ruler, to the user that the touch point has slid to a point. The feedback prompt may alternatively be a combination of the foregoing several prompts. For example, when the distance that the touch point of the user slides from the first point 401 reaches the first threshold a, the electronic device generates a sound feedback prompt while providing a vibration feedback for the user. Certainly, it may be understood that the feedback prompt provided in this embodiment of the present invention is merely an example, and the feedback prompt may further include another manner and a combination of other manners.

S108: The electronic device displays a first application bar on the first edge in response to the third slide gesture.

Still refer to FIG. 4A and FIG. 4B-1 to FIG. 4B-4. The third slide gesture is that the touch point of the user slides from the second point 402 to the third point 403, and a straight-line distance between the third point 403 and the first point 401 is greater than or equal to the second threshold b and less than the third threshold c. Correspondingly, as shown in FIG. 4B-1 to FIG. 4B-4, in this case, the display of the electronic device changes from the second state 406 to a third state 407. In the second state 407, the first application bar 410 is displayed on the first edge of the display of the electronic device.

The first application bar 410 includes N1 application icons, and N1 is a positive integer. The N1 application icons may be icons of applications or functions built in an operating system of the electronic device, or the N1 application icons may be icons of third-party applications or functions installed in the electronic device, or even the N1 application icons may be shortcut icons of network links, electronic document shortcuts, multimedia files, and the like. Properties of the N1 application icons are not limited in this embodiment of the present invention.

Figure 5:
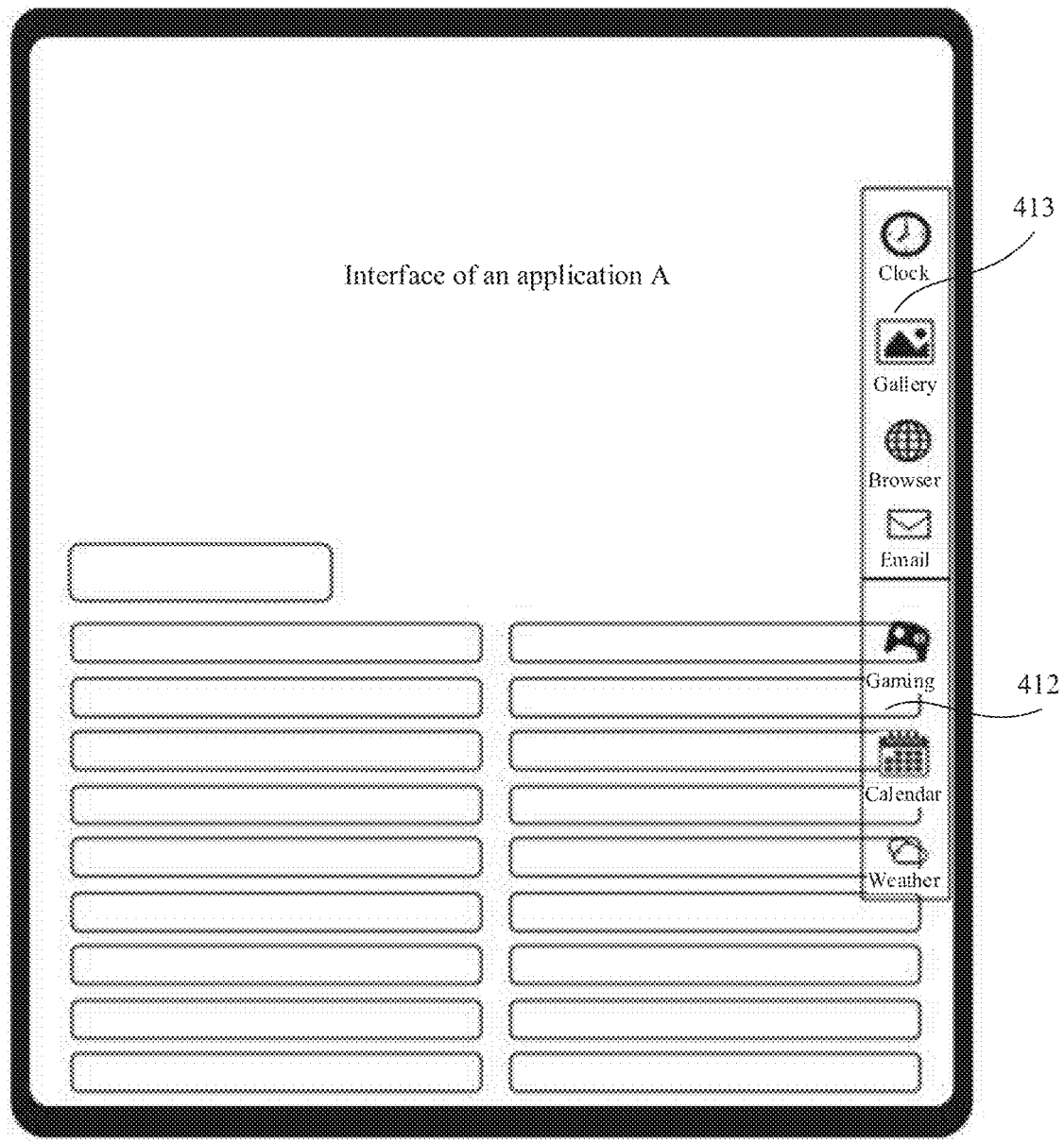
FIG. 5 is a schematic diagram of a first application bar according to an embodiment of the present invention.

FIG. 5 is a schematic diagram of a first application bar according to an embodiment of the present invention. As shown in FIG. 5, the first application bar includes a first area 412 and a second area 413. Further, the first area 412 and the second area 413 include different application types. The first area 412 includes a first-type application icon, and the second area 413 includes a second-type application icon. The first-type application icon is a list of application or function icons that is generated by the operating system of the electronic device based on a state of an application or a function recently used by the user. The first-type application icon may be also sorted in a form of a first sequence. A sorting rule followed by the first sequence may include any one or a combination of use duration, use frequency, and use date of the user within a second duration threshold. For example, based on states of applications used by the user in a most recent month, the system places an application with a long use duration at a location in the front of the first sequence, and places an application with a short use duration at a location in the rear of the first sequence. Alternatively, for example, the system may, according to both the use duration and the use date, place an application with a long use duration and a closest use date at a location in the front of the first sequence, and place an application with a short use duration and a farther use date at a location in the rear of the first sequence. It should be noted that the second duration threshold is not limited to the most recent month, and may be a most recent week, a most recent year, a most recent quarter (three months), or the like. This is not limited in this embodiment of the present invention. In addition, it may be understood that the sorting rule is not limited to the use duration, the use frequency, and the use date, and may further include another sorting rule. A quantity of the first-type application icons should be a positive integer, and may be 1, 2, or more.

The second-type application icon includes an application icon associated with the first application and an application icon manually added by the user. The first application is an application corresponding to the first interface currently displayed on the display of the electronic device. For example, the electronic device of the user currently opens an interface of a Taobao shopping application, and the first application herein is the Taobao shopping application. Further, the application associated with the first application is an application that has a logical mapping relationship with the first application. For example, when the first application is a Taobao shopping application, the application associated with the first application may be a Jingdong shopping application, an Amazon shopping application, another shopping application that has a similar property to the Taobao shopping application, or the like. Alternatively, because there is a logical relationship between shopping and payment, the application associated with the first application may be an Alipay application, a UnionPay payment application, or the like. It should be further noted that the foregoing applications associated with the first application are automatically determined by using an algorithm, and the principle of the algorithm is not limited in this embodiment of the present invention.

Figure 6:
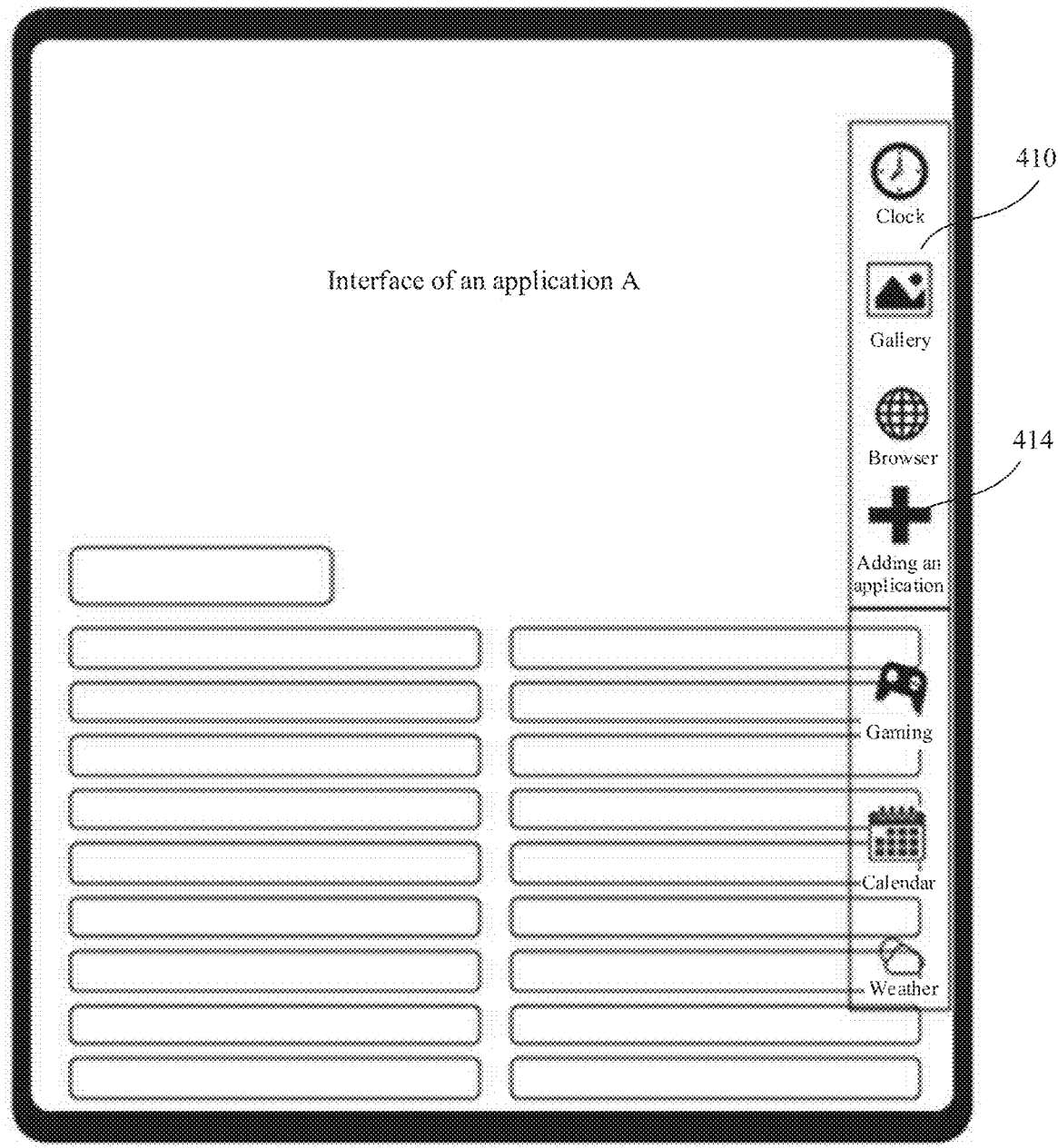
FIG. 6 is a schematic diagram of an application adding button of a first application bar according to an embodiment of the present invention.
Figure 7:
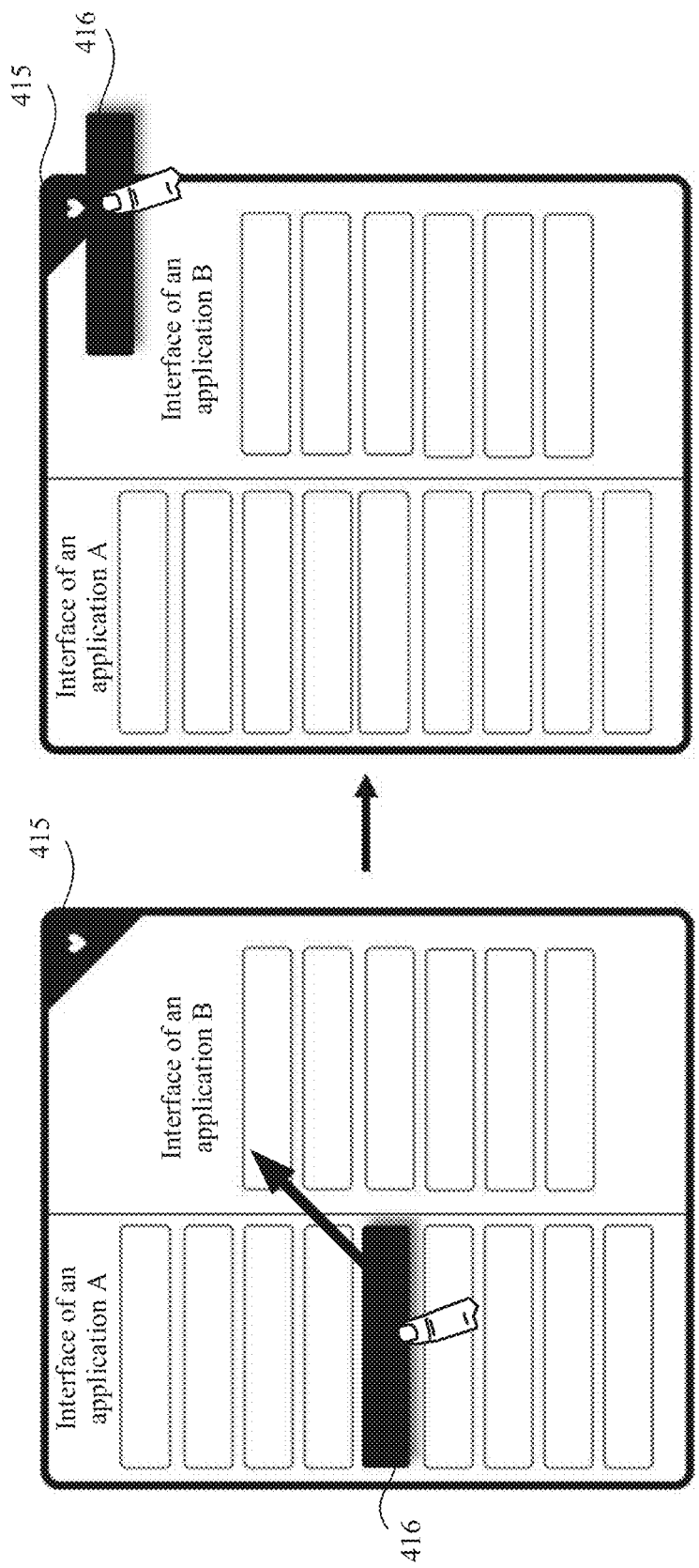
FIG. 7 is a schematic diagram of an application favorites area of a first application bar according to an embodiment of the present invention.

Literally, the application icon manually added by the user is an application icon manually added by the user. A manner of manual adding by the user includes: system settings, an add button in the first application bar, or a favorites area in the application bar. A manner of the system settings is: The user adds a to-be-added application icon to the first application bar in a manner of setting content of the first application bar in a system menu. FIG. 6 is a schematic diagram of an application adding button of a first application bar according to an embodiment of the present invention. As shown in FIG. 6, the second application bar 410 includes an application adding button 414. A specific adding manner is: The user taps the application adding button 414 in the second application bar 410. In response to the tap operation of the user, the display of the electronic device displays a selection menu or list for the user to select and add an application. After the user selects an application icon that needs to be added, the selected application icon appears in the second area of the first application bar. FIG. 7 is a schematic diagram of an application favorites area of a first application bar according to an embodiment of the present invention. As shown in FIG. 7, a favorites area 415 and a selection content 416 are included. In this embodiment of the present invention, a manner of adding an application icon to the favorites area is as follows: After the user selects the selection content 416, the favorites area 415 of the first application bar appears on the display of the electronic device; and after the user drags the selection content 416 to the favorites area 415, an application A corresponding to the selection content 416 is added to the second area of the first application bar. It may be understood that, in other embodiments of the present invention, there may be another manner of manual adding by the user. The foregoing is merely an example, and does not constitute a limitation on the manner of manual adding by the user.

S109: The electronic device receives a fourth slide gesture entered by the user.

Still refer to FIG. 4A and FIG. 4B-1 to FIG. 4B-4. The fourth slide gesture goes from the third point 403 to a fourth point 404, the fourth point 404 is on the display, and a straight-line distance between the fourth point 404 and the first point 401 is greater than the third threshold c. In processes of performing the third slide gesture and the fourth slide gesture, the touch point of the user does not leave the display.

Figure 8:
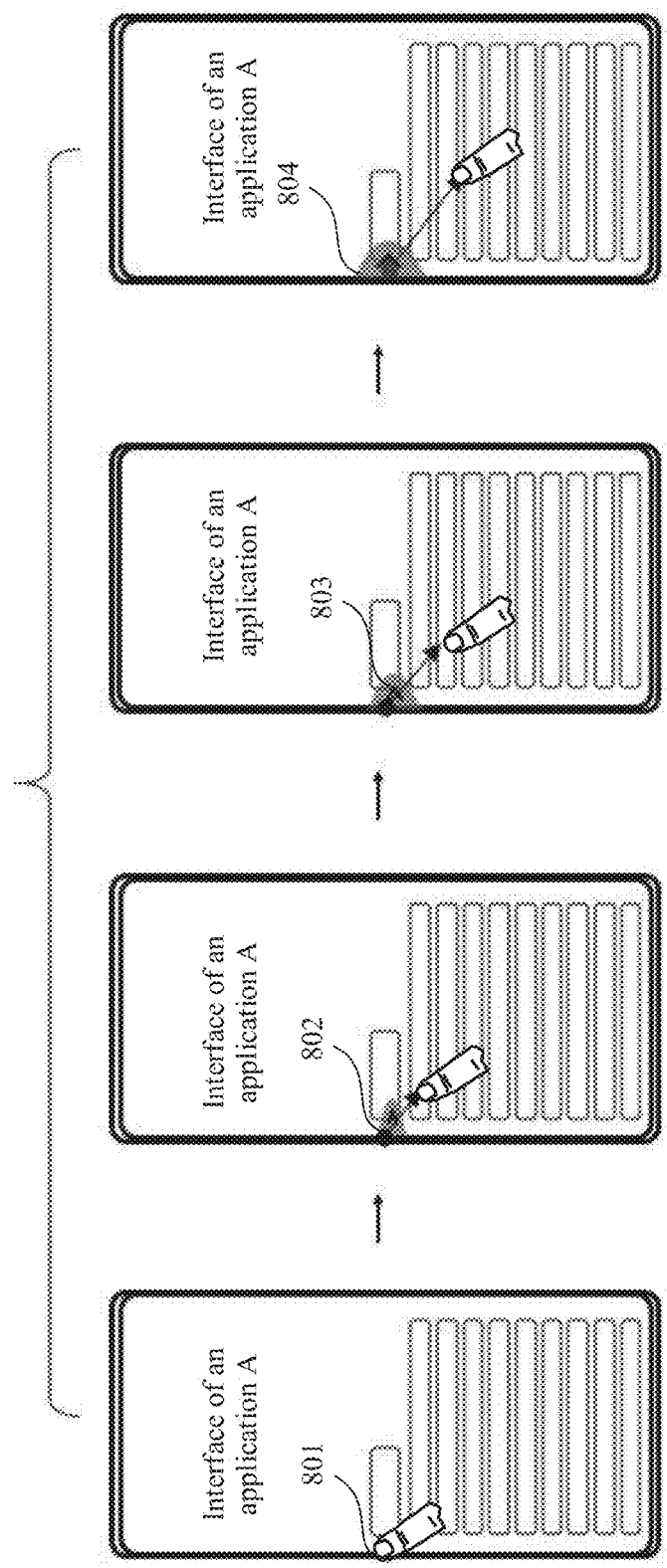
FIG. 8 is a schematic diagram of a visual transition effect according to an embodiment of the present invention.
Figure 9A:
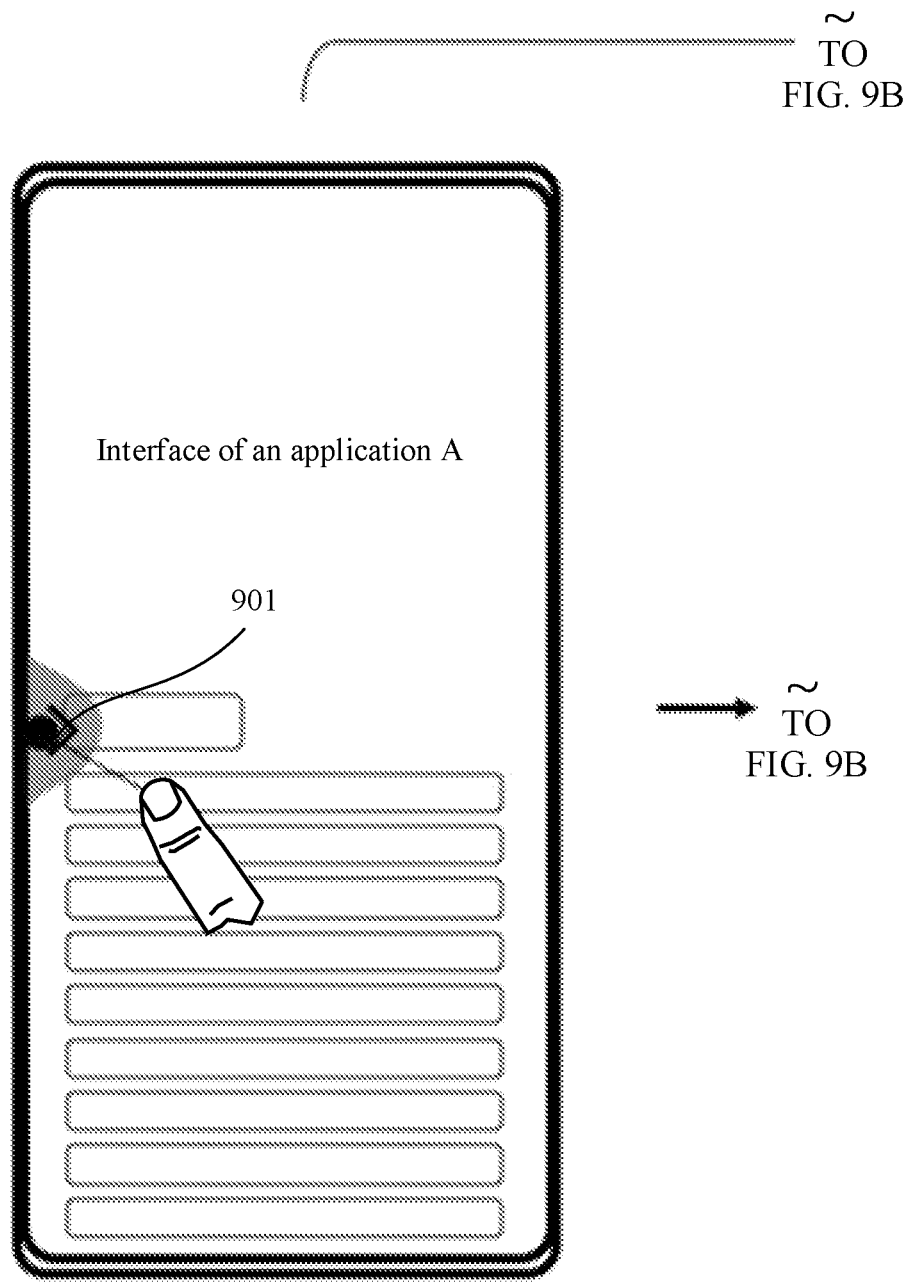
FIG. 9A to FIG. 9D are a schematic diagram of another visual transition effect according to an embodiment of the present invention.
Figure 9B:
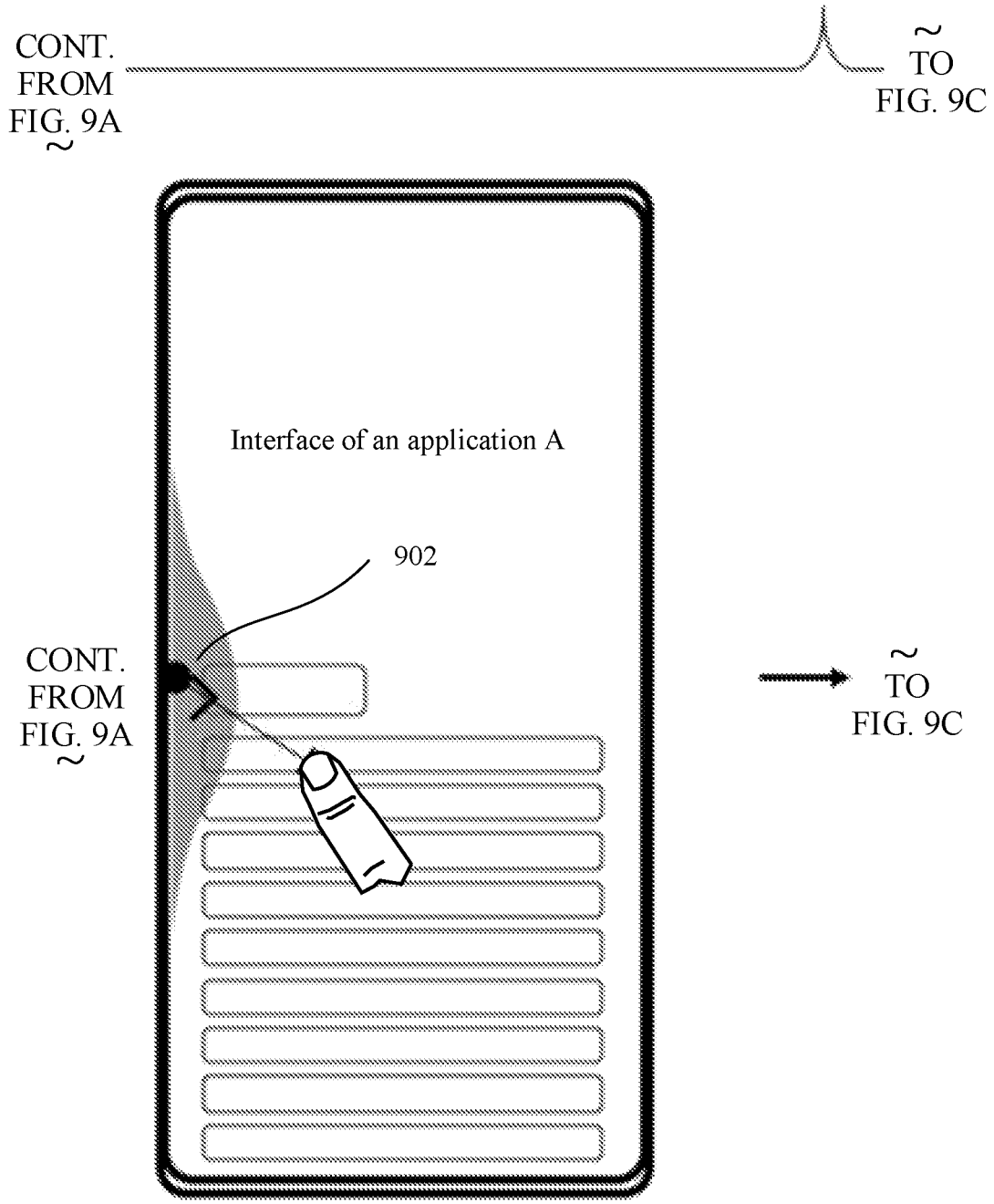
Figure 9C:
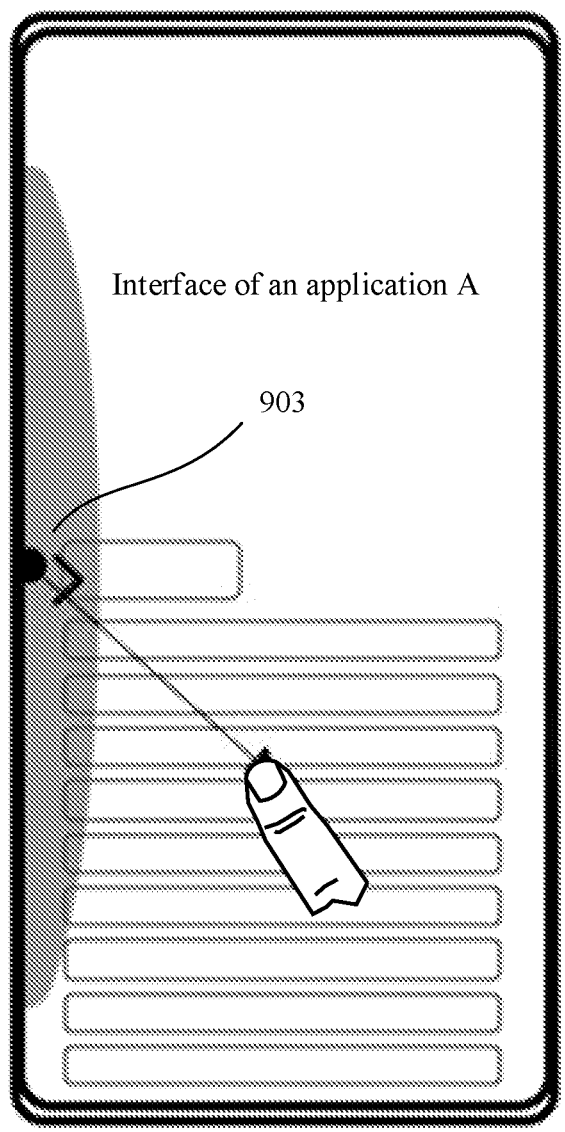
Figure 9D:
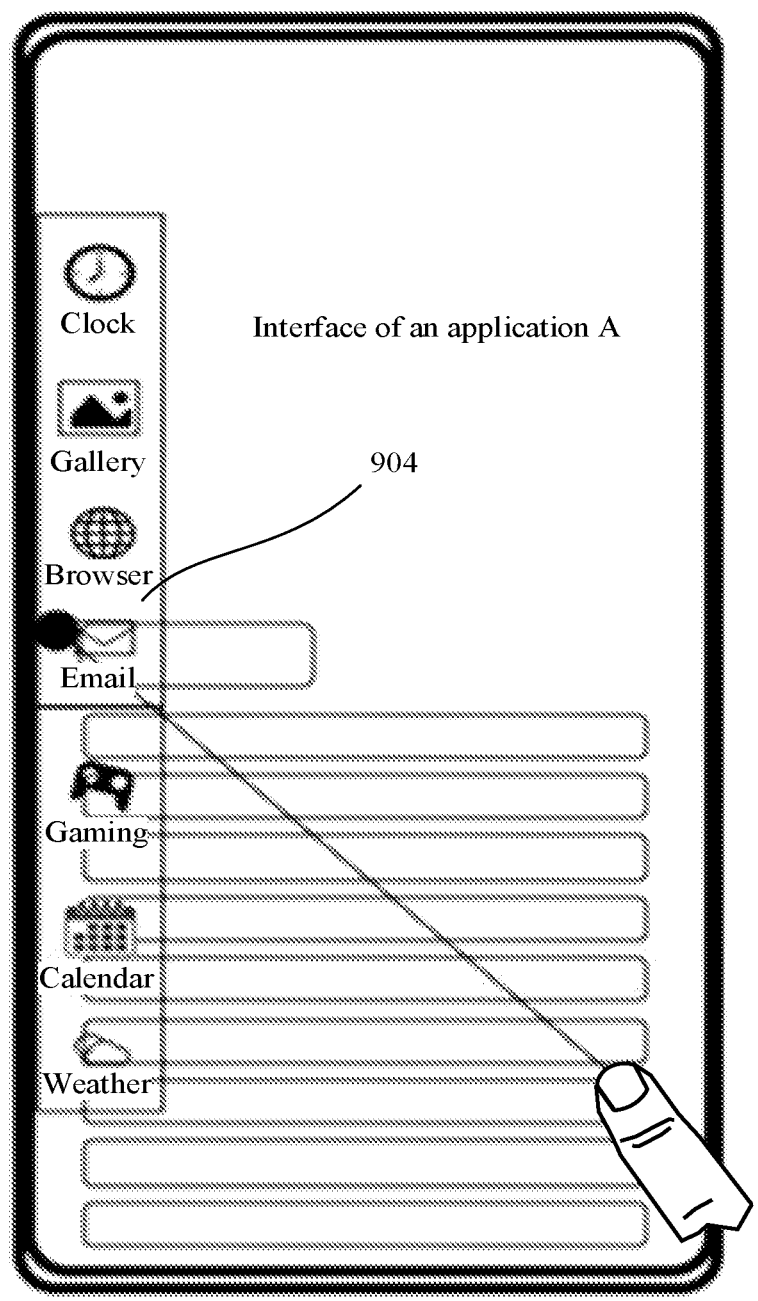
Figure 10:
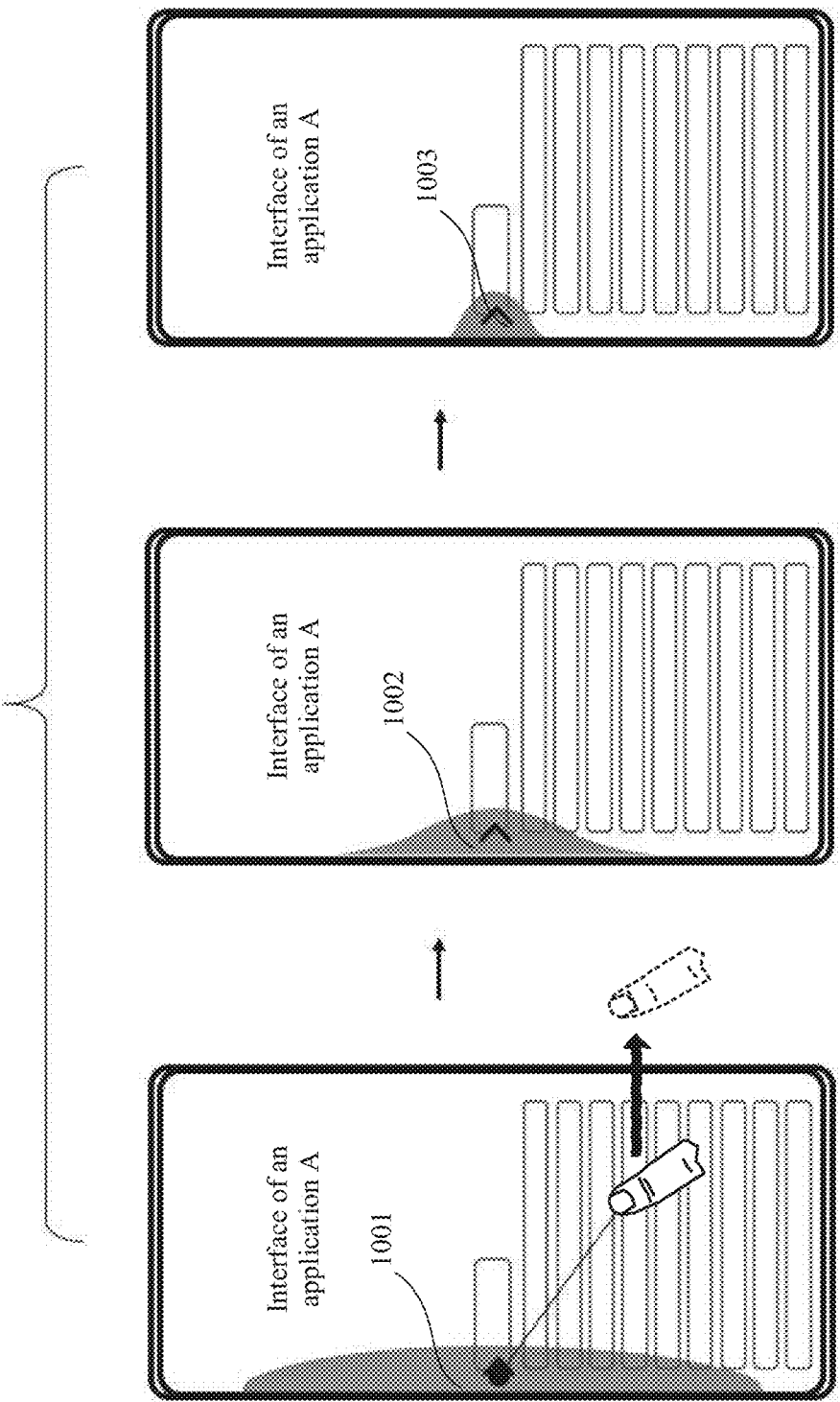
FIG. 10 is a schematic diagram of still another visual transition effect according to an embodiment of the present invention.

In this embodiment of the present invention, a visual transition method is added to the processes of performing the first slide gesture, the second slide gesture, and the third slide gesture, to prompt a sliding distance of the touch point of the user. Specifically, as shown in FIG. 4A, in the process of performing the first slide gesture, namely, in a process in which the touch point of the user slides from the first point 401 to the second point 402, when the straight-line distance between the second point 402 and the first point 401 is equal to the first threshold a, the electronic device displays the first identifier on the first edge of the display. However, in a previous process in which the touch point of the user slides, the electronic device displays a first visual element on the first edge of the display, and content displayed by the electronic device on the first edge of the display gradually changes from the first visual element to the first identifier as the touch point of the user slides. FIG. 8 is a schematic diagram of a visual transition effect according to an embodiment of the present invention. As shown in FIG. 8, it can be learned that, in a process in which the touch point of the user slides on the display, content displayed by the electronic device on the first edge of the display also changes accordingly, and gradually changes from a first visual element 801 to an $M1^{st}$ visual element 802. Then, the $M1^{st}$ visual element 802 gradually becomes an $M2^{nd}$ visual element 803, and finally becomes the first identifier 804. More visual elements may be included in a process of changing the first visual element into the first identifier. FIG. 8 in this embodiment is merely an example for description. As shown in FIG. 4A, in the second slide gesture, namely, in a process in which the touch point of the user slides from the second point 402 to the third point 403, when a straight-line distance between the third point 403 and the first point 401 is equal to the first threshold b, the electronic device displays the first application bar on the first edge of the display. However, in a previous process in which the touch point of the user slides, the electronic device displays an $M3^{rd}$ visual element on the first edge of the display, and content displayed by the electronic device on the first edge of the display gradually changes from the $M3^{rd}$ visual element to the first application bar as the touch point of the user slides. FIG. 9A to FIG. 9D are a schematic diagram of another visual transition effect according to an embodiment of the present invention. As shown in FIG. 9A to FIG. 9D, it can be learned that, in a process in which the touch point of the user slides on the display, content displayed by the electronic device on the first edge of the display also changes accordingly, and gradually changes from the $M3^{rd}$ visual element 901 to an $M4^{th}$ visual element 902. Then, the $M4^{th}$ visual element 902 gradually becomes an $M5^{th}$ visual element 903, and finally becomes the first application bar 904. More visual elements may be further included in a process of changing the $M3^{rd}$ visual element into the first application bar. FIG. 9A to FIG. 9D in this embodiment are merely an example for description. FIG. 10 is a schematic diagram of another visual transition effect according to an embodiment of the present invention. As shown in FIG. 10, when the touch point of the user leaves the display before a next function is implemented, a rollback effect is also generated.

The foregoing is merely an example for describing a visual transition effect in a sliding process. It may be understood that a visual transition effect exists in the entire sliding process of the first slide gesture from the first point to the fourth point. In the sliding process of the touch point of the user, the content displayed by the electronic device on the first edge of the display gradually changes from the first visual element to the first identifier, gradually changes from the first identifier to the first application bar, and then gradually changes from the first application bar to a second application bar.

S110: The electronic device displays the second application bar on the first edge in response to the fourth slide gesture. The second application bar includes N2 application icons, N2 is a positive integer, and N2 is greater than N1.

The N2 application icons include the N1 application icons. In other words, a quantity of application icons in the second application bar is greater than that of application icons in the first application bar, and the second application bar may be considered as an extension of the first application bar. The quantity of application icons in the first application bar may also be equal to that of application icons in the second application bar. In an implementation of this embodiment of the present invention, the second application bar appears directly after the third slide gesture is completed. Still refer to FIG. 4A. The third slide gesture is that the touch point of the user slides from the third point 403 to the fourth point 404, and a straight-line distance between the fourth point 404 and the first point 401 is greater than or equal to the third threshold c. Correspondingly, as shown in FIG. 4B-1 to FIG. 4B-4, in this case, the display of the electronic device changes from the third state 407 to a fourth state 408. In the fourth state 408, the second application bar 411 is displayed on the first edge of the display of the electronic device.

An area of the second application bar displayed on the display of the electronic device is greater than that of the first application bar. In this way, the second application bar may be considered as an extension of the first application bar.

Figure 11:
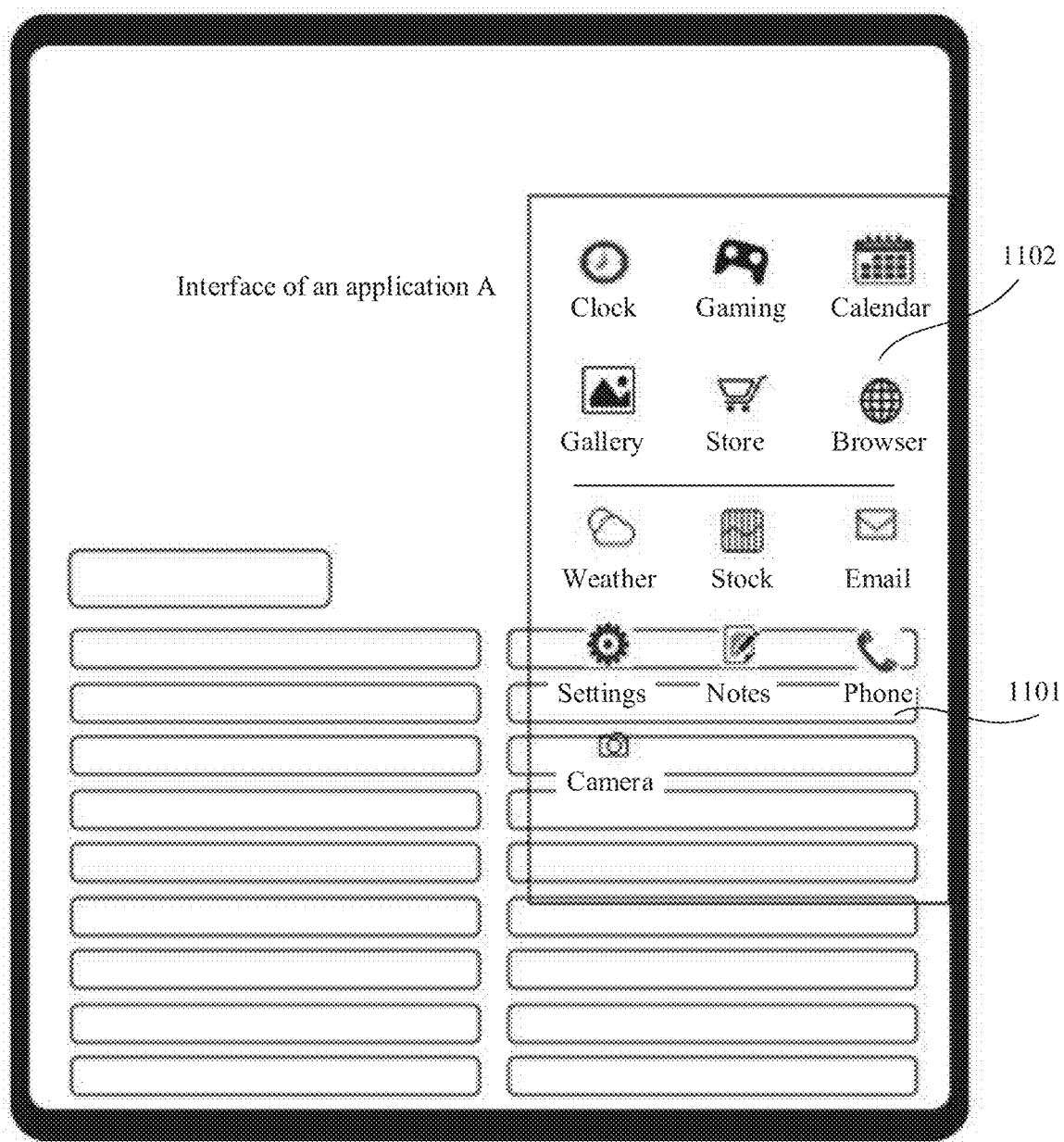
FIG. 11 is a schematic diagram of a second application bar according to an embodiment of the present invention.

FIG. 11 is a schematic diagram of a second application bar according to an embodiment of the present invention. Refer to FIG. 11. The second application bar includes a first area 1101 and a second area 1102. Similar to the first application bar, the N2 application icons included in the second application bar 411 may be icons of applications or functions built in the operating system of the electronic device, or the N2 application icons may be icons of third-party applications or functions installed in the electronic device, or even the N2 application icons may be icons of network links, electronic document shortcuts, multimedia files, and the like. Properties of the N2 application icons are not limited in this embodiment of the present invention. Further, the first area 1101 and the second area 1102 in the second application bar include different application types. The first area 1101 includes a first-type application icon, and the second area 1102 includes a second-type application icon. It should be noted that content such as a generation manner, a sorting principle, and an adding manner of the first-type application icon and the second-type application icon in the second application bar is consistent with that in the first application bar, and is explained with reference to the foregoing content. Details are not described again.

Figure 12A:
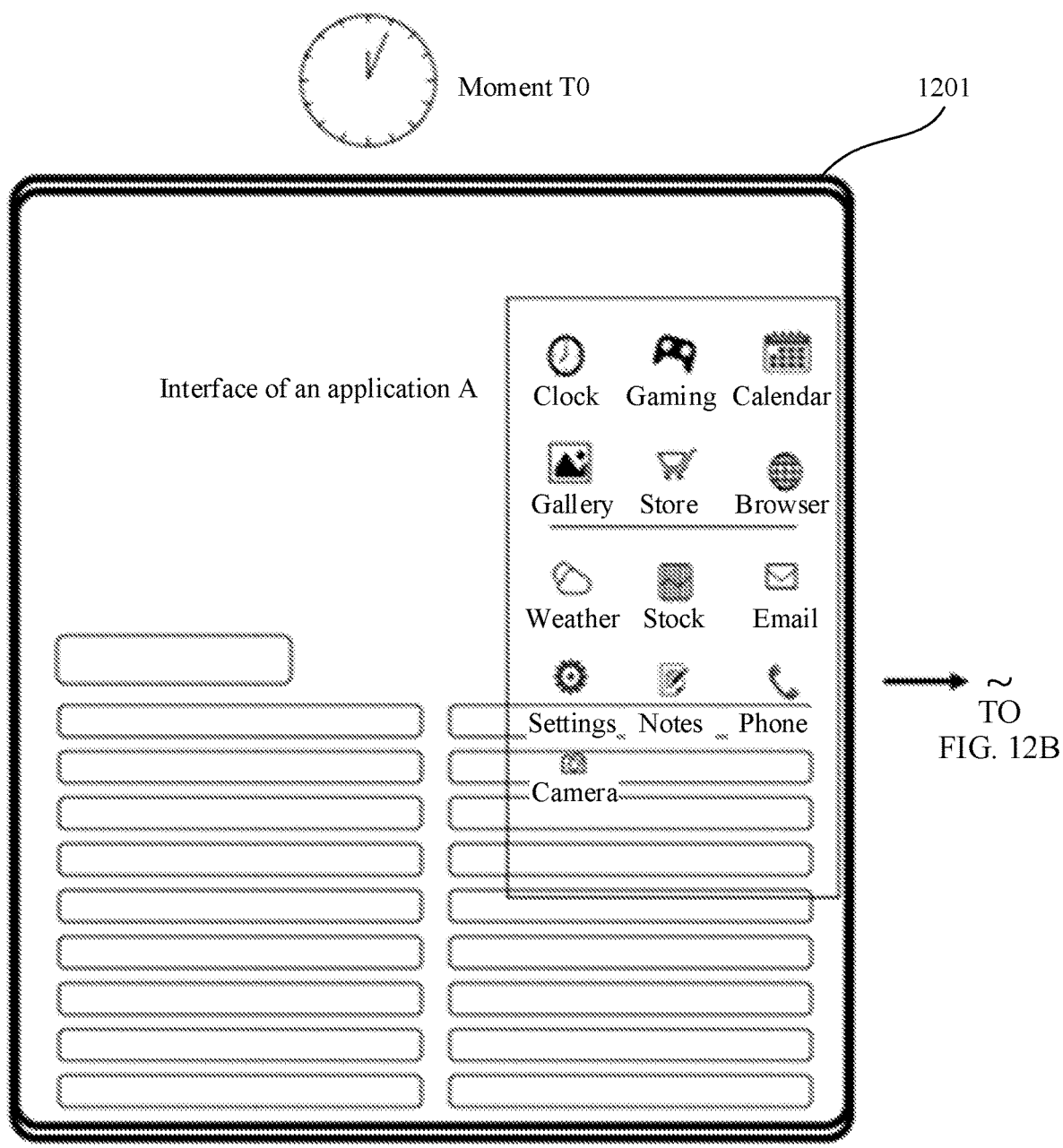
FIG. 12A and FIG. 12B are a schematic diagram of automatic hiding of a second application bar according to an embodiment of the present invention.
Figure 12B:
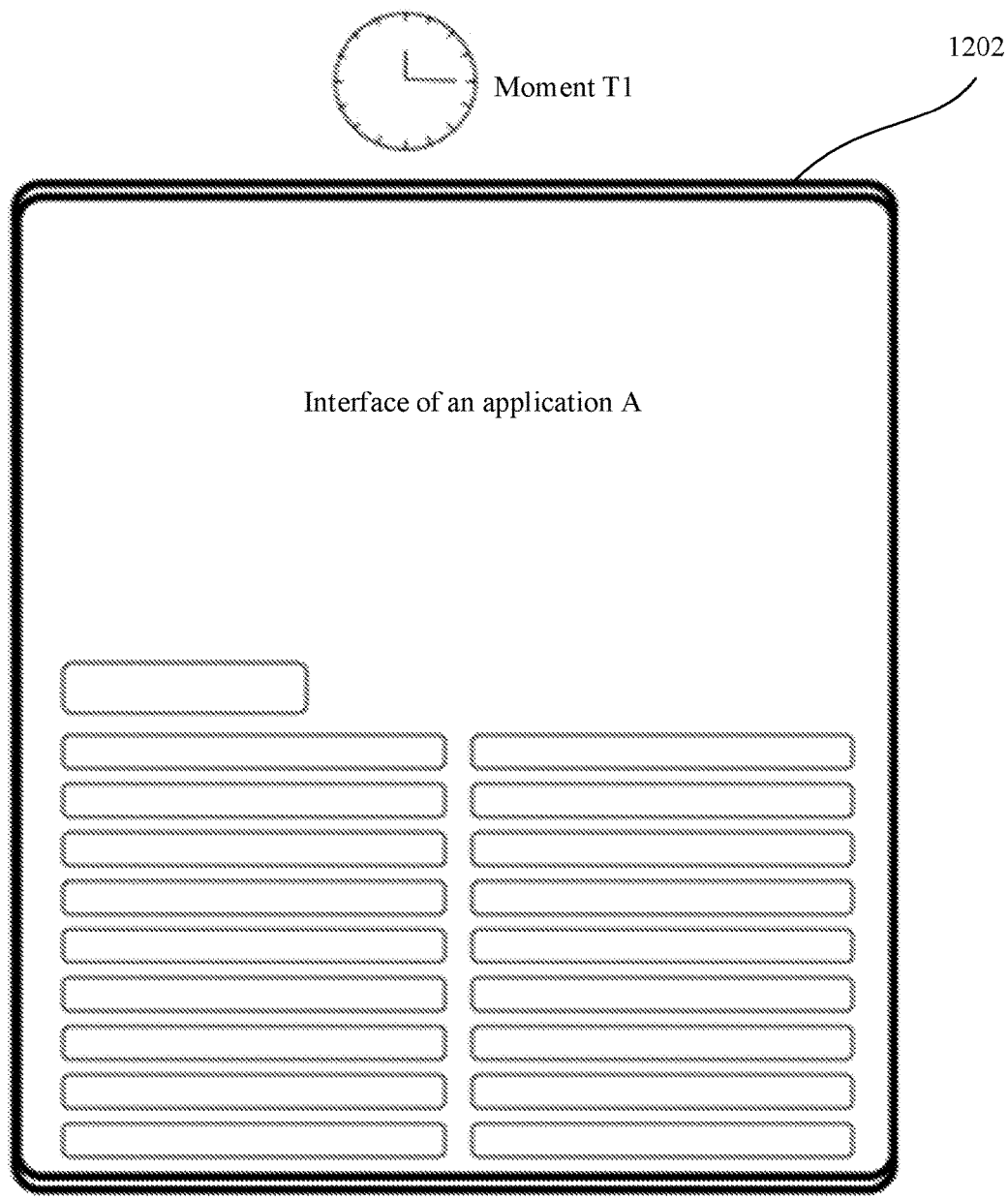

When the second application bar is displayed on the first edge of the display of the electronic device, and when the electronic device detects no operation on the second application bar within a first duration threshold, the electronic device does not display the second application bar on the first edge of the display. FIG. 12A and FIG. 12B are a schematic diagram of automatic hiding of a second application bar according to an embodiment of the present invention. As shown in FIG. 12A and FIG. 12B, at a moment T0, the second application bar is displayed on the first edge of the display of the electronic device, and in this case, the second application bar is in a first state 1201. In a time interval from T0 to T1, the electronic device detects no operation entered on the second application bar, and the electronic device does not display the second application bar on the first edge of the display. In this case, the second application bar is in a second state 1201. In another implementation of this embodiment of the present invention, in a time interval from T0 to T1, if the electronic device detects no operation entered on the second application bar, the electronic device may further display, on the first edge of the display, the second application bar with reduced transparency. Alternatively, in another implementation of this embodiment of the present invention, in a time interval from T0 to T1, if the electronic device detects no operation entered on the second application bar, the electronic device may alternatively display another identifier on the first edge of the display. This is not limited in this embodiment of the present invention. It should be noted that the foregoing scenario is also applicable to the first application bar. For example, when the first application is displayed on the first edge of the display of the electronic device, and when the electronic device detects no operation on the first application bar within the first duration threshold, the electronic device does not display the first application bar on the first edge of the display, or displays the first application bar with reduced transparency on the first edge of the display, or displays another identifier on the first edge of the display.

When the second application bar is displayed on the first edge of the display of the electronic device, the second slide gesture performed by the user on the second application bar may change content displayed in the second application bar, that is, an application icon that is not displayed may be displayed through slide gestures of the user in the first area and the second area of the second application bar. The second slide gesture may include up and down sliding in the first area and the second area in the second application bar, and may also include left and right sliding in the first area and the second area, provided that a sliding distance is greater than a preset threshold. It can be understood that, the foregoing method for changing, by using a slide gesture, content displayed in the second application bar is also applicable to the first application bar, and details are not described herein again.

In an implementation, after the electronic device displays the first application bar on the first edge, the method further includes: The electronic device receives a first operation performed by the user on a first application icon in the first application bar, where the first operation includes any one of a tap operation, a touch and hold operation, and a drag operation; and in response to the first tap operation, the electronic device displays a third interface over the first interface in a floating window form, or simultaneously displays the first interface and a third interface on the display in a split screen form, where the third interface is an application interface corresponding to the first application icon. In an implementation, after the electronic device displays the third interface over the first interface in a floating window form, the method further includes: The electronic device receives a second operation performed by the user on the third interface, where the second operation includes any one of a tap operation, a touch and hold operation, and a drag operation; and in response to the second operation, the electronic device simultaneously displays the first interface and the third interface on the display in a split screen form. In an implementation, after the electronic device simultaneously displays the first interface and the third interface on the display in a split screen form, the method further includes: The electronic device receives a third operation performed by the user on the third interface, where the third operation includes any one or a combination of a tap operation, a touch and hold operation, and a drag operation; and in response to the third operation, the electronic device displays the third interface over the first interface in a floating window form.

Figure 13A:
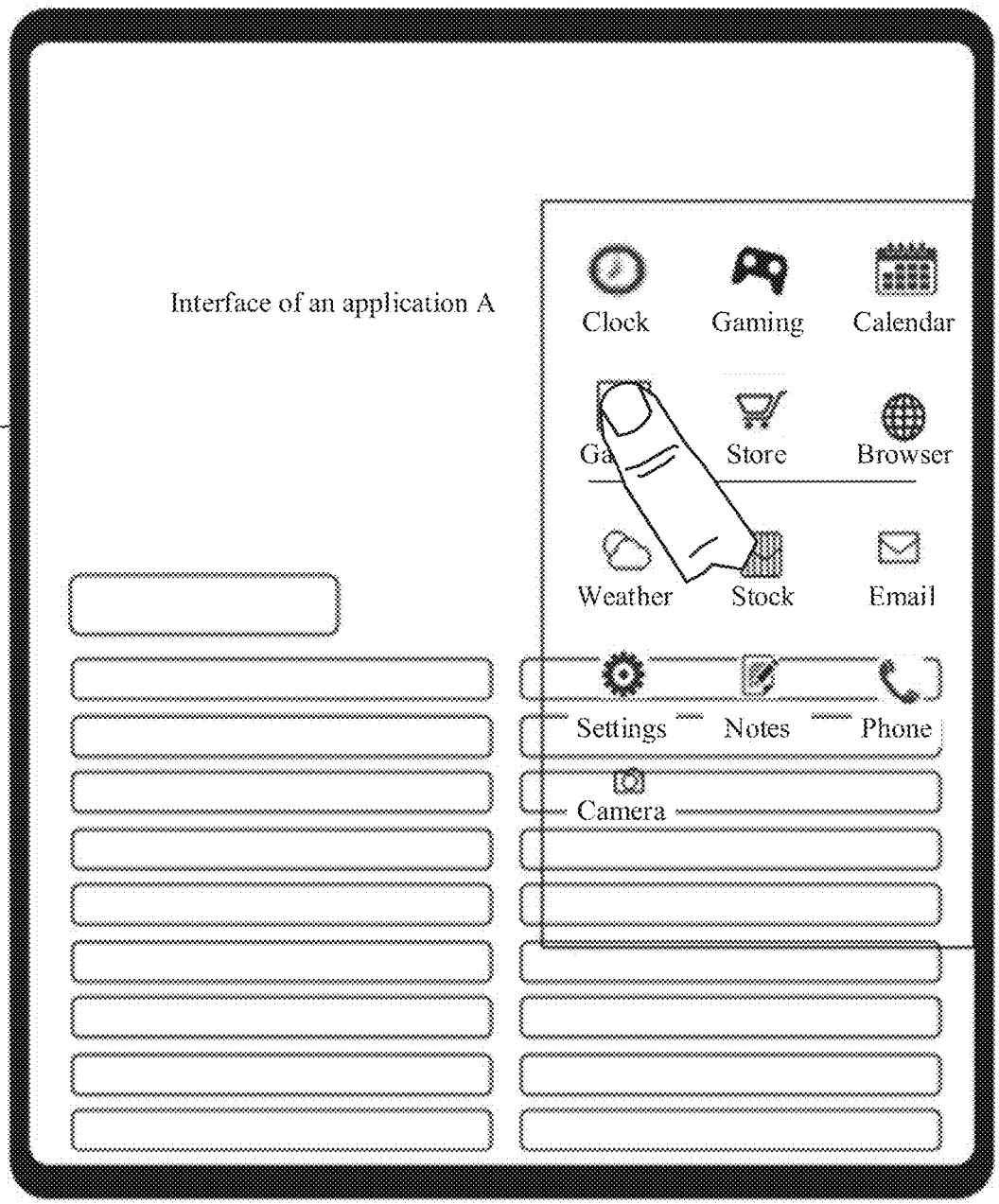
FIG. 13A to FIG. 13D are schematic diagrams of interaction of a second application bar according to an embodiment of the present invention.
Figure 13B:
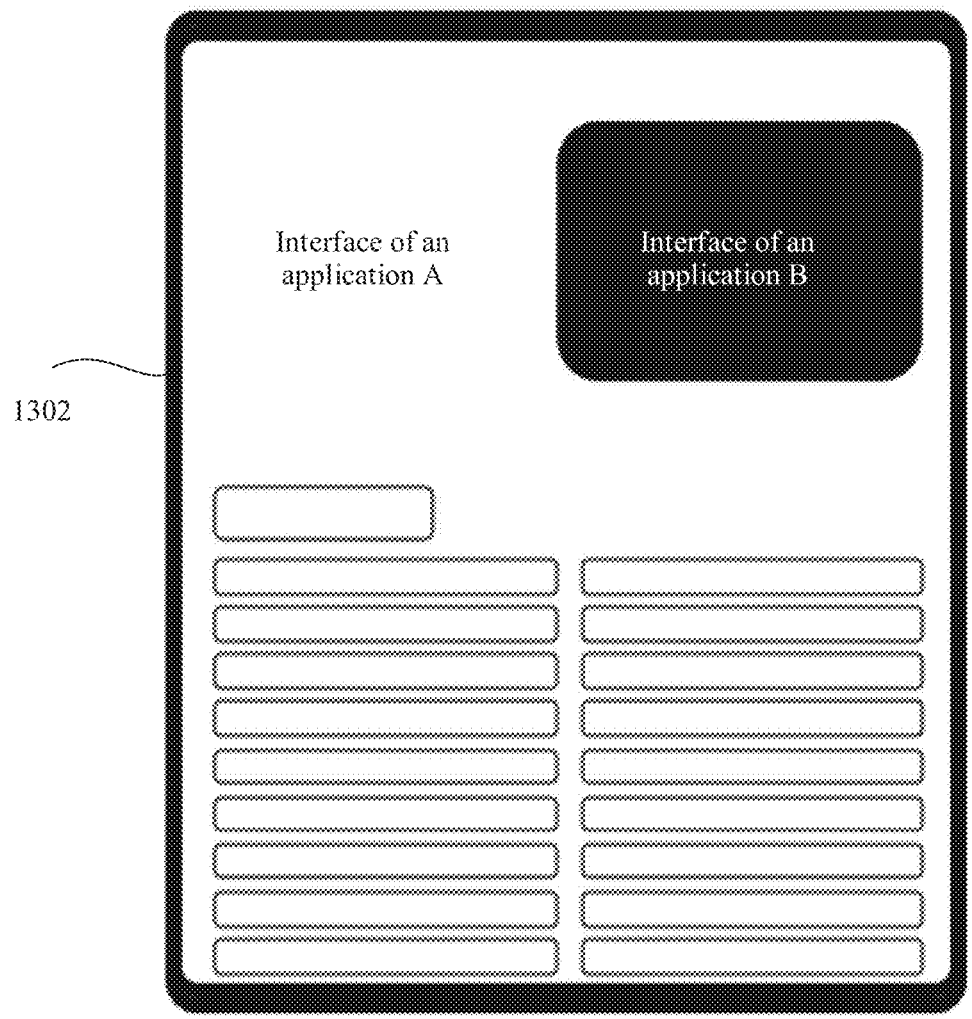
Figure 13C:
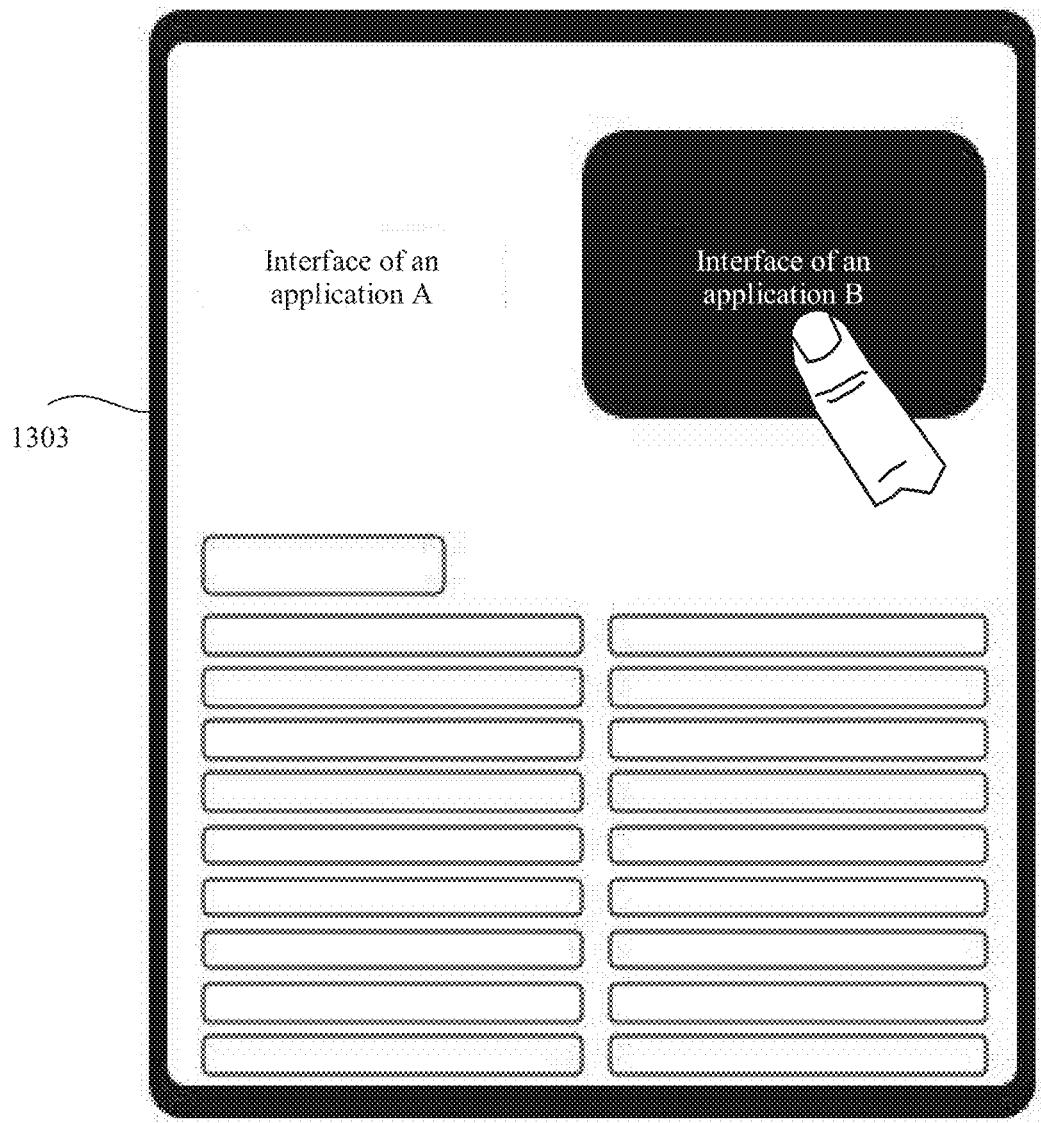

FIG. 13A to FIG. 13D are schematic diagrams of interaction of a second application bar according to an embodiment of the present invention. As shown in FIG. 13A and FIG. 13B, the display of the electronic device displays an interface of an application A, the second application bar is displayed on the first edge of the display of the electronic device, and the electronic device shown in FIG. 13A is a fifth state 1301. When the user performs a tap operation on an application B in the second application bar, in response to the tap operation of the user on the application B in the second application bar, the electronic device displays the interface of the application A on the display, and displays an interface of the application B over the interface of the application A in a floating window form. As shown in FIG.

Figure 13D:
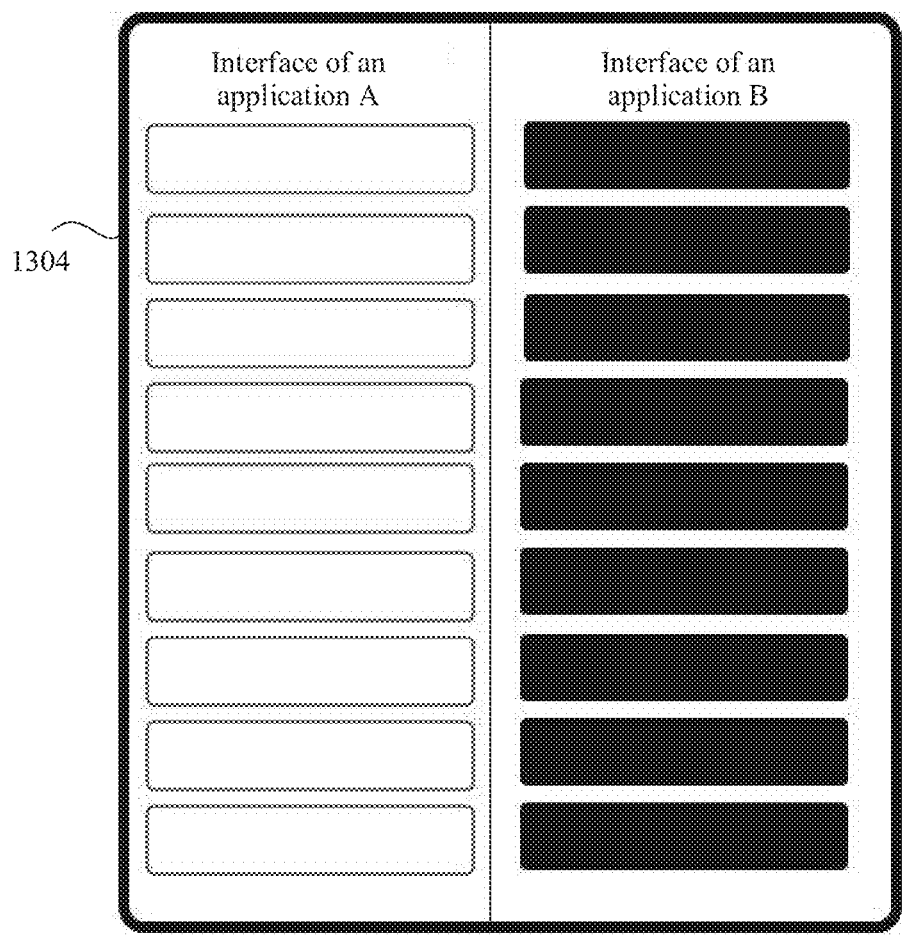
Figure 14:
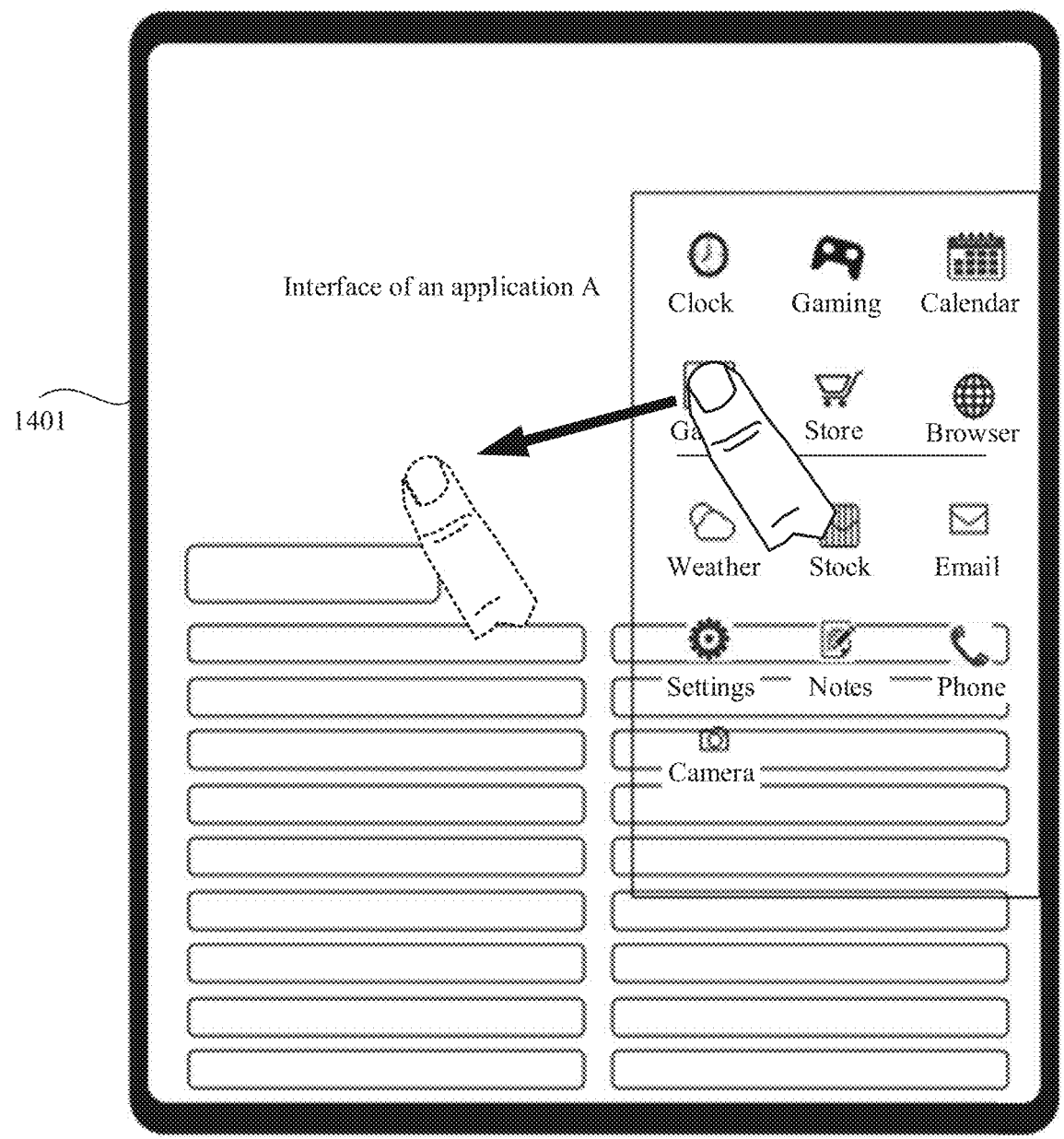
FIG. 14 is a schematic diagram of another type of interaction of a second application bar according to an embodiment of the present invention.

13C and FIG. 13D, when the electronic device displays the interface of the application A on the display and displays the interface of the application B over the interface of the application A in a form of a floating window, and the user touches and holds the floating-window-form interface of the application B for more than the second duration threshold, the display of the electronic device simultaneously displays the interface of the application A and the interface of the application B in a split screen form in response to the touch and hold operation performed by the user on the floating-window-form interface of the application B. FIG. 14 is a schematic diagram of another type of interaction of a second application bar according to an embodiment of the present invention. As shown in FIG. 14, when the display of the electronic device displays the second application bar, the user performs a drag operation on an application B in the second application bar. In response to the drag operation, the display of the electronic device simultaneously displays an interface of an application A and an interface of the application B in a split screen form. For a state of displaying in a split screen form, refer to FIG. 13D. The drag operation is an operation that the user drags an icon of the application B to the displayed interface of the application A after the user selects the icon of the application B. The foregoing two interaction operation methods are also applicable to the first application bar, that is, when the display of the electronic device displays the first application bar, two application interfaces may be simultaneously displayed in a floating window form or in a split screen form by performing an operation on an application icon in the first application bar.

For a specific implementation of screen splitting of the first application bar, refer to the foregoing description about the second application bar, and details are not described herein again.

Embodiment 2 of the present invention provides another application bar display method.

Figure 15:
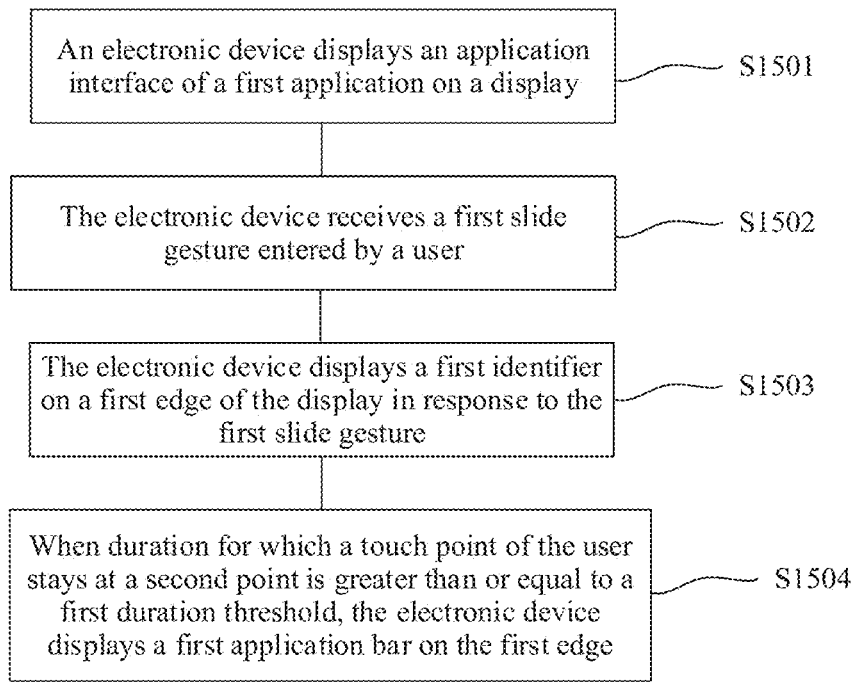
FIG. 15 is a flowchart of implementing another application bar display method according to an embodiment of the present invention.

FIG. 15 is a flowchart of implementing another application bar display method according to an embodiment of the present invention. As shown in FIG. 15, an implementation procedure of the application bar display method may include the following steps.

S1501: An electronic device displays an application interface of a first application on a display.

It should be noted that, for a definition of the application interface of the first application in Embodiment 2 of the present invention, refer to the explanation about the application interface of the first application in Embodiment 1 of the present invention, and details are not described herein again.

S1502: The electronic device receives a first slide gesture entered by a user.

The first slide gesture goes from a first point to a second point, the first point is in a first area on the display, the second point is outside the first area, and a straight-line distance between the second point and the first point is greater than a first threshold and less than a second threshold.

The term "point" mentioned in this embodiment of the present invention are all examples, and does not constitute any limitation on specific implementation of the solution.

In this embodiment of the present invention, the first slide gesture that goes from the first point to the second point may be sliding when the electronic device projects the first application interface onto the display. The first slide gesture that goes from the first point to the second point may alternatively be sliding of an air gesture that is performed by a user and that is captured by the electronic device on the display of the electronic device. It may be understood that, for slide gestures in subsequent embodiments, refer to the foregoing explanations. The slide gestures in this embodiment of the present invention are not limited to a slide gesture in which a touch point of a user is in direct contact with the display, and may further include the foregoing enumerated cases.

It should be noted that, for definitions, explanations, and functions of the first area, a position of the first point, a distance between a start point and an end point of a slide gesture, the first threshold, the second threshold, and a third threshold (to be mentioned subsequently) in Embodiment 2 of the present invention, refer to definitions, explanations, and functions of the foregoing concepts in Embodiment 1 of the present invention. Details are not described herein again.

S1503: The electronic device displays a first identifier on a first edge of the display in response to the first slide gesture.

Figure 16A:
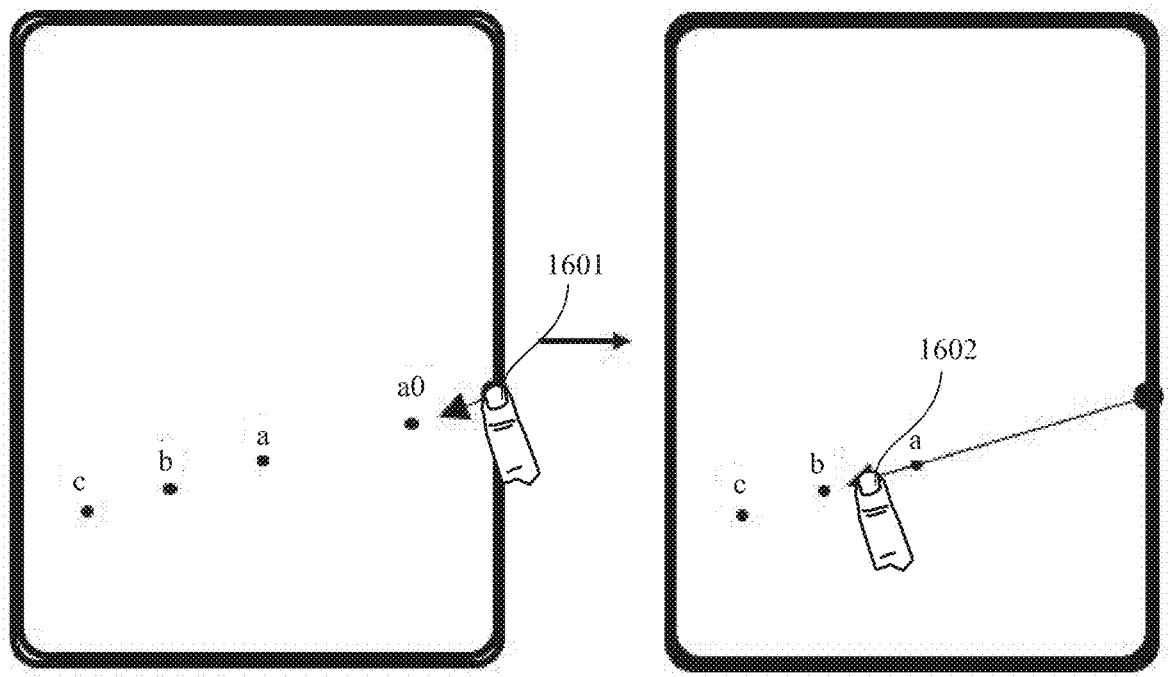
FIG. 16A and FIG. 16B are schematic diagrams of a slide-pause gesture and a corresponding function according to an embodiment of the present invention.
Figure 16B:
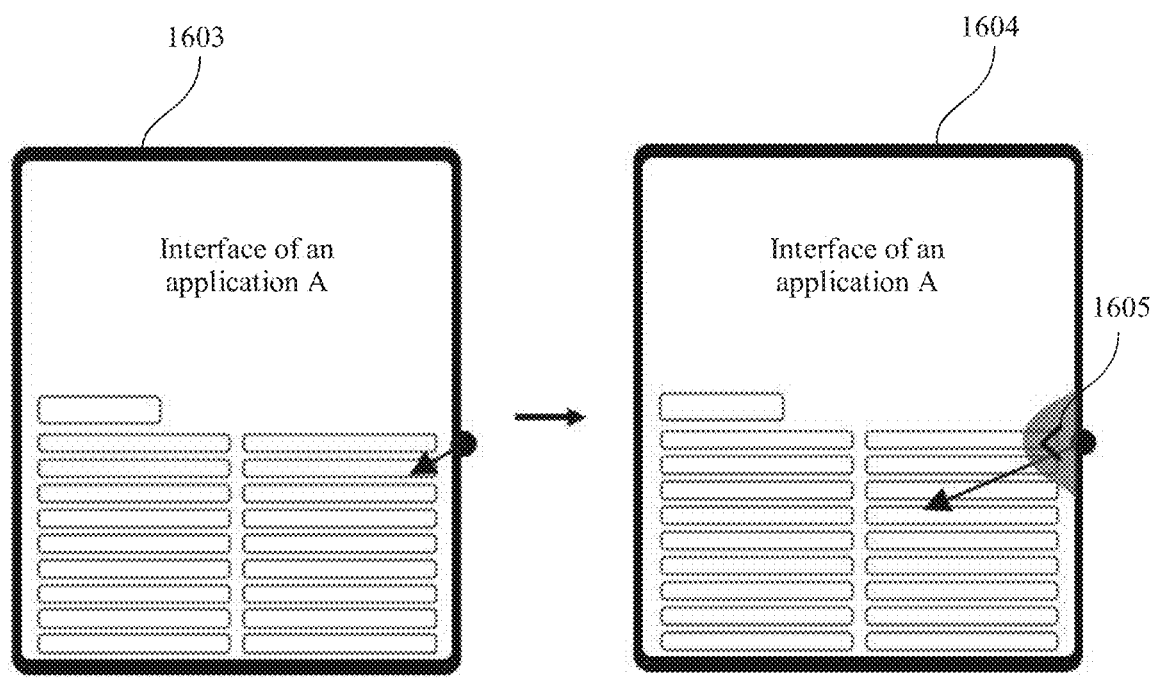

FIG. 16A and FIG. 16B are schematic diagrams of a slide-pause gesture and a corresponding function according to an embodiment of the present invention. As shown in FIG. 16A, when a touch point of the user slides from a first point 1601 to a second point 1602, a straight-line distance between the second point 1602 and the first point 1601 is greater than or equal to the first threshold a and less than the second threshold b. In this case, a first identifier 409 is displayed on the first edge of the display of the electronic device. As shown in FIG. 16B, the display of the electronic device changes from a first state 1603 to a second state 1604. In the second state 1604, the first identifier 1605 appears on the first edge of the display of the electronic device. Similarly, for explanations of information such as content, a location, and a size of the first identifier 1605, refer to the explanations of the first identifier in Embodiment 1 of the present invention. Details are not described herein again.

When the first identifier 1605 appears on the first edge of the display of the electronic device, if the touch point of the user leaves the second point 1602 on the display at this moment, in response to the leaving of the touch point of the user, the electronic device may perform an operation of returning to an upper-level application. To be specific, the first identifier is used to indicate: If the touch point of the user leaves the display when the first slide gesture goes to the second point, the electronic device displays a second interface different from the first interface on the display. The second interface is an interface previous to the first interface.

Still refer to FIG. 16A. In processes of performing the first slide gesture, a second slide gesture, and a third slide gesture, namely, in processes in which the touch point of the user slides from the first point 1601 to another point, if a sliding distance of the touch point of the user reaches the first threshold point a, the second threshold point b, or the third threshold point c, the electronic device generates a feedback prompt. The feedback prompt may include any one or a combination of a vibration feedback prompt, a sound feedback prompt, a voice feedback prompt, and an image feedback prompt. For example, the vibration feedback prompt may be transient body vibration generated by the electronic device, to prompt the user that the sliding distance of the touch point of the user has reached the first threshold. The sound feedback prompt may be a sound emitted by the electronic device through a loudspeaker. Similarly, the voice feedback prompt may be voice broadcast. For example, the loudspeaker of the electronic device plays a prompt "You have slid to a first function". The image feedback prompt may be a prompt, on the display of the electronic device in a form of an icon or a ruler, to the user that the touch point has slid to a point. The feedback prompt may alternatively be a combination of the foregoing several prompts. For example, when the distance that the touch point of the user slides from the first point 1601 reaches the first threshold a the electronic device generates a sound feedback prompt while providing a vibration feedback for the user. Certainly, it may be understood that the feedback prompt provided in this embodiment of the present invention is merely an example, and the feedback prompt may further include another manner and a combination of other manners.

Still refer to FIG. 16A. In this embodiment of the present invention, an anti-accidental touch threshold a0 may be further set, and the anti-accidental touch threshold a0 is greater than 0 and less than the first threshold a. Further, an objective of setting the anti-accidental touch threshold a0 is: When the touch point of the user slides from the first point 1601 to another point, if a straight-line distance between the another point and the first point is less than the anti-accidental touch threshold a0, the current sliding of the touch point of the user may be considered as an accidental touch by a system, and the sliding behavior does not trigger any application or operation of the electronic device.

S1504: When duration for which the touch point of the user stays at the second point is greater than or equal to a first duration threshold, the electronic device displays a first application bar on the first edge.

Figure 17A:
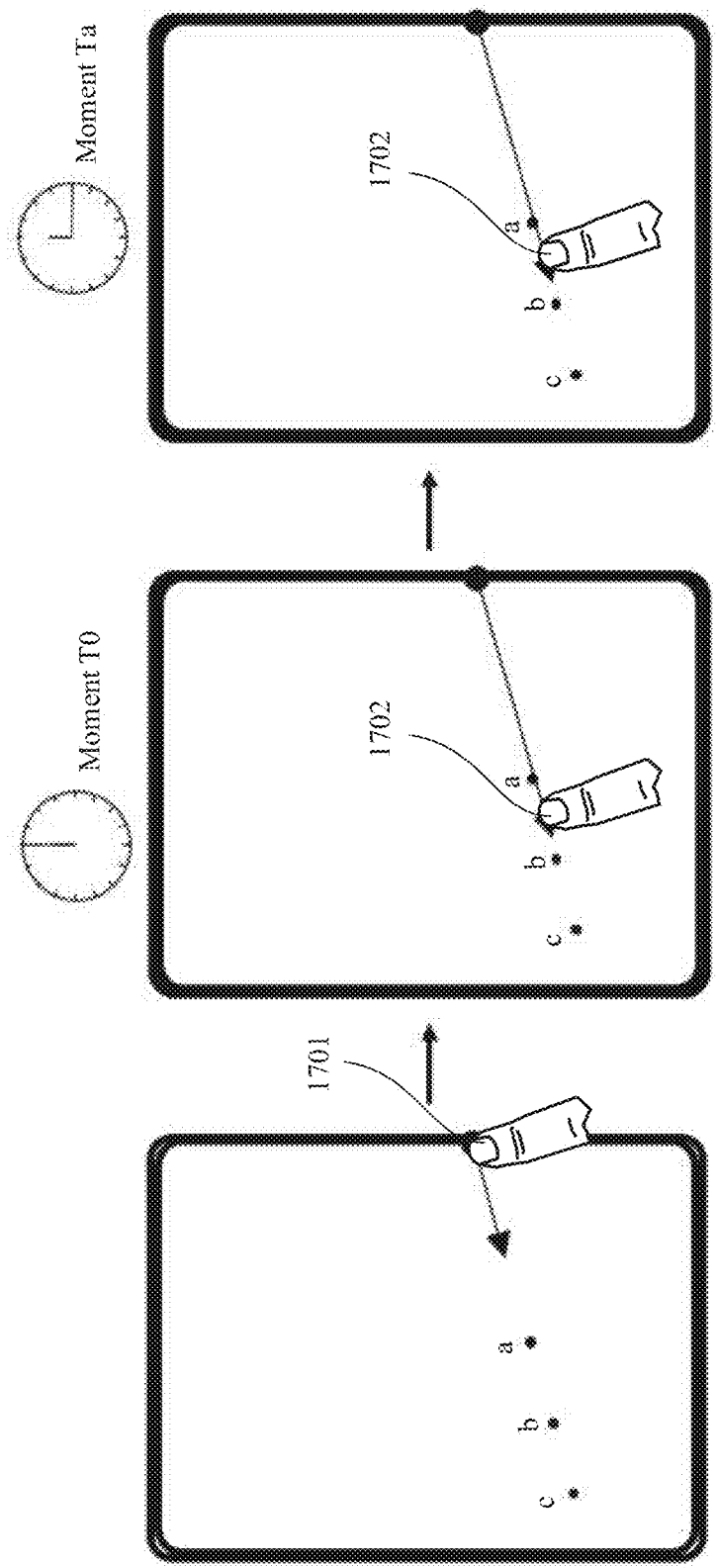
Figures 1, 17B:
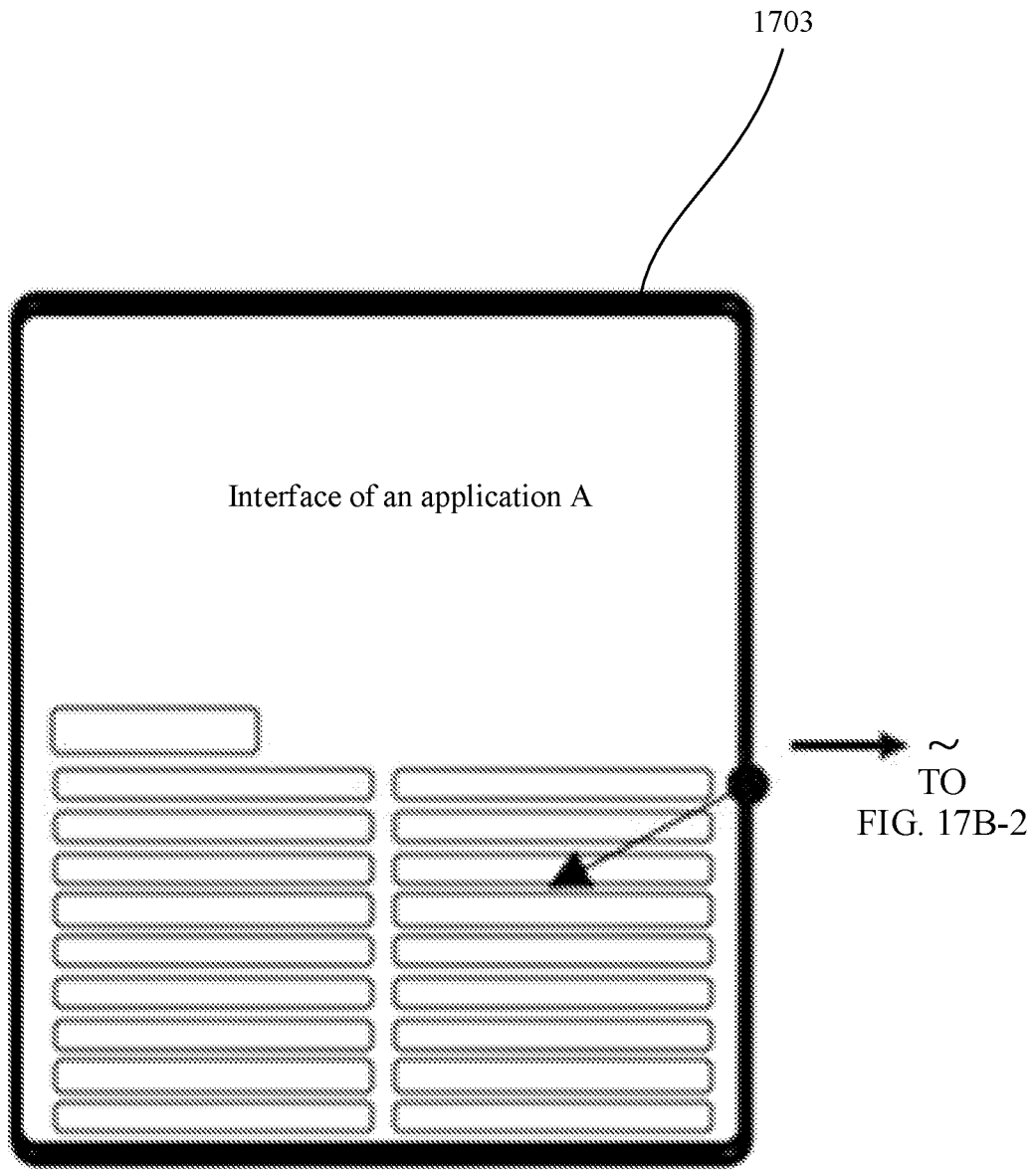
Figures 2, 17B:
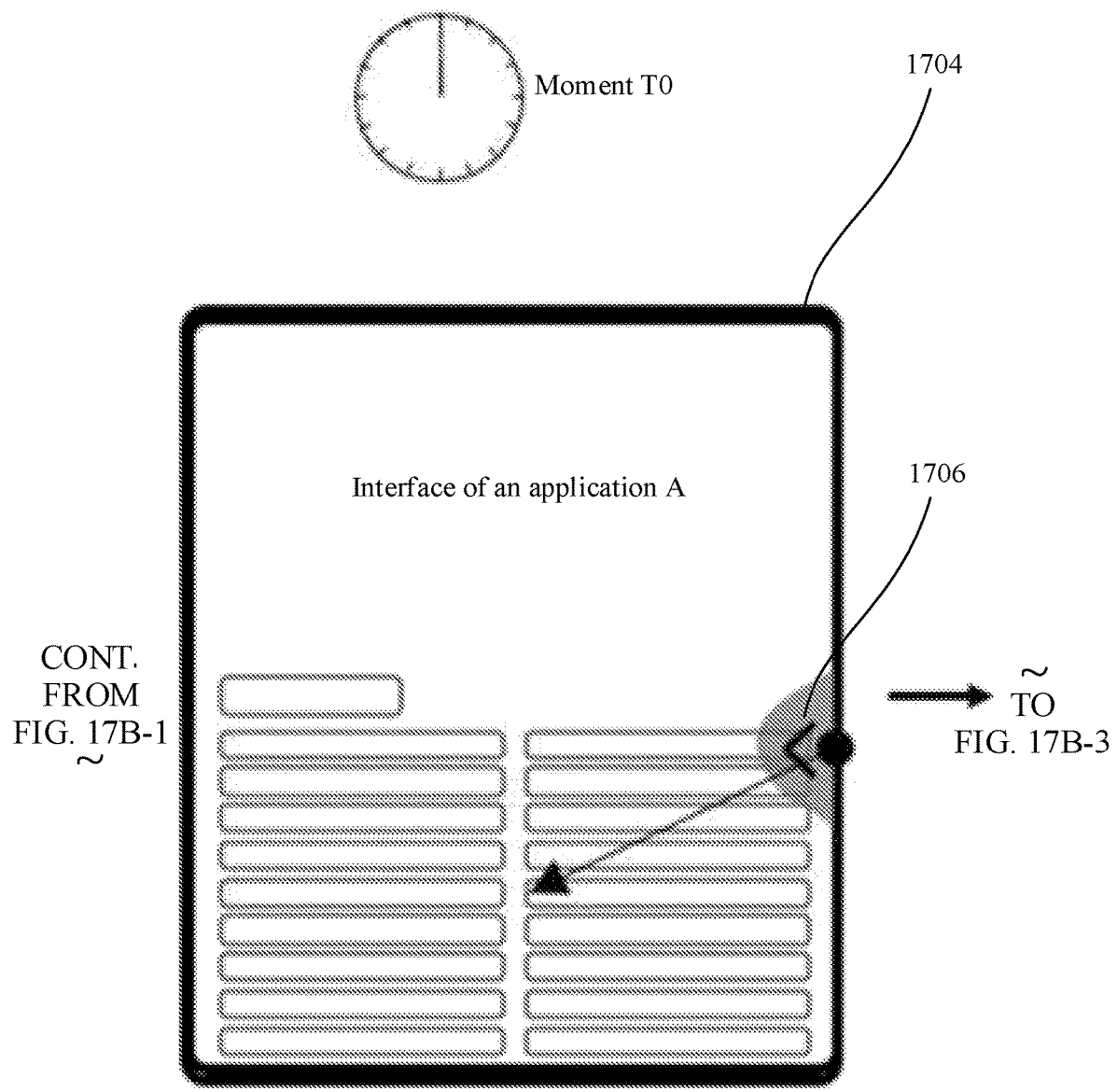
Figures 3, 17B:
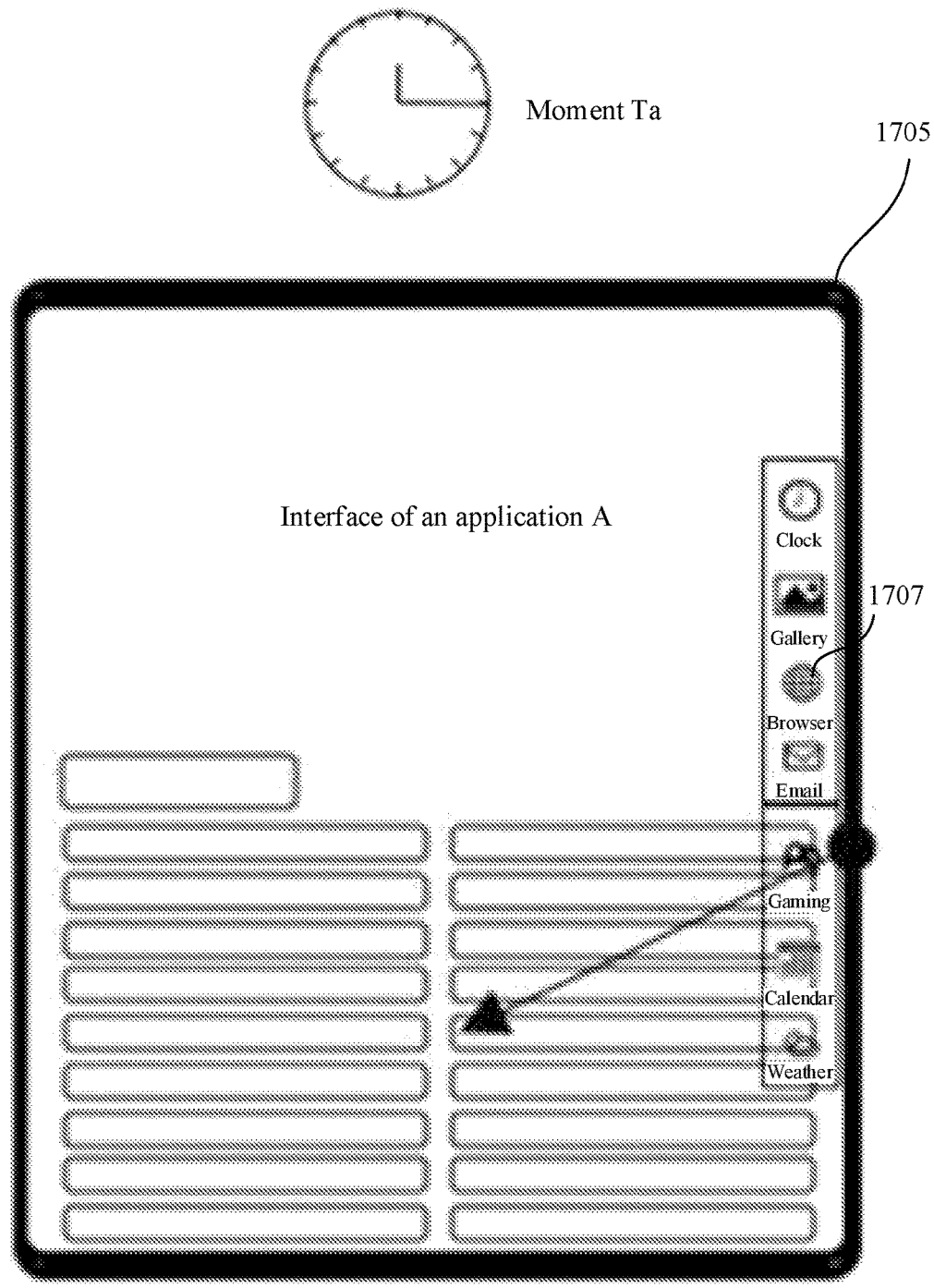

FIG. 17A and FIG. 17B-1 to FIG. 17B-3 are schematic diagrams of a process of displaying a first application bar according to an embodiment of the present invention. As shown in FIG. 17A, when the first slide gesture goes from a first point 1701 to a second point 1702, and when duration for which the touch point of the user stays at the second point 1702 is greater than the first duration threshold Ta, the electronic device displays the first application bar on the first edge of the display. Correspondingly, as shown in FIG. 17B-1 to FIG. 17B-3, when the touch point of the user starts to stay at the second point 1702, content displayed by the electronic device on the first edge of the display changes from a first visual element 1706 to a first application bar 1707 from a moment T0 to a moment Ta.

Figure 20:
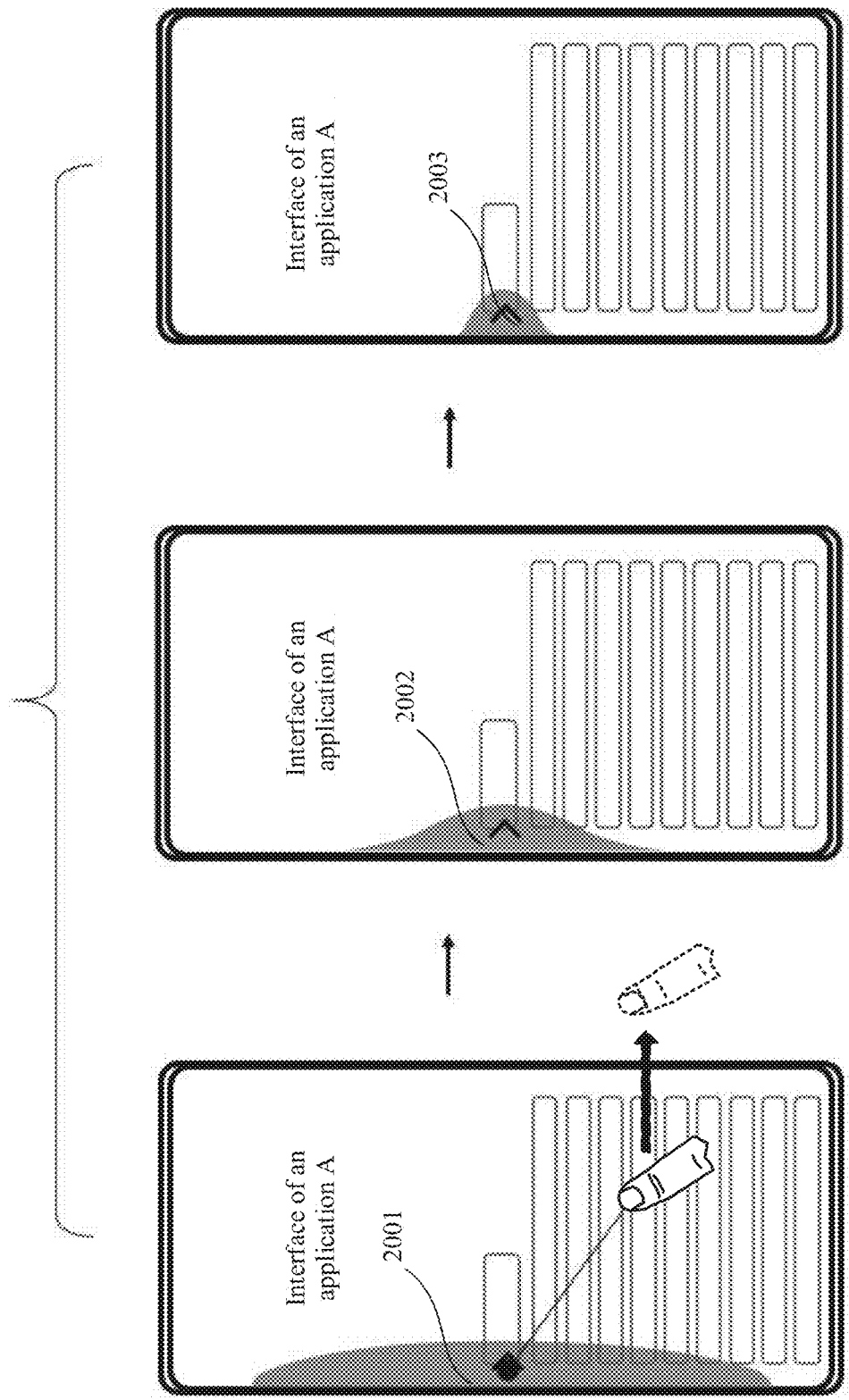
FIG. 20 is a schematic diagram of another visual transition effect according to an embodiment of the present invention.

Because stay duration is difficult to control, and a misoperation is easily caused, a visual transition effect may be added in a process of the slide gesture, to resolve this problem. Specifically, the first slide gesture is used as an example for description. FIG. 19A to FIG. 19D are a schematic diagram of a visual transition effect according to an embodiment of the present invention. As shown in FIG. 19A to FIG. 19D, the straight-line distance between the second point and the first point is greater than or equal to the first threshold a and less than the second threshold b. When the touch point of the user stays at the second point, from T0 to a moment Ta, content displayed by the electronic device on the first edge of the display gradually changes from a first visual element 1901 to an M$1^{st}$ visual element 1902, then gradually changes from the M$1^{st}$ visual element 1902 to an M$2^{nd}$ visual element 1903, and finally gradually changes from the M$2^{nd}$ visual element 1903 to a first application bar 1904. More visual elements may be further included in a process of changing the first visual element 1901 into the first application bar 1904. FIG. 19A to FIG. 19D in this embodiment are merely an example for description. If the touch point of the user leaves the display of the electronic device when the duration for which the touch point of the user stays at the second point does not reach the first duration threshold Ta, the content displayed on the first edge of the display of the electronic device is rolled back. FIG. 20 is a schematic diagram of another visual transition effect according to an embodiment of the present invention. As shown in FIG. 20, when the touch point of the user leaves the display of the electronic device, the content displayed by the electronic device on the first edge of the display gradually changes from an M$3^{rd}$ visual element 2001 to an M$4^{th}$ visual element 2002, and then gradually changes from the M$4^{th}$ visual element 2002 to a first identifier 2003. To be specific, an idea of the present invention is to perform morphological joint deformation on a visual element displayed by a previous function and a visual element displayed by a next function. A time point at which the deformation starts is a time point at which the touch point of the user starts to stay at a point, and as the stay duration progresses, a visual element displayed corresponding to each function starts to gradually change into the visual element displayed corresponding to the next function, and the next function is not formally executed until the stay duration reaches a set duration threshold. In addition, in a visual element gradual change process, as long as the next function is not executed, if the touch point of the user leaves the point, the visual element rolls back and gradually changes into the visual element displayed corresponding to the previous function, and the previous function is executed.

The first application bar 1707 includes N1 application icons. It should be noted herein that, for related content of the first application bar in Embodiment 2, refer to the description and explanation of the related content of the first application bar in Embodiment 1, and details are not described herein again.

Figure 18A:
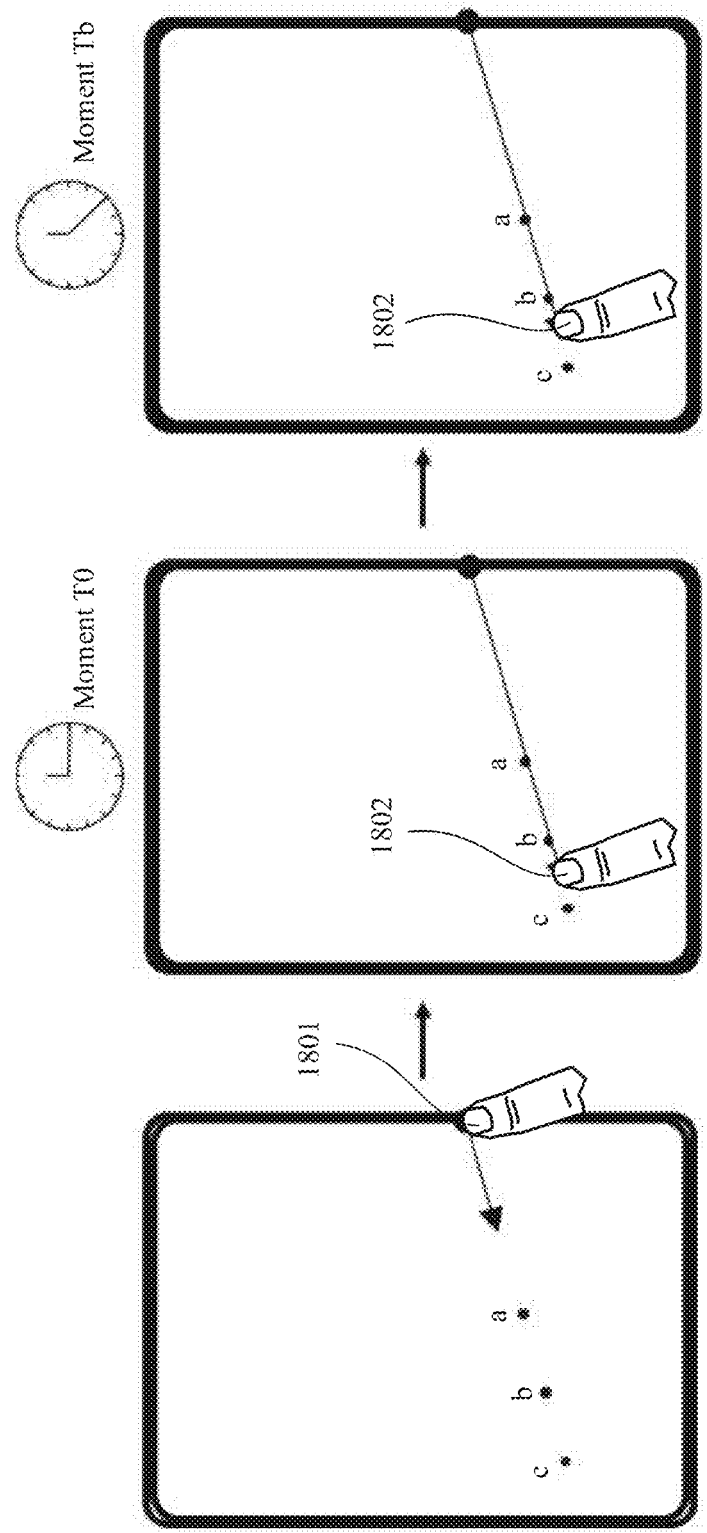
Figures 1, 18B:
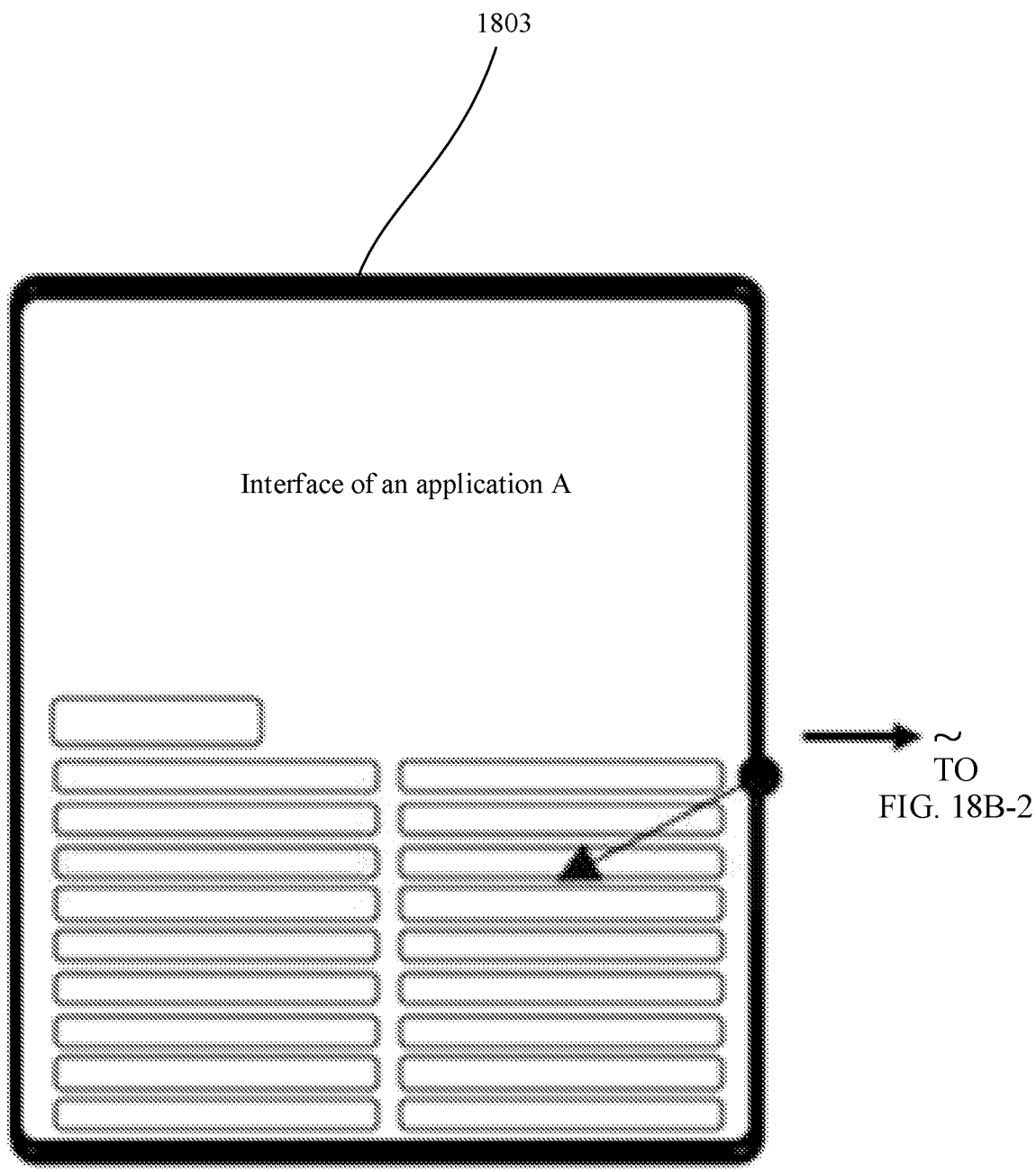
Figures 2, 18B:
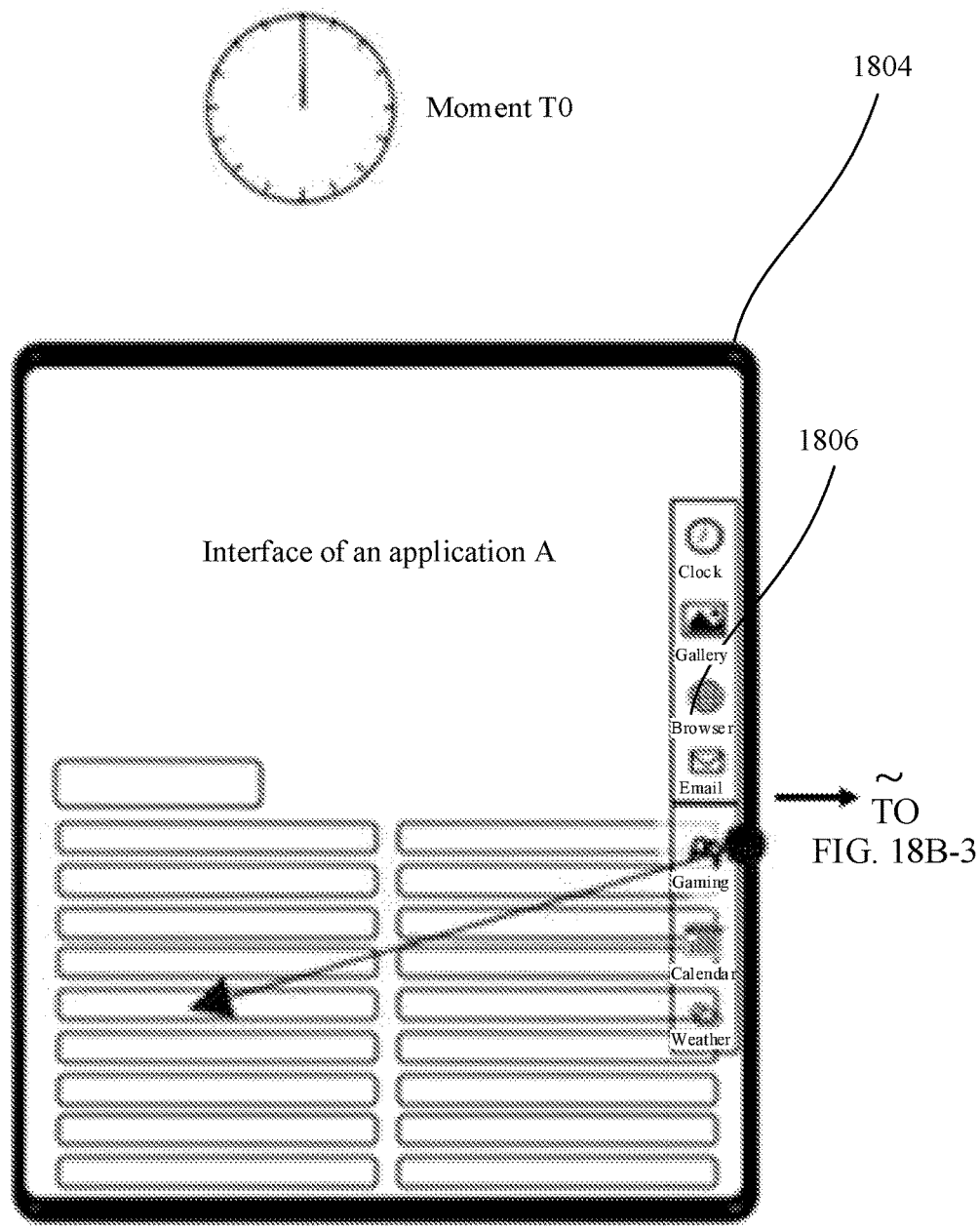
Figures 3, 18B:
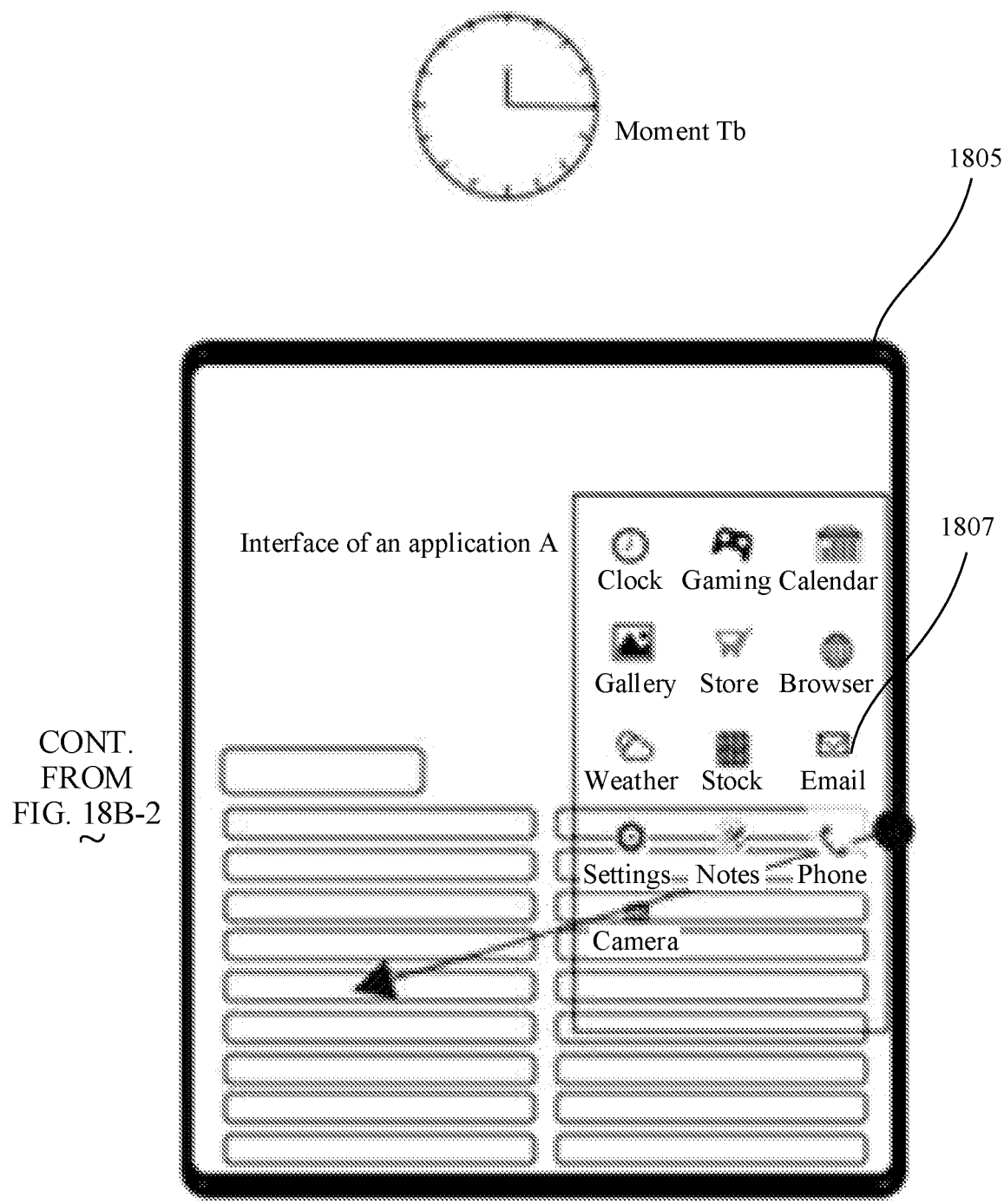
Figure 19A:
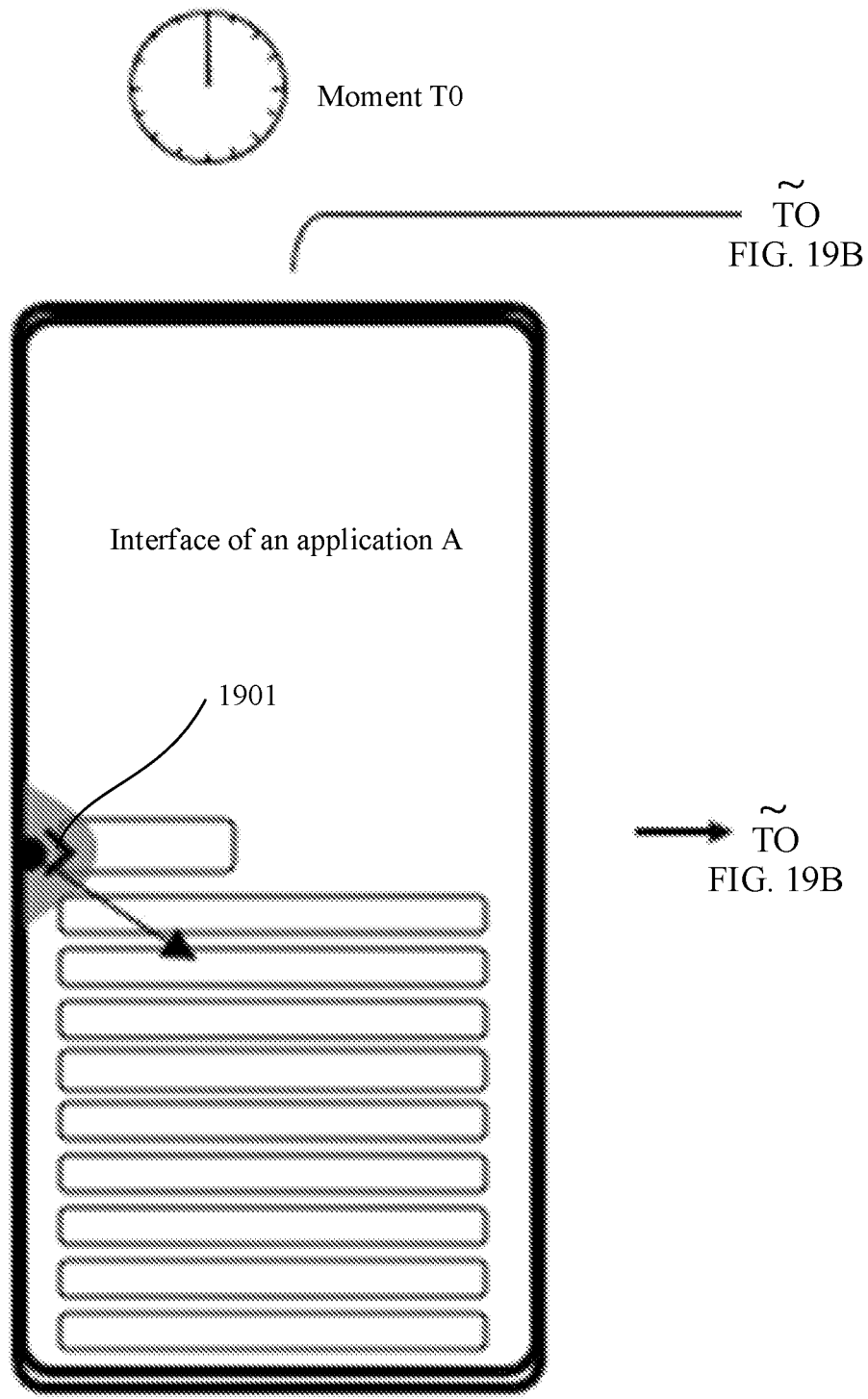
FIG. 19A to FIG. 19D are a schematic diagram of a visual transition effect according to an embodiment of the present invention.
Figure 19B:
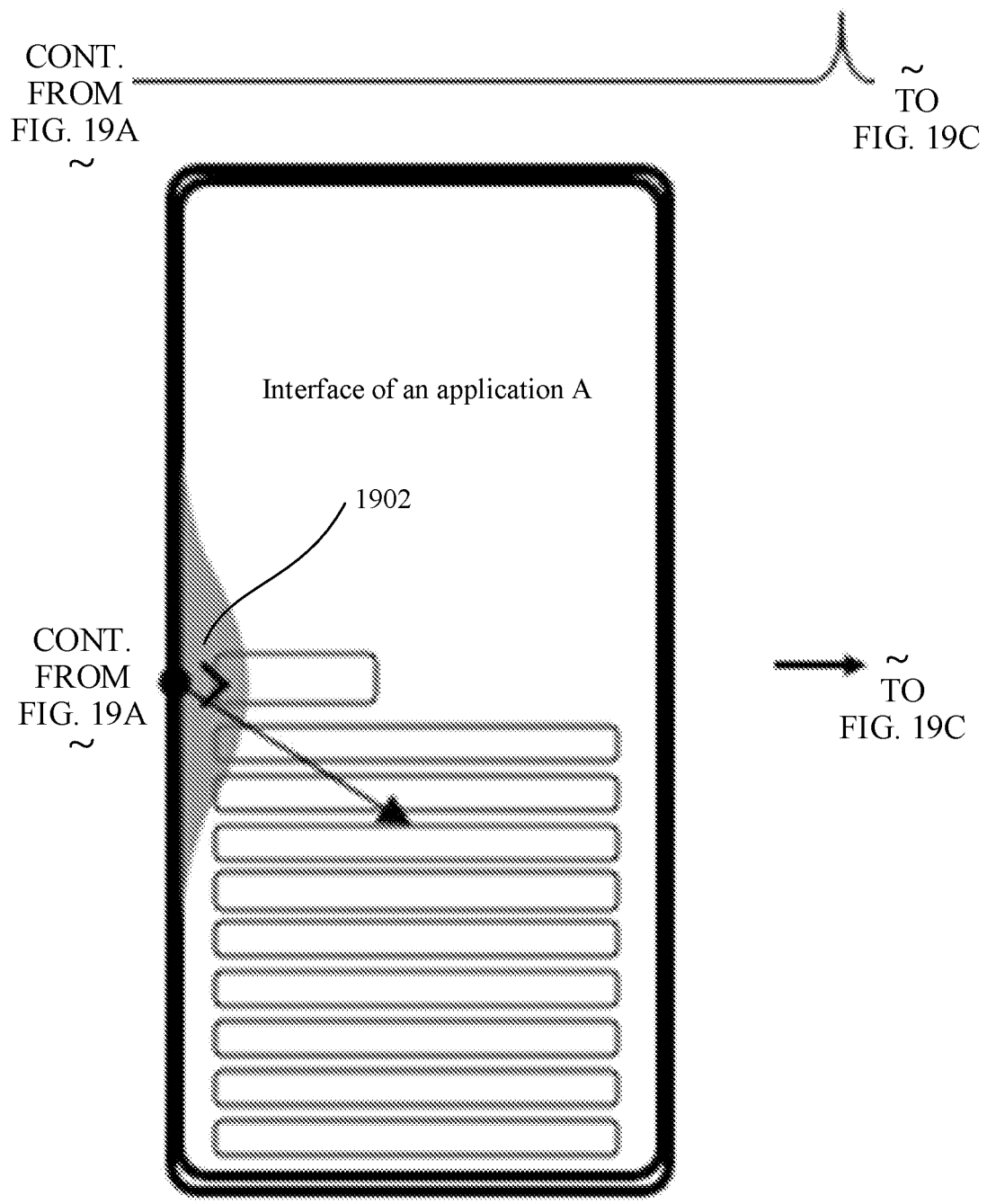
Figure 19C:
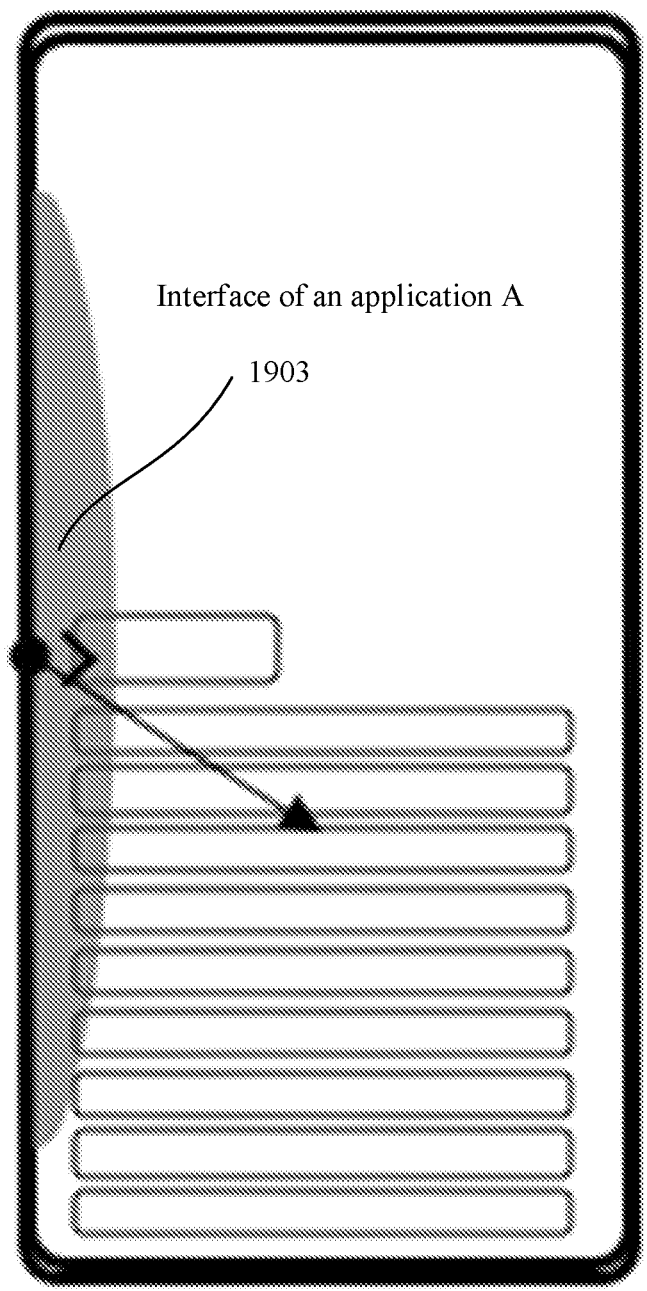
Figure 19D:
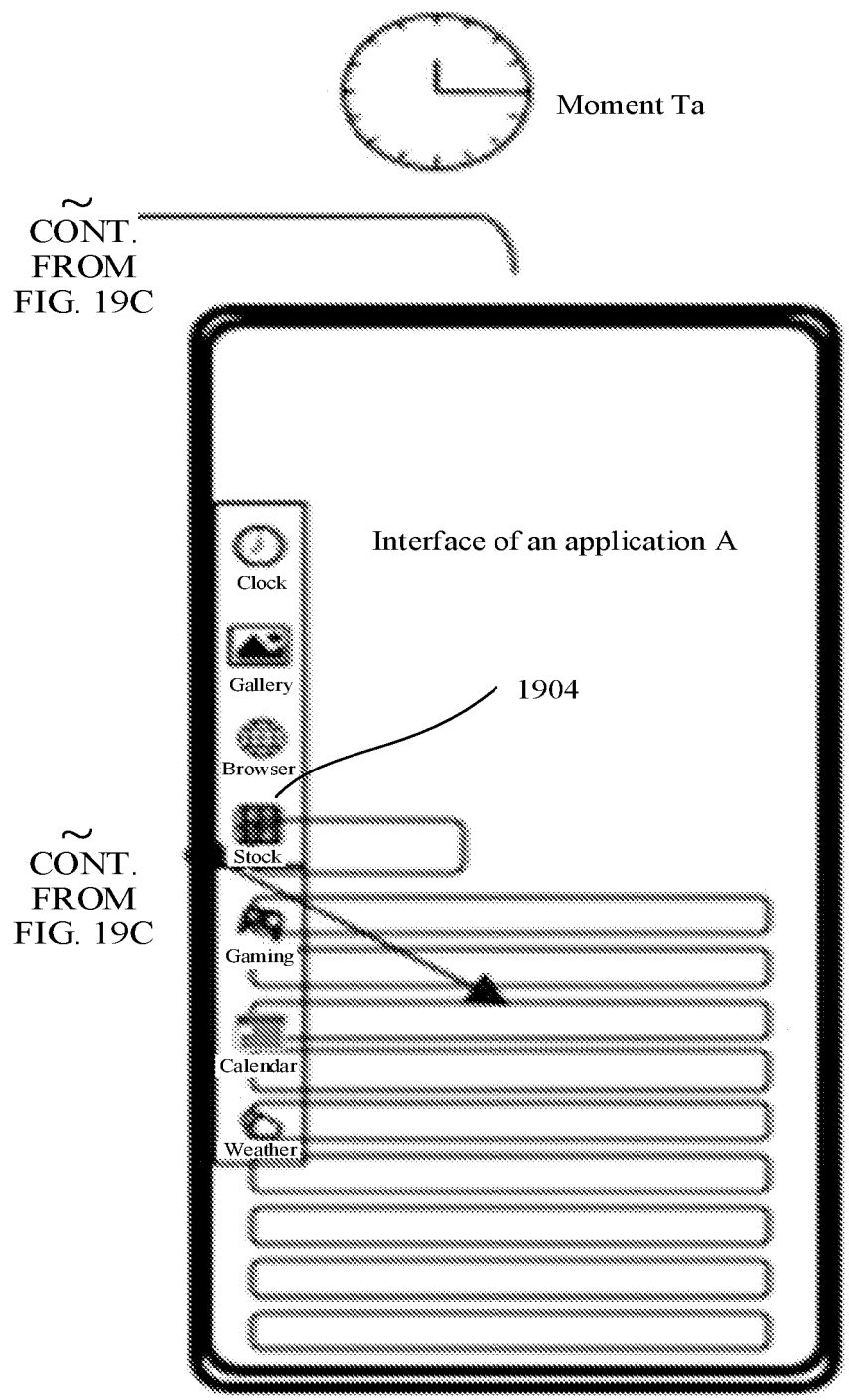

In some implementations, the method further includes: The electronic device receives the second slide gesture entered by the user from the second point to a third point. The third point is on the display, and a straight-line distance between the third point and the first point is greater than or equal to the second threshold and less than the third threshold. In processes of performing the first slide gesture and the second slide gesture, the touch point of the user does not leave the display. When duration for which the touch point of the user stays at the third point is greater than or equal to a second duration threshold, the electronic device displays a second application bar on the first edge of the display. FIG. 18A and FIG. 18B-1 to FIG. 18B-3 are schematic diagrams of a process of displaying a second application bar according to an embodiment of the present invention. As shown in FIG. 18A, when the first slide gesture goes from a first point 1801 to a second point (not shown), and then goes from the second point to a third point 1802, and when duration for which the touch point of the user stays at the third point 1802 is greater than a second duration threshold Tb, the electronic device displays the second application bar on the first edge of the display. Correspondingly, as shown in FIG. 18B-1 to FIG. 18B-3, when the touch point of the user starts to stay at the third point 1802, content displayed by the electronic device on the first edge of the display changes from a first application bar 1806 to a second application bar 1807 from a moment T0 to a moment Tb.

After the electronic device displays the first application bar on the first edge, the electronic device may further receive the third slide gesture. A start point of the third slide gesture is on the first application bar. The electronic device displays the second application bar on the first edge in response to the third slide gesture.

The second application bar includes N2 application icons, N2 is greater than N1, and N1 and N2 are positive integers. The N2 application icons include the N1 application icons. In other words, a quantity of application icons in the second application bar should be greater than that of application icons in the first application bar, and the second application bar may be considered as an extension of the first application bar. It should be noted that a generation manner, a sorting principle, an adding manner, and the like of a first-type application icon and a second-type application icon in the second application bar in Embodiment 2 are consistent with those in the second application bar in Embodiment 1. Therefore, details are not described herein again, and refer to the foregoing content for explanation.

It should be further noted that, in Embodiment 1, features such as automatic hiding or display transparency of the first application bar or the second application bar after several times are also applicable to the first application bar or the second application bar in Embodiment 2.

It should be further noted that, a feature of displaying more content by using a slide gesture of the first application bar or the second application bar in Embodiment 1 is also applicable to the first application bar or the second application bar in Embodiment 2.

It should be further noted that a function of performing floating window display or split-screen display on an application in the first application bar or the second application bar in Embodiment 1 is also applicable to the first application bar or the second application bar in Embodiment 2.

Embodiment 3 of the present invention provides an application bar display method.

The method is applied to an electronic device including a foldable screen.

Figure 21A:
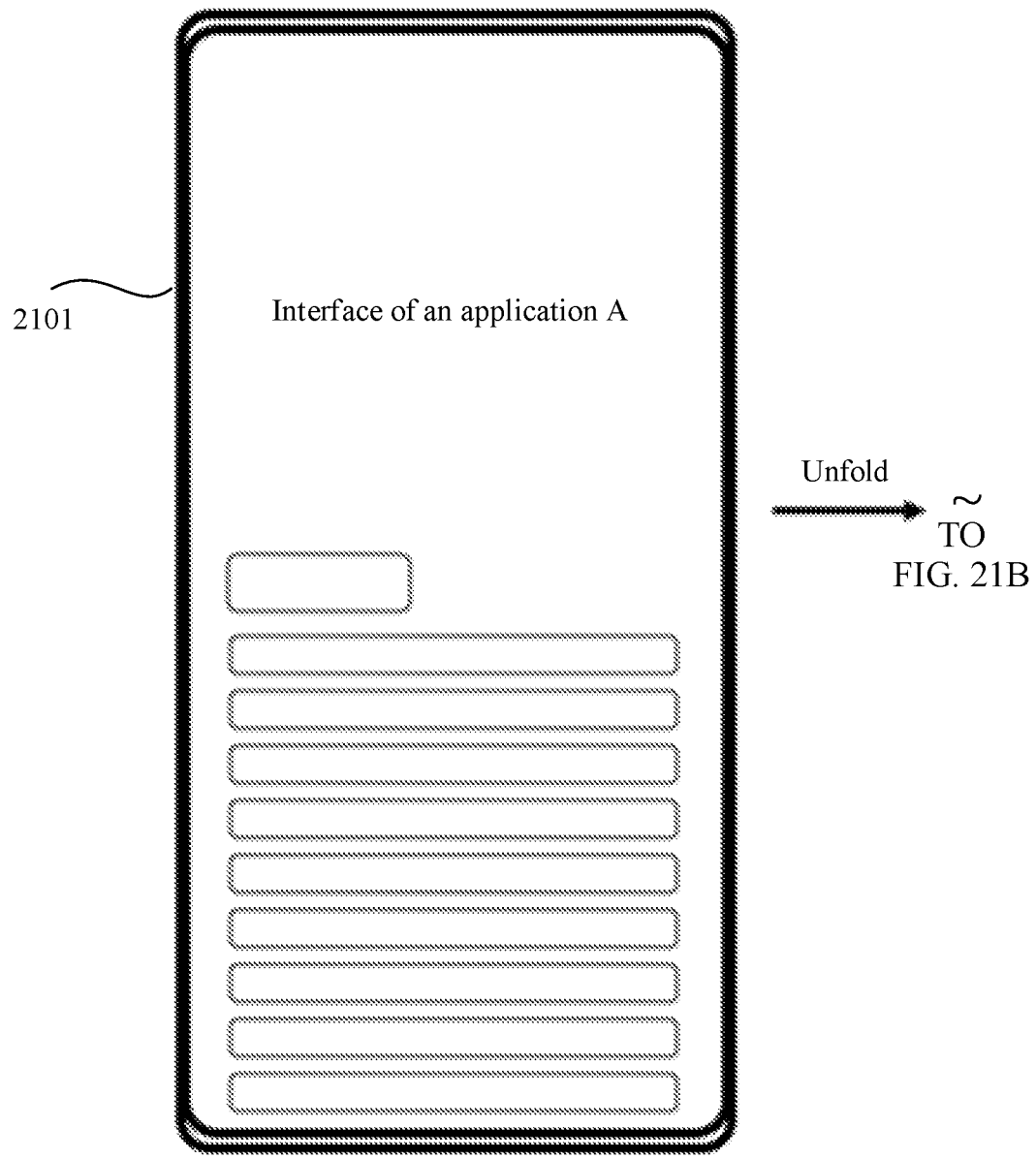
FIG. 21A and FIG. 21B are a schematic diagram of multi-window interaction of a foldable screen according to an embodiment of the present invention.
Figure 21B:
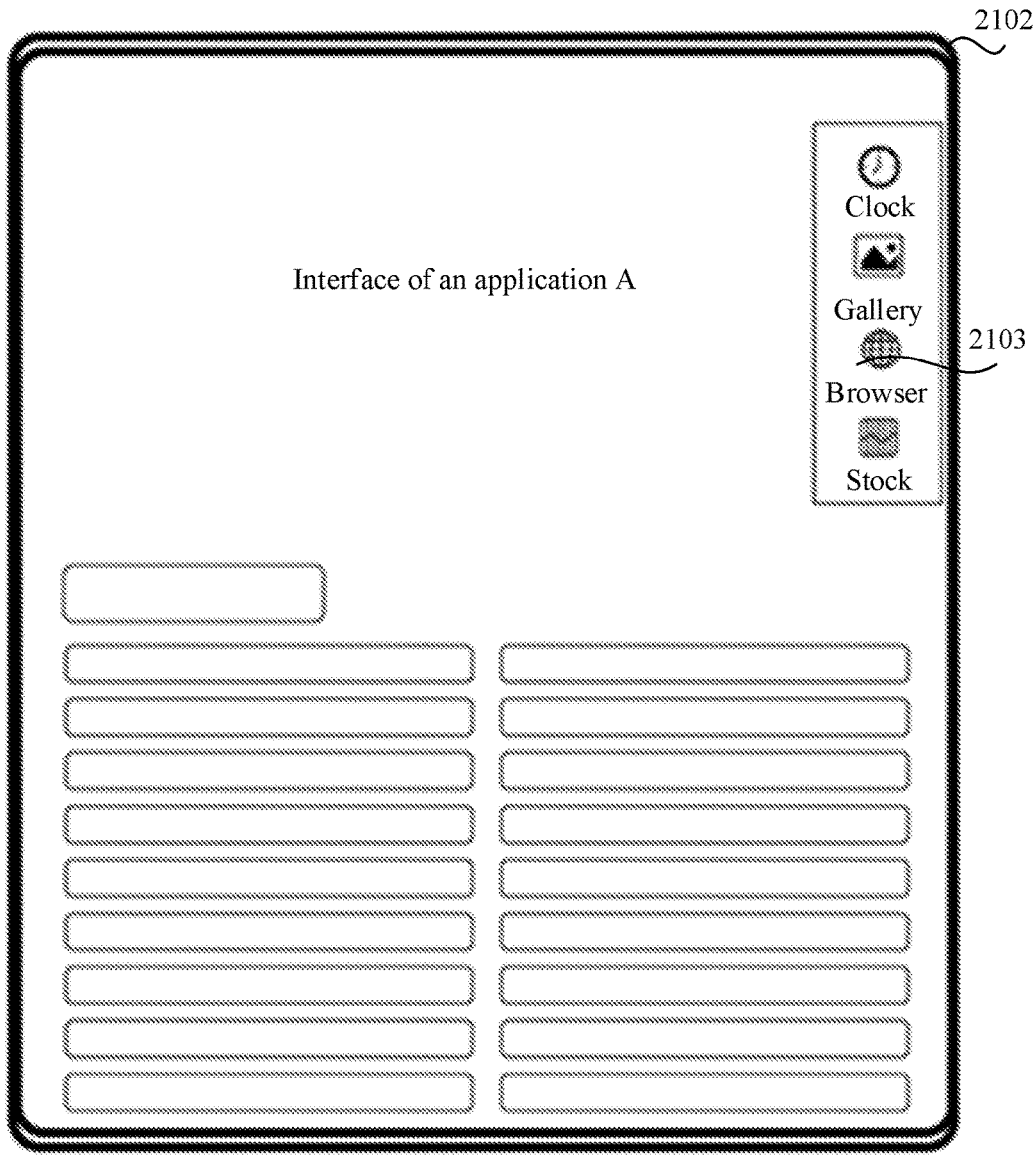

The electronic device includes a first display area and a second display area, and the electronic device includes a first display state and a second display state. FIG. 21A and FIG. 21B are a schematic diagram of displaying an application bar of a foldable screen according to an embodiment of the present invention. As shown in FIG. 21A and FIG. 21B, the first display state 2101 is a state in which the first display area and the second display area are folded, and the second display state 2102 is a state in which the first display area and the second display area are unfolded.

Still refer to FIG. 21A and FIG. 21B. The electronic device is in the first display state 2102, and the electronic device displays an application interface of a first application in the first display area. When the foldable-screen device changes from the first display state 2101 to the second display state 2102, the foldable-screen device displays a first application bar 2103 on a first edge of a display. When the foldable-screen device detects no operation on the first application bar 2103 after a first duration threshold, the second area 2103 of the first application bar is not displayed on the first edge of the display of the foldable-screen device. A value of the first duration threshold may be set according to an actual situation, for example, a time interval such as 3 seconds or 5 seconds.

It should be noted that, when the foldable-screen device is in the first display state or the second display state, the foldable-screen device may implement any one of the steps and methods described in Embodiment 1, Embodiment 2, and Embodiment 6.

Embodiment 4 of the present invention discloses an electronic device.

Figure 22:
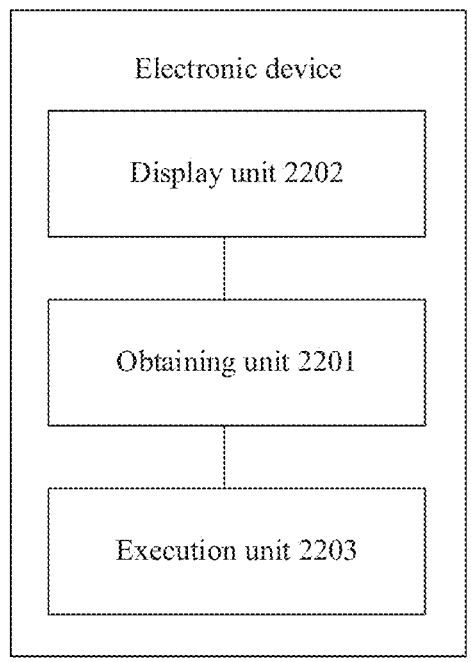
FIG. 22 is a schematic diagram of functional modules of an electronic device according to an embodiment of the present invention.

FIG. 22 is a schematic diagram of functional modules of an electronic device according to an embodiment of the present invention. As shown in FIG. 22, the electronic device is configured to implement the methods recorded in the foregoing embodiments, and includes an obtaining unit 2201, a display unit 2202, and an execution unit 2203. The obtaining unit 2201 is configured to support the electronic device in performing the processes S102, S105, S107, and S109 in FIG. 1, the processes S1502 and S1504 in FIG. 15, and the processes S2502, S2505, S2507, and S25089 in FIG. 25. The display unit 2202 is configured to support the electronic device in performing the processes S101, S103, S104, S106, S108, and S110 in FIG. 1, the processes S1501, S1503, and S1504 in FIG. 15, S2501, S2503, S2504, S2506, S2508, and S2510. The execution unit 2203 is configured to support the electronic device in performing the processes S103, S104, S106, S108, and S110 in FIG. 1, the processes S1503 and S1504 in FIG. 15, S2503, S2504, S2506, S2508, and S2510. All related content of the steps in the foregoing method embodiments may be cited in function descriptions of the corresponding functional modules. Details are not described herein again.

Embodiment 5 of the present invention discloses an electronic device.

Figure 23:
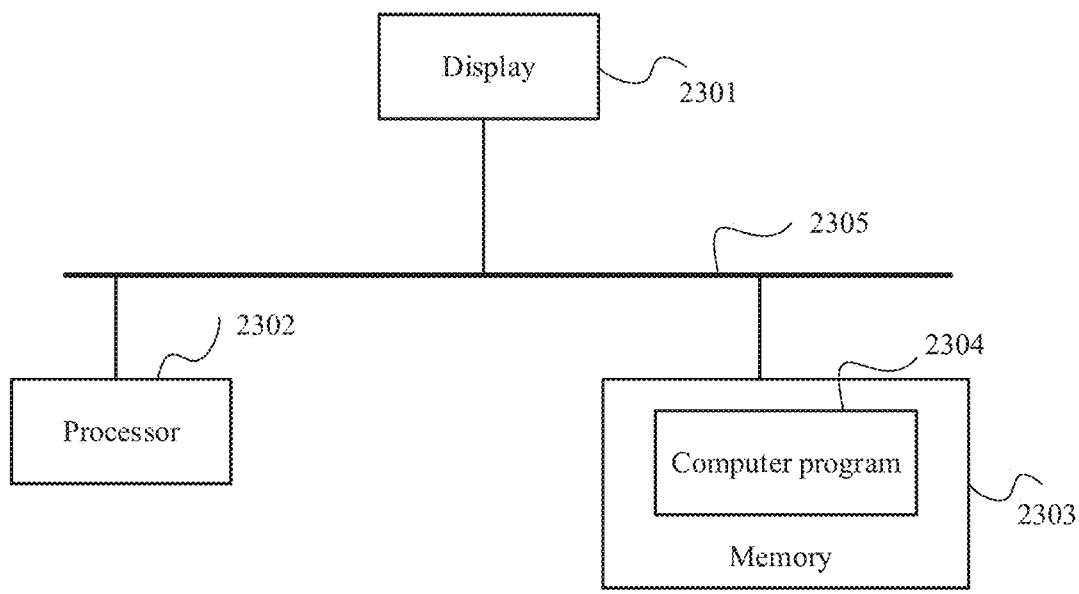
FIG. 23 is a schematic diagram of a hardware structure of an electronic device according to an embodiment of the present invention.

FIG. 23 is a schematic diagram of a hardware structure of an electronic device according to an embodiment of the present invention. As shown in FIG. 23, the electronic device may include a display 2301, one or more processors 2302, one or more memories 2303, one or more applications (not shown), and one or more computer programs 2304. The foregoing components may be connected through one or more communications buses 2305. The one or more computer programs 2304 are stored in the memory 2303 and are executed, through configuration, by the one or more processors 2302. The one or more computer programs 2304 include instructions, and the instructions may be used to perform all methods and steps in Embodiment 1, Embodiment 2, Embodiment 3, and Embodiment 6.

For example, the memory 2303 of the electronic device may store an ANDROID® operating system. The operating system is a Linux-based mobile device operating system, and implements various functions in combination with the foregoing hardware in the electronic device. A software architecture of the stored ANDROID® operating system is described below in detail. It should be noted that, in this embodiment of this application, only the ANDROID® operating system is used as an example to describe a software environment required by the electronic device to implement the technical solution in this embodiment. A person skilled in the art may understand that this embodiment of this application may be alternatively implemented by using another operating system, for example, an iOS operating system.

Figure 24:
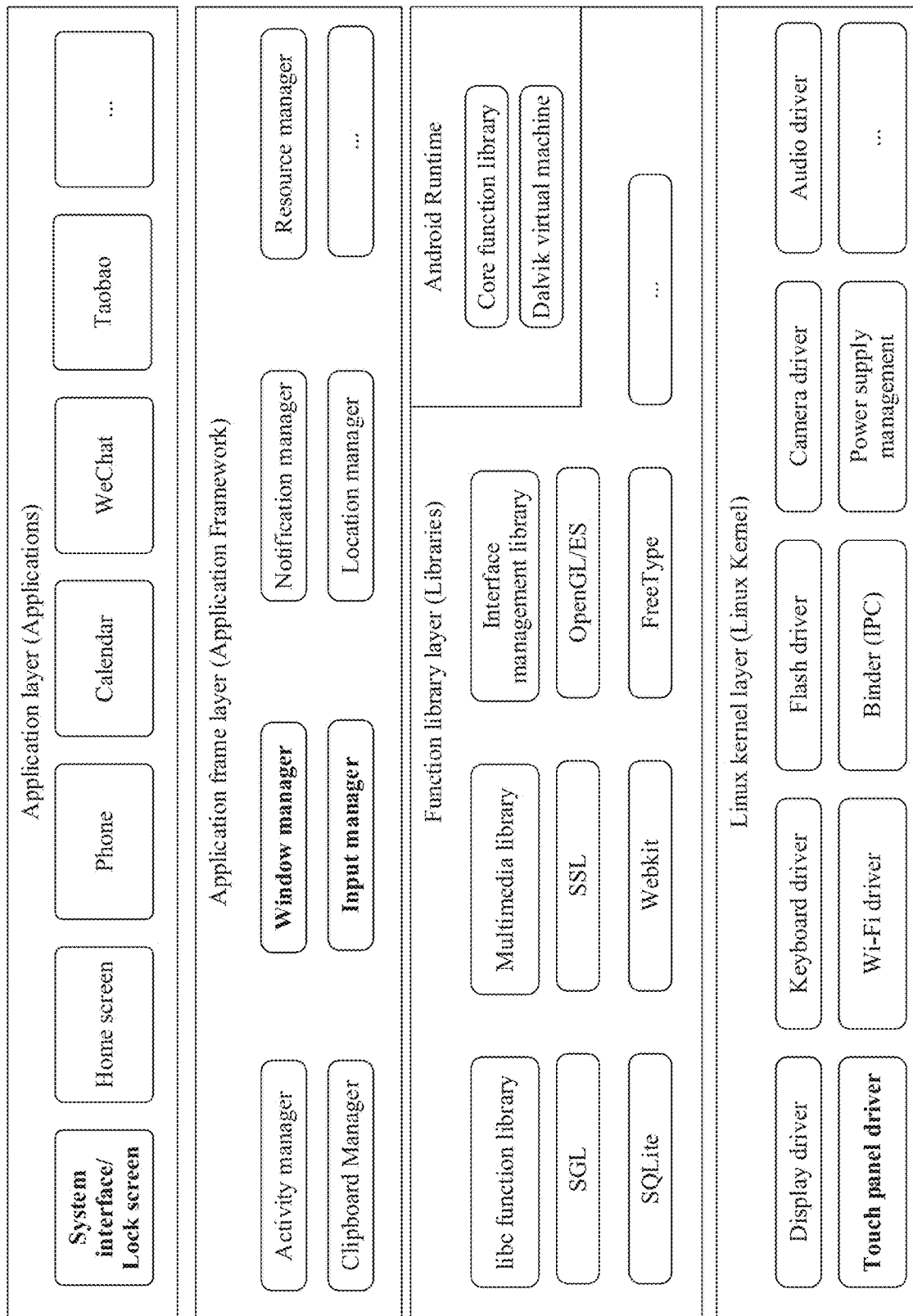
FIG. 24 is a schematic diagram of a software architecture of an ANDROID® operating system that can run in the foregoing electronic device according to an embodiment of the present invention.

For example, FIG. 24 is a schematic diagram of a software architecture of an ANDROID® operating system that can run in the foregoing electronic device. The software architecture may be divided into four layers: an application layer, an application framework layer, a function library layer, and a Linux kernel layer.

1. Application Layer (Applications)

The application layer is an uppermost layer of the operating system, may include system-level applications (for example, home screen, messages, phone, calendar, and contacts) of the operating system, and may also include general-level applications (for example, WeChat and Taobao). The system-level application usually means that the application has system-level permission and can obtain various system resources. The general-level application usually means that the application has general permission and may not be able to obtain some system resources, or the application can obtain some system resources only after being authorized by a user. The system-level application may be an application pre-installed in a mobile phone. The general-level application may be an application pre-installed in the mobile phone, or may be an application subsequently installed by the user.

The application is usually developed by using a Java language, and this is completed by invoking an application programming interface (application programming interface, API) provided by the application framework layer.

2. Application Framework Layer (Application Framework)

The application framework layer mainly provides a developer with various APIs that may be used to access an application. The developer may interact with a bottom layer (for example, a function library or a Linux kernel) of the operating system by using an application framework, to develop an own application. The application framework is mainly a series of service and management systems of the Android operating system. The application framework mainly includes the following basic services:

- a window manager (Window Manager): configured to manage all graphical user interface display windows in the system;
- an input manager (Input Manager): configured to provide information about an input device and an available key layout;
- an activity manager (Activity Manager): configured to manage a lifecycle of each application and provide a common navigation rollback function;
- a content provider (Content Provider): configured to manage data sharing and access between different applications;
- a notification manager (Notification Manager): configured to control an application to display prompt information (for example, an alert (Alert) or a notification (Notification)) on a status bar, a lock screen interface, or the like to the user;
- a resource manager (Resource Manager): providing a non-code resource (for example, a character string, a graph, or a layout file (Layout file)) for an application for use;
- a clipboard manager (Clipboard Manager): mainly providing a copying or pasting function inside an application or between applications;
- a view (View): having abundant and extensible view sets, where the view can be configured to construct an application, and specifically includes a plurality of types such as a list (list), a grid (grid), a text (text), a button (button), and an image (image); a main function of the image view is used to display an image, and the image view is usually presented on a GUI in a form of a non-editable control; and a main function of the text view is used to display a character string, and the text view is usually presented on the GUI in a form of an editable control; and
- a location manager (Location Manager): mainly enabling an application to access a geographic location of the electronic device.

3. Function Library Layer (Libraries)

The function library layer is a support of the application framework, and is an important link that connects the application framework layer and the Linux kernel layer. The function library layer includes some function libraries compiled by using a computer programming language C or C++. These function libraries can be used by different components in the operating system, and provide services for the developer by using the application framework layer. Specifically, the function libraries may include a libc function library, and the libc function library is specially customized for a device that is based on embedded Linux. The function libraries may further include a multimedia library (Media Framework), and the library supports playback and recording of audio or videos in a plurality of encoding formats, and also supports a still image file and a common audio or video encoding format. The function libraries further include an interface management library (Surface Manager). The interface management library is mainly responsible for managing access to a display system, is specifically used to be responsible for managing interaction between a display operation and an access operation when a plurality of applications are executed, and is further responsible for display composition of a 2D drawing and a 3D drawing.

The function library layer may further include other function libraries used to implement functions of a mobile phone, such as an SGL (Scalable Graphics Library) that is an XML (Extensible Markup Language) file-based 2D graph and image processing engine; an SSL (Secure Sockets Layer) that is located between a TVP/IP protocol and various application layer protocols, to provide a support for data communication; OpenGL/ES that supports a 3D effect; SQLite that is a relational database engine; Webkit that is a web browser engine; and FreeType that supports a bitmap and a vector font.

Android Runtime is a runtime environment in the Android® operating system, and is a new virtual machine used in the Android® operating system. An AOT (Ahead-Of-Time) technology is used in Android Runtime. When an application is installed for a first time, a byte code of the application is precompiled into a machine code, so that the application becomes a real local application. Then, a compilation step is omitted when the application runs again, so that both starting and execution become faster.

4. Linux Kernel Layer (Linux Kernel)

The layer provides a core system service of the operating system. For example, security, memory management, process management, a network protocol stack, and a driver model are all based on the Linux kernel. The Linux kernel is also used as an abstraction layer between hardware and software stacks. This layer has many drivers related to a mobile device. Main drivers include a display driver, a Linux-based frame buffer driver, a keyboard driver used as an input device, a touch panel driver, a flash driver based on a memory technology device, a camera driver, a Bluetooth driver, a Wi-Fi driver, a USB driver, and the like.

In this embodiment of the present invention, after the display (touch panel) at the hardware layer receives a slide operation that is entered by the user to the display, the touch panel driver at the Linux kernel layer may process a series of slide events in the slide operation, convert the slide events into screen touch point information, and upload the information to the input manager (Input Manager) of the application framework layer. The screen touch point information may be sliding coordinate information from a point to another point in a window of a touch display. The input manager receives the screen touch point information finally uploaded by the touch panel driver, and performs processing according to a rule, that is, the input manager may process the received sliding coordinate information according to a preset rule (namely, a rule in method embodiments of the present invention), for example, a function corresponding to an operation of sliding from one point to another point is implemented. Because this embodiment of the present invention mainly relates to display of a first identifier, a first sidebar, and a second sidebar, this embodiment of the present invention mainly relates to display of window content. The input manager reports, to the window manager (Window Manager), a processing result that finally meets the rule. The window manager displays a window interface or animation according to the processing result. The specific displayed content is displayed by a system interface (System UI).

In this embodiment of the present invention, the user only needs to execute a slide gesture once from a first edge of a touchscreen, so as to invoke a first identifier, a first application bar, and a second application bar. In addition, the user performs a tap or drag operation on application icons in the first application bar and the second application bar, so that the user can implement that a second interface is displayed on any current first interface in a floating window form or a first interface and a second interface are simultaneously displayed in a split screen form. This simplifies an operation of the user for implementing multi-window display of applications, and improves user experience.

Embodiment 6 of the present invention discloses an application bar display method.

Figure 25:
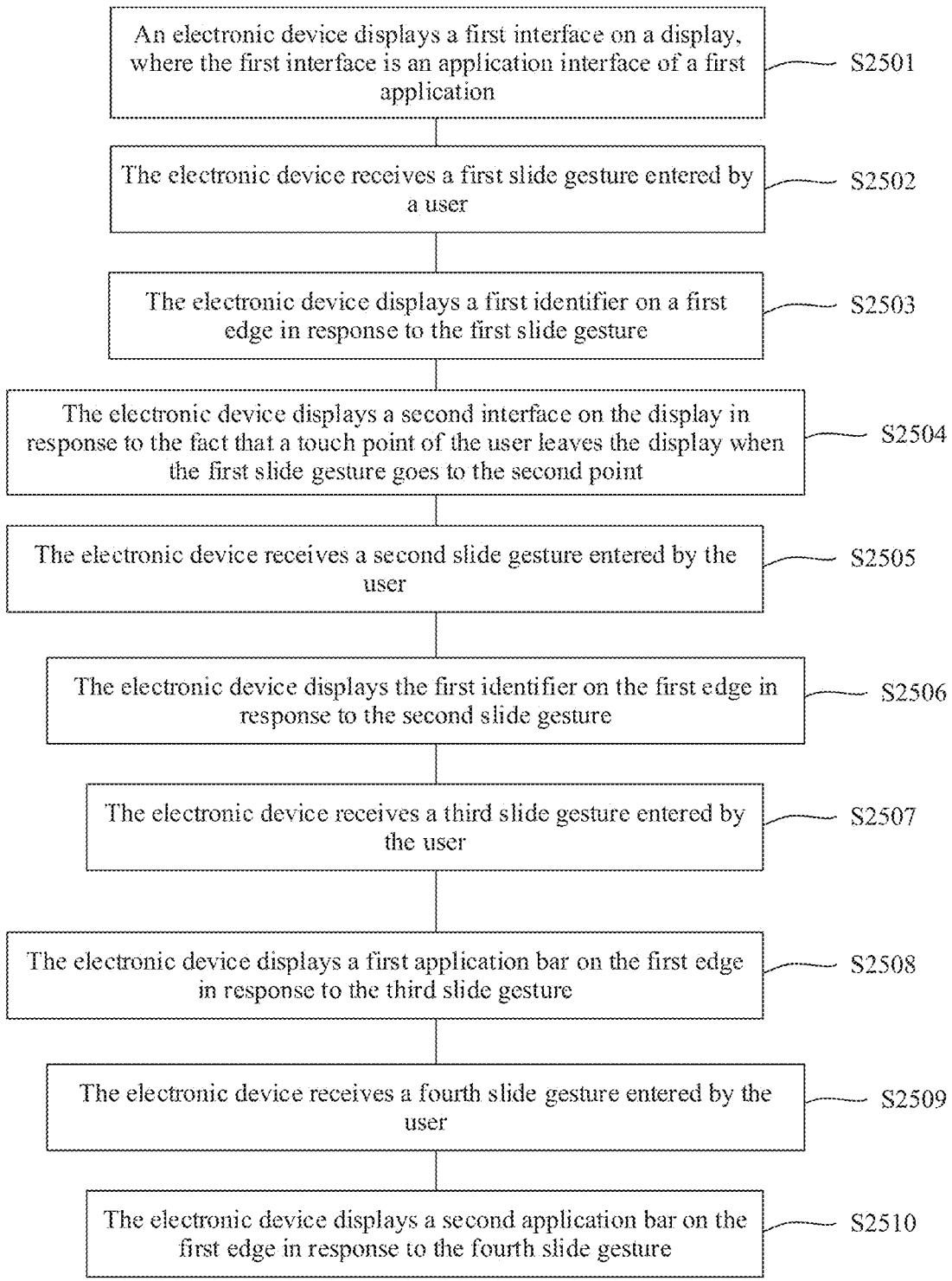
FIG. 25 is a flowchart of implementing another application bar display method according to an embodiment of the present invention.

FIG. 25 is a flowchart of implementing another application bar display method according to an embodiment of the present invention. As shown in FIG. 25, it should be noted that, methods and steps involved in Embodiment 6 and Embodiment 1 are mostly consistent, and the only difference lies in that: In Embodiment 1, the second application bar is invoked by using three consecutive slide gestures, but in Embodiment 6, the second application bar is invoked based on another slide gesture for the first application bar after the previous slide gesture is stopped. The different steps are as follows:

S2509: The electronic device receives a fourth slide gesture entered by the user.

Figure 26A:
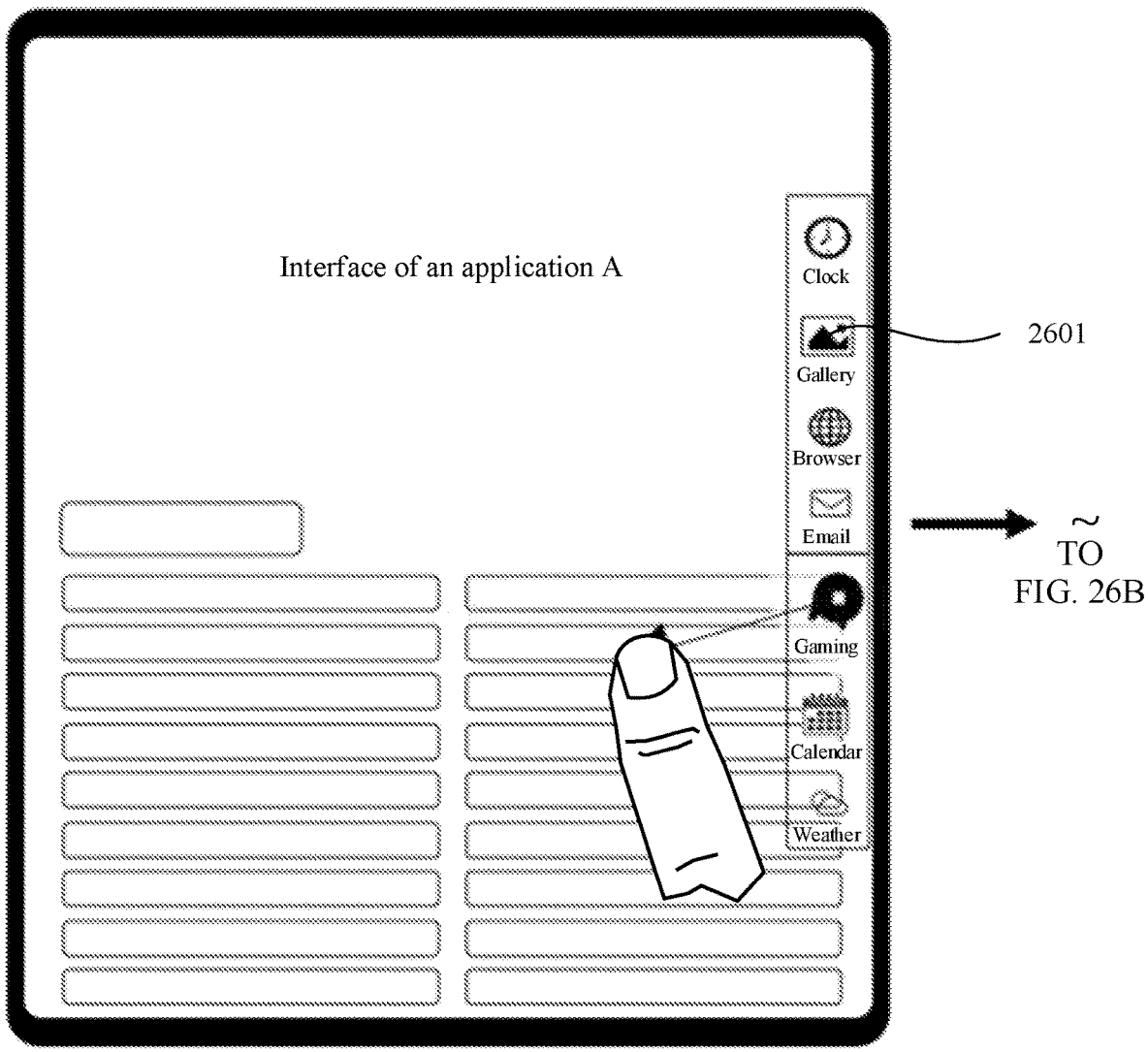
FIG. 26A and FIG. 26B are a schematic diagram of changing a first application bar into a second application bar according to an embodiment of the present invention.
Figure 26B:
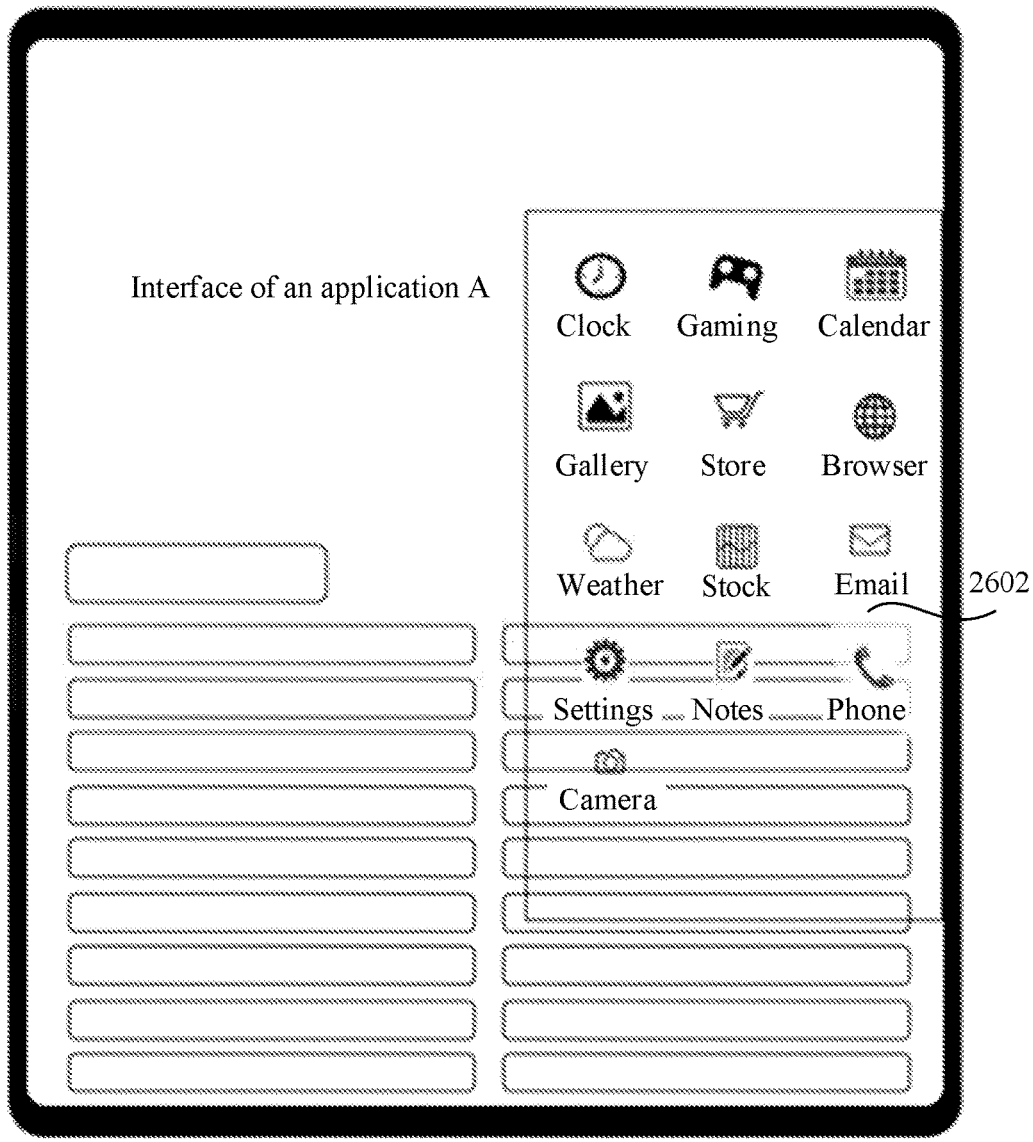

FIG. 26A and FIG. 26B are a schematic diagram of changing a first application bar into a second application bar according to an embodiment of the present invention. As shown in FIG. 26A and FIG. 26B, a start point of the fourth slide gesture is in a first application bar 2601, and the first application bar may also include an edge of the first application bar 2601.

S2510: The electronic device displays the second application bar on the first edge in response to the fourth slide gesture.

As shown in FIG. 26A and FIG. 26B, a second application bar 2602 may be invoked by using the fourth slide gesture.

For other steps and methods, refer to the content described in the embodiments, and details are not described herein again.

Embodiment 7 of the present invention discloses a graphical user interface on an electronic device.

In addition, an embodiment of this application further provides a graphical user interface system on the electronic device. The graphical user interface system specifically includes a graphical user interface displayed when the electronic device performs any one of steps S101 to S110, steps S1501 to S1504, and steps S2501 to S2510.

This application provides a computer storage medium, including computer instructions. When the computer instructions are run on an electronic device, the electronic device is enabled to perform the application bar display method according to any implementation of any one of the foregoing aspects.

This application provides a computer program product. When the computer program product is run on a computer, the computer is enabled to perform the application bar display method according to any implementation of any one of the foregoing aspects.

Based on the foregoing descriptions of the implementations, a person skilled in the art may clearly understand that for the purpose of convenient and brief descriptions, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above. For a detailed working process of the foregoing system, apparatus, and unit, refer to a corresponding process in the method embodiments. Details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A method implemented by an electronic device, wherein the method comprises:
    displaying, on a display of the electronic device, a first interface comprising an application interface of a first application;
    receiving, from a user, a first slide gesture that goes from a first point to a second point, wherein the first point is in a first area located on a first edge of the display, and wherein the second point is on the display and outside the first area;
    displaying, in response to the first slide gesture, an identifier on the first edge, wherein a straight-line distance between the second point and the first point is greater than or equal to a first threshold and less than a second threshold;
    displaying, on the display based on the identifier and in response to detecting that the first slide gesture meets a first condition, a second interface in place of the first interface wherein the first condition comprises that a first touch point of the user leaves the display when the first slide gesture goes to the second point;

displaying, on the first edge and in response to detecting that the first slide gesture meets a second condition, a first application bar comprising N1 application icons, wherein N1 is a positive integer, and wherein the second condition comprises that a duration for which a second touch point of the user stays at the second point is greater than or equal to a first duration threshold when the first slide gesture goes to the second point;

receiving, from the user when displaying the first application bar, a second slide gesture on the first application bar; and displaying, on the first edge and in response to the second slide gesture, a second application bar comprising N2 application icons, wherein N2 is a positive integer and greater than N1.

2. The method of claim 1, wherein after displaying the first application bar on the first edge, the method further comprises:

receiving, from the user, a first operation on a first application icon of the N1 application icons, wherein the first application icon corresponds to a second application, and wherein the first operation comprises a tap operation, a touch and hold operation, or a drag operation; and displaying, on the display and in response to the first operation, a third interface of the second application.

3. The method of claim 2, further comprising:

displaying the third interface over the first interface in a floating window form; or simultaneously displaying, on the display, the first interface and the third interface in a split screen form.

4. The method of claim 3, wherein after displaying the third interface over the first interface in the floating window form, the method further comprises:

receiving, from the user, a second operation on the third interface, wherein the second operation comprises a tap operation, a touch and hold operation, or a drag operation; and simultaneously displaying, on the display and in response to the second operation, the first interface and the third interface in a split screen form.

5. The method of claim 3, wherein after simultaneously displaying the first interface and the third interface in the split screen form, the method further comprises:

receiving, from the user, a third operation on the third interface, wherein the third operation comprises a tap operation, a touch and hold operation, or a drag operation; and displaying, in response to the third operation, the third interface over the first interface in a floating window form.

6. The method of claim 1, wherein after displaying, the first application bar on the first edge, the method further comprises:

receiving, from the user, a tap operation on a second application icon of the N1 application icons;

displaying, on the display and in response to the tap operation, a first application menu on the second application icon;

receiving, from the user, a tap operation on a third application icon in the first application menu; and adding the third application icon to the first application bar, wherein the third application icon corresponds to a fourth application.

7. The method of claim 1, wherein after displaying the first application bar on the first edge, the method further comprises receiving, from the user, a third slide gesture on the first application bar, wherein the first application bar further comprises a fifth application icon different from the N1 application icons.

8. The method of claim 1, wherein after displaying the first application bar on the first edge, the method further comprises skipping displaying the first application bar or displaying, the first application bar with reduced transparency on the first edge when detecting no operation on the first application bar within the first duration threshold.

9. An electronic device comprising:

a display; and a processor coupled to the display and configured to:

display a first interface on the display, wherein the first interface is an application interface of a first application;

receive, from a user, a first slide gesture that goes from a first point to a second point, wherein the first point is in a first area located on a first edge of the display, wherein the second point is on the display and outside the first area;

display, in response to the first slide gesture, an identifier on the first edge, wherein a straight-line distance between the second point and the first point is greater than or equal to a first threshold and less than a second threshold;

display, on the display based on the identifier and in response to detecting that the first slide gesture meets a first condition, a second interface in place of the first interface, wherein the first condition comprises that a touch point of the user leaves the display when the first slide gesture goes to the second point;

display, on the first edge and in response to detecting that the first slide gesture meets a second condition, a first application bar comprising N1 application icons, wherein N1 is a positive integer, and wherein the second condition comprises that a duration for which a touch point of the user stays at the second point is greater than or equal to a first duration threshold when the first slide gesture goes to the second point;

receive, from the user when displaying the first application bar, a slide gesture on the first application bar; and display, on the first edge in response to the slide gesture, a second application bar comprising N2 application icons, wherein N2 is a positive integer and greater than N1.

10. The electronic device of claim 9, wherein the processor is further configured to:

receive, from the user, a first operation on a second application icon, wherein the N1 application icons comprise the second application icon corresponding to a second application, and wherein the first operation comprises a tap operation, a touch and hold operation, or a drag operation; and display, on the display in response to the first operation, a third interface of the second application.

11. The electronic device of claim 10, wherein the processor is further configured to display the third interface over the first interface in a floating window form, or simultaneously display the first interface and the third interface on the display in a split screen form.

12. The electronic device of claim 11, wherein the processor is further configured to:

receive, from the user, a second operation on the third interface, wherein the second operation comprises a tap operation, a touch and hold operation, or a drag operation; and simultaneously display the first interface and the third interface on the display in a split screen form in response to the second operation.

13. The electronic device of claim 11, wherein the processor is further configured to:

receive, from the user, a second operation on the third interface, wherein the second operation comprises a tap operation, a touch and hold operation, or a drag operation; and display, in response to the second operation, the third interface over the first interface in a floating window form.

14. The electronic device of claim 9, wherein the processor is further configured to:

receive, from the user, a tap operation on a third application icon, wherein the N1 application icons comprise the third application icon;

display, on the display and in response to the tap operation, a first application menu on the display;

receive, from the user, a tap operation on a fourth application icon in the first application menu; and add the fourth application icon to the first application bar, wherein the fourth application icon corresponds to a fourth application.

15. The electronic device of claim 9, wherein the processor is further configured to receive, from the user, a slide gesture on the first application bar, wherein the first application bar further comprises a fifth application icon different from the N1 application icons.

16. The electronic device of claim 9, wherein the processor is further configured to skip displaying the first application bar or display the first application bar with reduced transparency on the first edge when detecting no operation on the first application bar within the first duration threshold.

17. A computer program product comprising computer-executable instructions that are stored on a non-transitory computer-readable storage medium and that, when executed by a processor, cause an electronic device to:

display a first interface on a display of the electronic device, wherein the first interface is an application interface of a first application;

receive, from a user, a first slide gesture that goes from a first point to a second point, wherein the first point is in a first area located on a first edge of the display, and wherein the second point is on the display and outside the first area;

display, in response to the first slide gesture, an identifier on the first edge, wherein a straight-line distance between the second point and the first point is greater than or equal to a first threshold and less than a second threshold;

display, on the display based on the identifier and in response to detecting that the first slide gesture meets a first condition, a second interface in place of the first interface, wherein the first condition comprises that a touch point of the user leaves the display when the first slide gesture goes to the second point;

display, on the first edge and in response to detecting that the first slide gesture meets a second condition, a first application bar, wherein the first application bar comprises N1 application icons, wherein N1 is a positive integer, and wherein the second condition comprises that a duration for which a touch point of the user stays at the second point is greater than or equal to a first duration threshold when the first slide gesture goes to the second point;

receive, from the user when displaying the first application bar, a slide gesture on the first application bar; and display, on the first edge and in response to the slide gesture, a second application bar comprising N2 application icons, wherein N2 is a positive integer and greater than N1.

18. The computer program product of claim 17, wherein the instructions further cause the electronic device to:

receive, from the user, a first operation on a first application icon comprising N1 application icons, wherein the first application icon corresponds to a second application, and wherein the first operation comprises a tap operation, a touch and hold operation, or a drag operation; and display, on the display and in response to the first operation, a third interface of the second application.

19. The computer program product of claim 18, wherein the instructions further cause the electronic device to display the third interface over the first interface in a floating window form, or simultaneously display the first interface and the third interface on the display in a split screen form.

20. The computer program product of claim 18, wherein the instructions further cause the electronic device to:

receive, from the user, a second operation on the third interface, wherein the second operation comprises a tap operation, a touch and hold operation, or a drag operation; and simultaneously display, in response to the second operation, the first interface and the third interface on the display in a split screen form.

* * * * *